(12) United States Patent
Lin et al.

(10) Patent No.: US 11,112,580 B2
(45) Date of Patent: Sep. 7, 2021

(54) PHOTOGRAPHING LENS ASSEMBLY COMPRISING EIGHT LENSES OF +−++−−+−, +−−++−+−, +−−+−−+−, +−−−+−+− OR +−−+−++− REFRACTIVE POWERS, IMAGE CAPTURING UNIT AND ELECTRONIC DEVICE

(71) Applicant: LARGAN PRECISION CO., LTD., Taichung (TW)

(72) Inventors: Cheng-Chen Lin, Taichung (TW); Yu-Tai Tseng, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 130 days.

(21) Appl. No.: 16/557,625

(22) Filed: Aug. 30, 2019

(65) Prior Publication Data

US 2020/0393648 A1    Dec. 17, 2020

(30) Foreign Application Priority Data

Jun. 12, 2019 (TW) .................................. 108120290

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
CPC .............................. G02B 9/64; G02B 13/0045
See application file for complete search history.

(56) References Cited

U.S. PATENT DOCUMENTS 9,835,822 B2  12/2017  Huang
9,927,607 B2   3/2018  Kobayashi et al.
(Continued)

FOREIGN PATENT DOCUMENTS

CN    107741630 A    2/2018
CN    108227145 A    6/2018
(Continued)

OTHER PUBLICATIONS

TW Notice of Allowance in Application No. 108120290 dated Apr. 7, 2020.
(Continued)

*Primary Examiner* — Wen Huang
(74) *Attorney, Agent, or Firm* — Maschoff Brennan

(57) ABSTRACT

A photographing lens assembly includes eight lens elements which are, in order from an object side to an image side: a first lens element, a second lens element, a third lens element, a fourth lens element, a fifth lens element, a sixth lens element, a seventh lens element and an eighth lens element. The first lens element with positive refractive power has an object-side surface being convex in a paraxial region thereof. The sixth lens element has an image-side surface being concave in a paraxial region thereof. The seventh lens element has an image-side surface being concave in a paraxial region thereof. The eighth lens element with negative refractive power has an image-side surface being concave in a paraxial region thereof, and the image-side surface of the eighth lens element has at least one critical point in an off-axis region thereof.

31 Claims, 24 Drawing Sheets

(56) References Cited

U.S. PATENT DOCUMENTS

2020/0363610 A1\* 11/2020 Ko .......................... G02B 9/64
2021/0018729 A1  1/2021 Li et al.

FOREIGN PATENT DOCUMENTS

| CN | 207557562 U | 6/2018 |
| CN | 108254890 A | 7/2018 |
| CN | 108646394 A | 10/2018 |
| CN | 108873272 A | 11/2018 |
| CN | 109343205 A | 2/2019 |
| CN | 109358410 A | 2/2019 |
| CN | 109541784 A | 3/2019 |
| EP | 3168668 A1 | 5/2017 |
| TW | 201816455 A | 5/2018 |
| TW | 201816456 A | 5/2018 |
| TW | I636279 B | 9/2018 |

OTHER PUBLICATIONS

IN Examination Report in Application No. 201934042989 dated Mar. 18, 2021.

\* cited by examiner

PHOTOGRAPHING LENS ASSEMBLY COMPRISING EIGHT LENSES OF +−++−−+−, +−−++−+−, +−−+−−+−, +−−−+−+− OR +−−−+−++− REFRACTIVE POWERS, IMAGE CAPTURING UNIT AND ELECTRONIC DEVICE

RELATED APPLICATIONS

This application claims priority to Taiwan Application 108120290, filed on Jun. 12, 2019, which is incorporated by reference herein in its entirety.

BACKGROUND

Technical Field

The present disclosure relates to a photographing lens assembly, an image capturing unit and an electronic device, more particularly to a photographing lens assembly and an image capturing unit applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, a photographing lens assembly includes eight lens elements. The eight lens elements are, in order from an object side to an image side, a first lens element, a second lens element, a third lens element, a fourth lens element, a fifth lens element, a sixth lens element, a seventh lens element and an eighth lens element.

The first lens element with positive refractive power has an object-side surface being convex in a paraxial region thereof. The sixth lens element has an image-side surface being concave in a paraxial region thereof. The seventh lens element has an image-side surface being concave in a paraxial region thereof. The eighth lens element with negative refractive power has an image-side surface being concave in a paraxial region thereof, and the image-side surface of the eighth lens element has at least one critical point in an off-axis region thereof.

When a central thickness of the first lens element is CT1, a maximum value among central thicknesses of the second through eighth lens elements is MaxCT28, a curvature radius of the image-side surface of the seventh lens element is R14, a curvature radius of an object-side surface of the eighth lens element is R15, an axial distance between an object-side surface of the third lens element and an image-side surface of the fifth lens element is Dr5r10, and an axial distance between an object-side surface of the sixth lens element and the image-side surface of the eighth lens element is Dr11r16, the following conditions are satisfied:

$1.0 < CT1/\text{Max}CT28;$ $R14/R15 < 1.20;$ and $Dr5r10/Dr11r16 < 0.90.$

According to another aspect of the present disclosure, a photographing lens assembly includes eight lens elements. The eight lens elements are, in order from an object side to an image side, a first lens element, a second lens element, a third lens element, a fourth lens element, a fifth lens element, a sixth lens element, a seventh lens element and an eighth lens element.

The first lens element with positive refractive power has an object-side surface being convex in a paraxial region thereof. The sixth lens element has an image-side surface being concave in a paraxial region thereof. The seventh lens element with positive refractive power has an object-side surface being convex in a paraxial region thereof and an image-side surface being concave in a paraxial region thereof. The eighth lens element with negative refractive power has an image-side surface being concave in a paraxial region thereof, and the image-side surface of the eighth lens element has at least one critical point in an off-axis region thereof.

When a central thickness of the first lens element is CT1, a maximum value among central thicknesses of the second through eighth lens elements is MaxCT28, a curvature radius of the image-side surface of the seventh lens element is R14, a curvature radius of an object-side surface of the eighth lens element is R15, an axial distance between an object-side surface of the third lens element and an image-side surface of the fifth lens element is Dr5r10, and an axial distance between an object-side surface of the sixth lens element and the image-side surface of the eighth lens element is Dr11r16, the following conditions are satisfied:

$1.0 < CT1/\text{Max}CT28;$ $R14/R15 < 1.20;$ and $Dr5r10/Dr11r16 < 1.0.$

According to another aspect of the present disclosure, an image capturing unit includes one of the aforementioned photographing lens assemblies and an image sensor, wherein the image sensor is disposed on an image surface of the photographing lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

A photographing lens assembly includes eight lens elements. By utilizing as many as eight lens elements, it is favorable for providing better imaging capability along with an image sensor having improved features in aspects such as pixel size, resolution or chief ray angles. It is also favorable for providing proper design flexibility of the lens elements so as to meet requirements such as controlling the size of the lens assembly. The eight lens elements are, in order from an object side to an image side, a first lens element, a second lens element, a third lens element, a fourth lens element, a fifth lens element, a sixth lens element, a seventh lens element and an eighth lens element.

The first lens element has positive refractive power. Therefore, it is favorable for providing the positive refractive power required for achieving compactness. The first lens element has an object-side surface being convex in a paraxial region thereof. Therefore, it is favorable for balancing the incident light at each field of view in the photographing lens assembly.

The sixth lens element has an image-side surface being concave in a paraxial region thereof. Therefore, it is favorable for meeting the specifications such as compactness and a short total track length of the photographing lens assembly.

The seventh lens element can have positive refractive power. Therefore, it is favorable for providing light converging capability at the image side of the photographing lens assembly. The seventh lens element can have an object-side surface being convex in a paraxial region thereof. Therefore, it is favorable for correcting off-axis field curvature. The seventh lens element has an image-side surface being concave in a paraxial region thereof. Therefore, it is favorable for further meeting the specifications such as compactness and a short total track length of the photographing lens assembly.

The eighth lens element has negative refractive power. Therefore, it is favorable for balancing aberrations from the miniaturization of the photographing lens assembly. The eighth lens element has an image-side surface being concave in a paraxial region thereof. Therefore, it is favorable for positioning the principal point away from an image surface, and further reducing the total track length of the photographing lens assembly.

Figure 24:
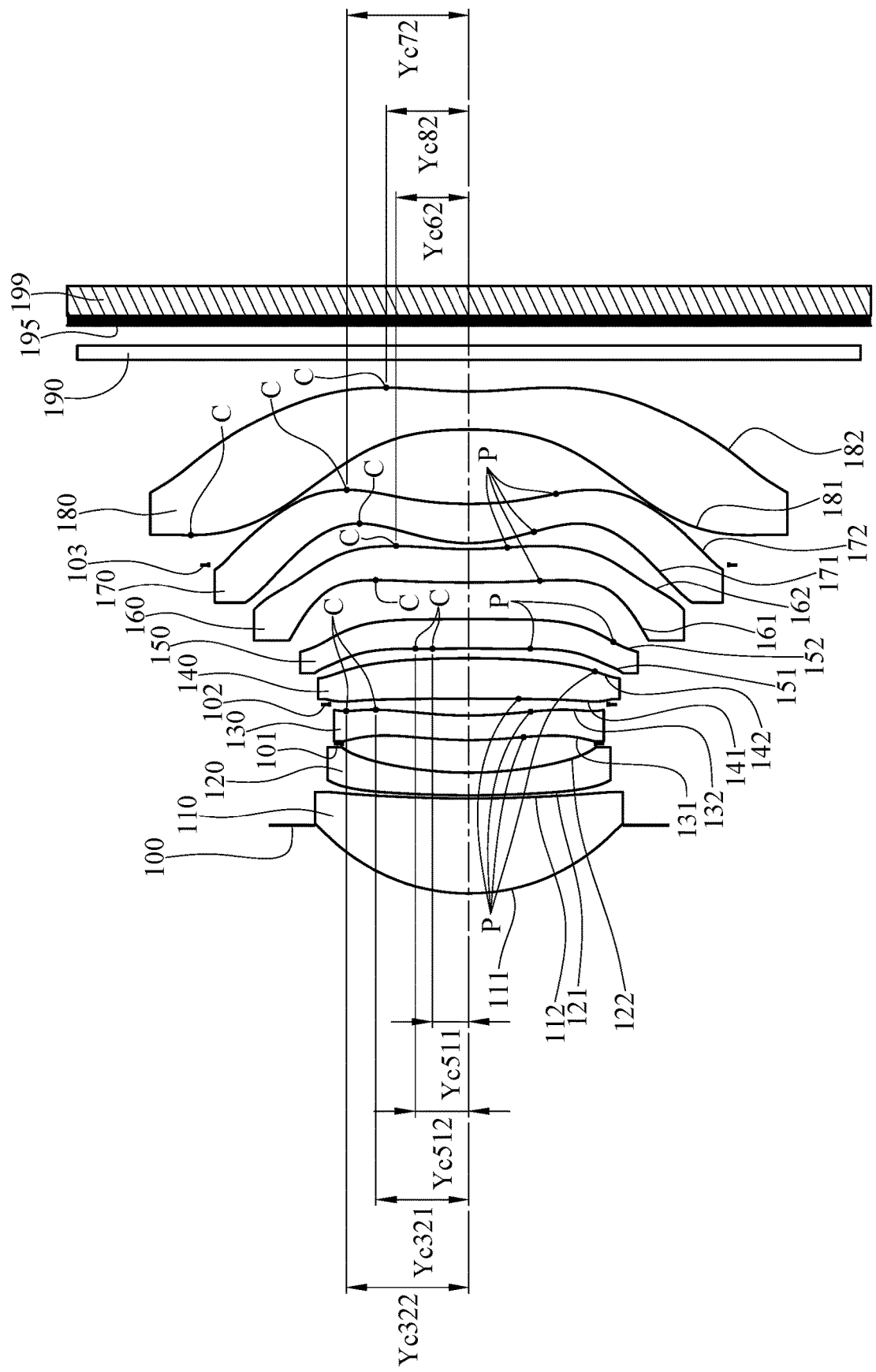
FIG. 24 shows a schematic view of Yc321, Yc322, Yc511, Yc512, Yc62, Yc72 and Yc82, as well as several inflection points and critical points of the eight lens elements according to the 1st embodiment of the present disclosure.

The image-side surface of the eighth lens element has at least one critical point in an off-axis region thereof. Therefore, it is favorable for improving image quality in the peripheral region of the image surface. Moreover, the image-side surface of the sixth lens element can have at least one critical point in an off-axis region thereof. Moreover, the image-side surface of the seventh lens element can have at least one critical point in an off-axis thereof. Moreover, each of object-side surfaces and image-side surfaces of the sixth through eighth lens elements can have at least one critical point in an off-axis region thereof. Moreover, at least one lens surface of at least one lens element can have at least two critical points in an off-axis region thereof. When a vertical distance between the critical point closest to an optical axis of the at least two critical points and the optical axis is Yc1, and a vertical distance between the critical point closest to a maximum effective radius position of the at least two critical points and the optical axis is Yc2, the following condition can be satisfied: $1.20 < |Yc2/Yc1| < 5.0$. For example, in the 1st embodiment of the present disclosure, when a vertical distance between a critical point closest to the optical axis on the image-side surface of the third lens element and the optical axis is Yc321, and a vertical distance between a critical point closest to a maximum effective radius position on the image-side surface of the third lens element and the optical axis is Yc322, the following condition can be satisfied: $1.20 < |Yc322/Yc321| < 5.0$. When a vertical distance between a critical point closest to the optical axis on the object-side surface of the fifth lens element and the optical axis is Yc511, and a vertical distance between a critical point closest to a maximum effective radius position on the object-side surface of the fifth lens element and the optical axis is Yc512, the following condition can be satisfied: $1.20 < |Yc512/Yc511| < 5.0$. Please refer to FIG. 24, which shows a schematic view of Yc321, Yc322, Yc511, Yc512 and several critical points C of the eight lens elements according to the 1st embodiment of the present disclosure. The critical points on the image-side surface of the third lens element, the object-side surface of the fifth lens element, the object-side surface of the sixth lens element, the image-side surface of the sixth lens element, the object-side surface of the seventh lens element, the image-side surface of the seventh lens element, the object-side surface of the eighth lens element and the image-side surface of the eighth lens element in FIG. 24 are only exemplary. The other lens surfaces of the eight lens elements may also have one or more critical points.

At least one lens surface of the third through seventh lens elements can have at least one inflection point. Therefore, it is favorable for improving image quality in the peripheral region of the image surface. Please refer to FIG. 24, which shows a schematic view of several inflection points P of the eight lens elements according to the 1st embodiment of the present disclosure. The inflection points on the object-side surface of the third lens element, the image-side surface of the third lens element, the object-side surface of the fourth lens element, the image-side surface of the fourth lens element, the object-side surface of the fifth lens element, the image-side surface of the fifth lens element, the object-side surface of the sixth lens element, the image-side surface of the sixth lens element, the object-side surface of the seventh lens element and the image-side surface of the seventh lens element in FIG. 24 are only exemplary. The other lens surfaces of the eight lens elements may also have one or more inflection points.

When a central thickness of the first lens element is CT1, and a maximum value among central thicknesses of the second through eighth lens elements is MaxCT28, the following condition is satisfied: 1.0<CT1/MaxCT28. Therefore, it is favorable for preventing the first lens element from being overly thick so as to improve space utilization for the other lens elements. Moreover, the following condition can also be satisfied: 1.5<CT1/MaxCT28<3.5.

When a curvature radius of the image-side surface of the seventh lens element is R14, and a curvature radius of the object-side surface of the eighth lens element is R15, the following condition is satisfied: R14/R15<1.20. Therefore, it is favorable for reducing the back focal length so as to properly utilize the limited space of the photographing lens assembly. Moreover, the following condition can also be satisfied: −2.5<R14/R15<0.50.

When an axial distance between the object-side surface of the third lens element and the image-side surface of the fifth lens element is Dr5r10, and an axial distance between the object-side surface of the sixth lens element and the image-side surface of the eighth lens element is Dr11r16, the following condition is satisfied: Dr5r10/Dr11r16<1.0. Therefore, it is favorable for preventing axial distances between each of all adjacent lens elements from being excessive large or small so as to improve space utilization for the lens elements. Moreover, the following condition can also be satisfied: Dr5r10/Dr11r16<0.90. Moreover, the following condition can also be satisfied: 0.30<Dr5r10/Dr11r16<0.75.

When an axial distance between the seventh lens element and the eighth lens element is T78, a central thickness of the seventh lens element is CT7, and a central thickness of the eighth lens element is CT8, the following condition can be satisfied: 0.40<T78/(CT7+CT8)<1.5. Therefore, it is favorable for ensuring sufficient space between the seventh lens element and the eighth lens element so as to meet the requirements of the size and image quality of the photographing lens assembly. Moreover, the following condition can also be satisfied: 0.60<T78/(CT7+CT8)<1.25.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, an axial distance between the sixth lens element and the seventh lens element is T67, the axial distance between the seventh lens element and the eighth lens element is T78, and an axial distance between the image-side surface of the eighth lens element and the image surface is BL, the following conditions can be satisfied: 1.0<T78/T12; 1.0<T78/T23; 1.0<T78/T34; 1.0<T78/T45; 1.0<T78/T56; 1.10<T78/T67; and 0.80<T78/BL. Therefore, it is favorable for providing larger space between the seventh lens element and the eighth lens element so as to better correct aberrations on the image side of the photographing lens assembly.

When an Abbe number of the third lens element is V3, and an Abbe number of the sixth lens element is V6, the following condition can be satisfied: −1.0<(V3−V6)/(V3+V6)<−0.30. Therefore, it is favorable for better correcting chromatic aberration.

When a vertical distance between the critical point on the image-side surface of the sixth lens element and the optical axis is Yc62, a vertical distance between the critical point on the image-side surface of the seventh lens element and the optical axis is Yc72, and a vertical distance between the critical point on the image-side surface of the eighth lens element and the optical axis is Yc82, the following condition can be satisfied: Yc62<Yc82<Yc72. Therefore, it is favorable for improving image quality in the peripheral region of the image surface. Please refer to FIG. 24, which shows a schematic view of Yc62, Yc72 and Yc82 according to the 1st embodiment of the present disclosure.

When an entrance pupil diameter of the photographing lens assembly is EPD, and the axial distance between the object-side surface of the third lens element and the image-side surface of the fifth lens element is Dr5r10, the following condition can be satisfied: 2.0<EPD/Dr5r10<4.0. Therefore, it is favorable for providing the configuration of the photographing lens assembly featuring a large aperture.

When a focal length of the photographing lens assembly is f, a curvature radius of the image-side surface of the sixth lens element is R12, the curvature radius of the image-side surface of the seventh lens element is R14, and a curvature radius of the image-side surface of the eighth lens element is R16, the following condition can be satisfied: 3.0<f/R12+f/R14+f/R16<10. Therefore, it is favorable for reducing the total track length of the photographing lens assembly. Moreover, the following condition can also be satisfied: 3.5<f/R12+f/R14+f/R16<7.5.

When an f-number of the photographing lens assembly is Fno, and half of a maximum field of view of the photographing lens assembly is HFOV, the following condition can be satisfied: Fno/tan(HFOV)<2.20. Therefore, it is favorable for featuring the large aperture in the photographing lens assembly.

When a sum of axial distances between each of all adjacent lens elements of the photographing lens assembly is ΣAT, the axial distance between the second lens element and the third lens element is T23, the axial distance between the fifth lens element and the sixth lens element is T56, and the axial distance between the seventh lens element and the eighth lens element is T78, the following condition can be satisfied: 1.0<ΣAT/(T23+T56+T78)<1.50. Therefore, it is favorable for preventing axial distances between each of all adjacent lens elements from being excessive large or small so as to improve space utilization for the lens elements.

When a composite focal length of the first lens element and the second lens element is f12, and a composite focal length of the third lens element, the fourth lens element and the fifth lens element is f345, the following condition can be satisfied: 0<f12/f345<1.50. Therefore, it is favorable for having proper positive refractive power on the object side so as to reduce the total track length of the photographing lens assembly.

When the focal length of the photographing lens assembly is f, and a composite focal length of the sixth lens element, the seventh lens element and the eighth lens element is f678, the following condition can be satisfied: f/f678<−0.20. Therefore, a proper configuration of the sixth lens element, the seventh lens element and the eighth lens element is favorable for correcting aberrations in the peripheral region and reducing the back focal length of the photographing lens assembly.

When the focal length of the photographing lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the eighth lens element is f8, and a focal length of the i-th lens element is fi, at least one lens element of the photographing lens assembly can satisfy the following condition: |f/fi|<0.10, wherein i=1, 2, 3, 4, 5, 6, 7 or 8. Therefore, it is favorable for preventing overly large differences in refractive power among lens elements and avoiding image overcorrection so as to provide a proper surface shape for the lens elements for reducing the probability of ghosting.

When the focal length of the seventh lens element is f7, and the focal length of the eighth lens element is f8, the following condition can be satisfied: f7/f8<−0.50. Therefore, it is favorable for balancing the refractive power of the image side of the photographing lens assembly so as to control the size of an image capturing unit.

When the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the focal length of the seventh lens element is f7, and the focal length of the eighth lens element is f8, the following conditions can be satisfied: |f8/f1|<1.0; |f8/f2|<1.0; |f8/f3|<1.0; |f8/f4|<1.0; |f8/f5|<1.0; |f8/f6|<1.0; and |f8/f7|<1.0. Therefore, it is favorable for the eighth lens element to have proper refractive power so as to reduce the size of the image capturing unit.

When an Abbe number of the first lens element is V1, an Abbe number of the second lens element is V2, the Abbe number of the third lens element is V3, an Abbe number of the fourth lens element is V4, an Abbe number of the fifth lens element is V5, the Abbe number of the sixth lens element is V6, an Abbe number of the seventh lens element is V7, an Abbe number of the eighth lens element is V8, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, and a refractive index of the i-th lens element is Ni, at least two lens elements of the photographing lens assembly can satisfy the following condition: 5.0<Vi/Ni<12.0, wherein i=1, 2, 3, 4, 5, 6, 7 or 8. Therefore, it is favorable for better correcting chromatic aberration. Moreover, at least two lens elements of the photographing lens assembly can also satisfy the following condition: 6.0<Vi/Ni<11.0, wherein i=1, 2, 3, 4, 5, 6, 7 or 8.

When an axial distance between the object-side surface of the first lens element and the image surface is TL, and a maximum image height of the photographing lens assembly (half of a diagonal length of an effective photosensitive area of an image sensor) is ImgH, the following condition can be satisfied: TL/ImgH<1.60. Therefore, it is favorable for balancing between lens miniaturization and manufacturability.

When the maximum image height of the photographing lens assembly is ImgH, and the axial distance between the image-side surface of the eighth lens element and the image surface is BL, the following condition can be satisfied: 5.0<ImgH/BL. Therefore, it is favorable for further reducing the back focal length of the photographing lens assembly so as to utilize limited space properly. Moreover, the following condition can also be satisfied: 6.0<ImgH/BL.

According to the present disclosure, the aforementioned features and conditions can be utilized in numerous combinations so as to achieve corresponding effects.

According to the present disclosure, the lens elements of the photographing lens assembly can be made of either glass or plastic material. When the lens elements are made of glass material, the refractive power distribution of the photographing lens assembly may be more flexible. The glass lens element can either be made by grinding or molding. When the lens elements are made of plastic material, the manufacturing costs can be effectively reduced. Furthermore, surfaces of each lens element can be arranged to be aspheric, which allows more control variables for eliminating aberrations thereof, the required number of the lens elements can be reduced, and the total track length of the photographing lens assembly can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the photographing lens assembly, based on the corresponding image sensor, can be flat or curved, especially a curved surface being concave facing towards the object side of the photographing lens assembly.

According to the present disclosure, an image correction unit, such as a field flattener, can be optionally disposed between the lens element closest to the image side of the photographing lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the photographing lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing lens assembly and thereby provides a wider field of view for the same.

According to the present disclosure, the photographing lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
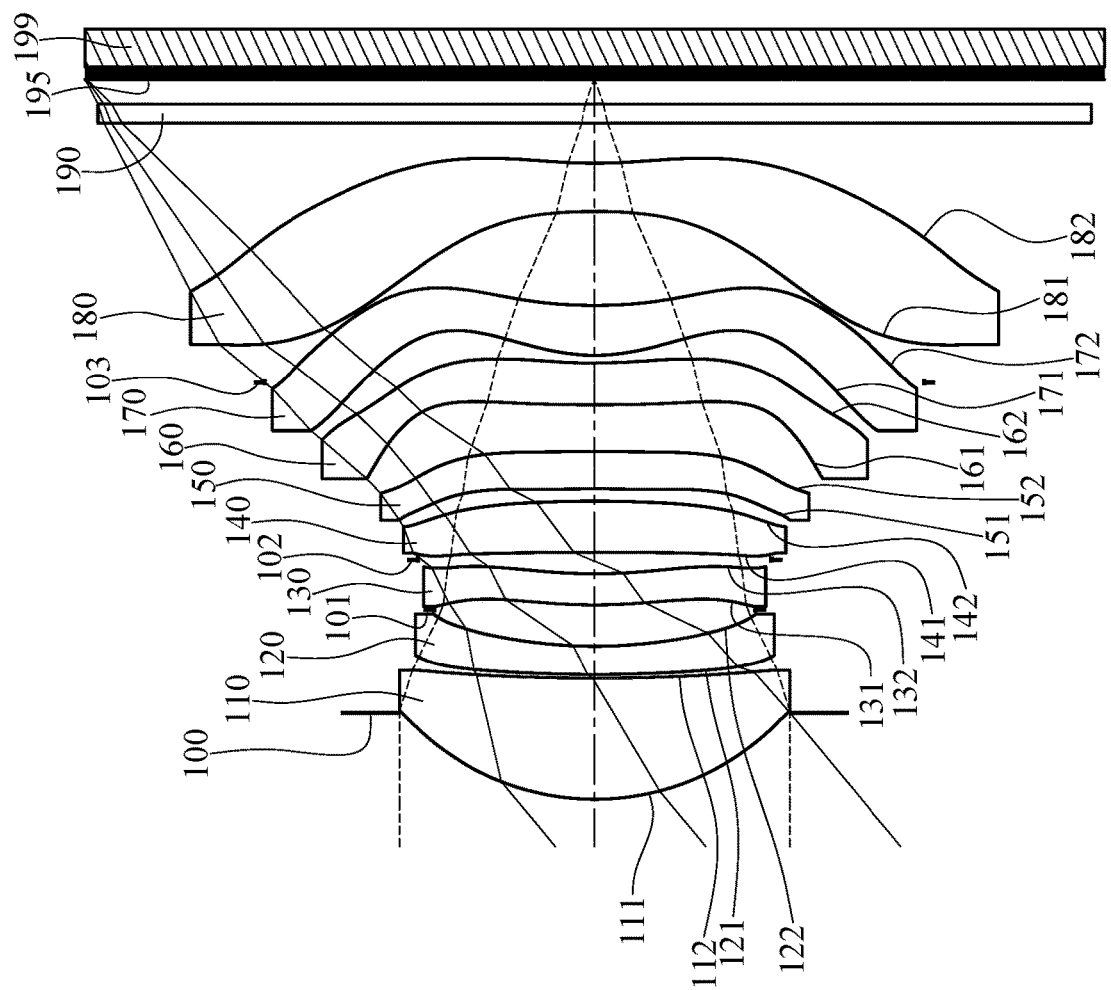
FIG. 1 is a schematic view of an image capturing unit according to the 1st embodiment of the present disclosure.
Figure 2:
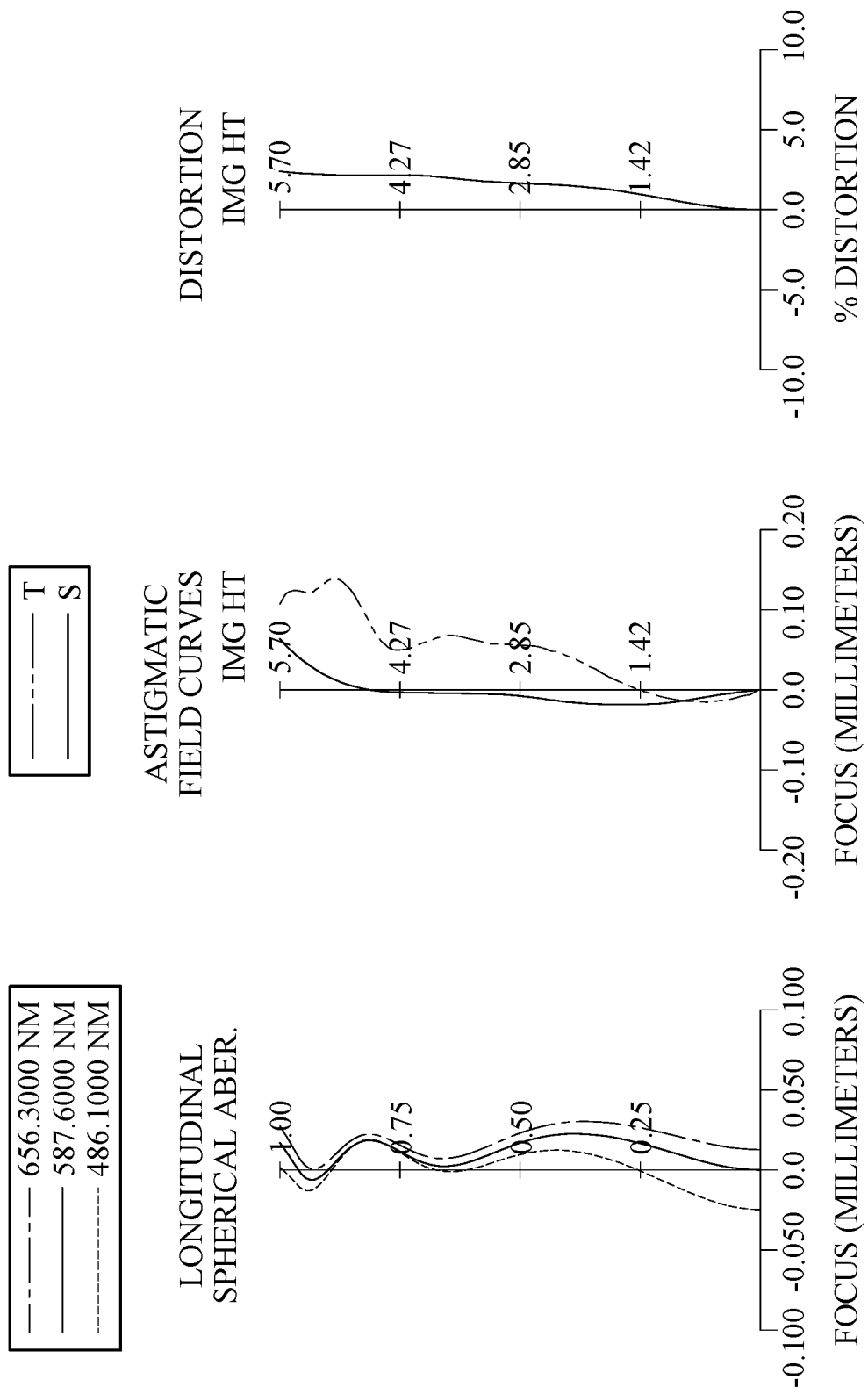
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing lens assembly (its reference numeral is omitted) of the present disclosure and an image sensor 199. The photographing lens assembly includes, in order from an object side to an image side, an aperture stop 100, a first lens element 110, a second lens element 120, a stop 101, a third lens element 130, a stop 102, a fourth lens element 140, a fifth lens element 150, a sixth lens element 160, a seventh lens element 170, a stop 103, an eighth lens element 180, an IR-cut filter 190 and an image surface 195. The photographing lens assembly includes eight lens elements (110, 120, 130, 140, 150, 160, 170 and 180) with no additional lens element disposed between each of the adjacent eight lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has one inflection point. The image-side surface 112 of the first lens element 110 has one inflection point.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has two inflection points and one critical point in an off-axis region thereof. The image-side surface 132 of the third lens element 130 has two inflection points and two critical points in an off-axis region thereof.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric. The object-side surface 141 of the fourth lens element 140 has one inflection point and one critical point in an off-axis region thereof. The image-side surface 142 of the fourth lens element 140 has one inflection point.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. The object-side surface 151 of the fifth lens element 150 has four inflection points and two critical points in an off-axis region thereof. The image-side surface 152 of the fifth lens element 150 has two inflection points.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The object-side surface 161 of the sixth lens element 160 has two inflection points and one critical point in an off-axis region thereof. The image-side surface 162 of the sixth lens element 160 has three inflection points and one critical point in an off-axis region thereof.

The seventh lens element 170 with positive refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. The object-side surface 171 of the seventh lens element 170 has two inflection points and one critical point in an off-axis region thereof. The image-side surface 172 of the seventh lens element 170 has two inflection points and one critical point in an off-axis region thereof.

The eighth lens element 180 with negative refractive power has an object-side surface 181 being concave in a paraxial region thereof and an image-side surface 182 being concave in a paraxial region thereof. The eighth lens element 180 is made of plastic material and has the object-side surface 181 and the image-side surface 182 being both aspheric. The object-side surface 181 of the eighth lens element 180 has one inflection point and one critical point in an off-axis region thereof. The image-side surface 182 of the eighth lens element 180 has three inflection points and one critical point in an off-axis region thereof.

The IR-cut filter 190 is made of glass material and located between the eighth lens element 180 and the image surface 195, and will not affect the focal length of the photographing lens assembly. The image sensor 199 is disposed on or near the image surface 195 of the photographing lens assembly.

The equation of the aspheric surface profiles of the aforementioned lens elements of the 1st embodiment is expressed as follows:

$$X(Y) = (Y^2/R)/(1 + sqrt(1 - (1+k)\times(Y/R)^2)) + \sum_i (Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the photographing lens assembly of the image capturing unit according to the 1st embodiment, when a focal length of the photographing lens assembly is f, an f-number of the photographing lens assembly is Fno, and half of a maximum field of view of the photographing lens assembly is HFOV, these parameters have the following values: f=6.68 millimeters (mm), Fno=1.53, HFOV=39.8 degrees (deg.).

When the f-number of the photographing lens assembly is Fno, and half of the maximum field of view of the photographing lens assembly is HFOV, the following condition is satisfied: Fno/tan(HFOV)=1.83.

When an Abbe number of the first lens element 110 is V1, and a refractive index of the first lens element 110 is N1, the following condition is satisfied: V1/N1=36.27.

When an Abbe number of the second lens element 120 is V2, and a refractive index of the second lens element 120 is N2, the following condition is satisfied: V2/N2=11.34.

When an Abbe number of the third lens element 130 is V3, and a refractive index of the third lens element 130 is N3, the following condition is satisfied: V3/N3=10.91.

When an Abbe number of the fourth lens element 140 is V4, and a refractive index of the fourth lens element 140 is N4, the following condition is satisfied: V4/N4=36.23.

When an Abbe number of the fifth lens element 150 is V5, and a refractive index of the fifth lens element 150 is N5, the following condition is satisfied: V5/N5=36.23.

When an Abbe number of the sixth lens element 160 is V6, and a refractive index of the sixth lens element 160 is N6, the following condition is satisfied: V6/N6=28.33.

When an Abbe number of the seventh lens element 170 is V7, and a refractive index of the seventh lens element 170 is N7, the following condition is satisfied: V7/N7=36.23.

When an Abbe number of the eighth lens element 180 is V8, and a refractive index of the eighth lens element 180 is N8, the following condition is satisfied: V8/N8=36.23.

When the Abbe number of the third lens element 130 is V3, and the Abbe number of the sixth lens element 160 is V6, the following condition is satisfied: (V3−V6)/(V3+V6)= −0.41.

When a central thickness of the first lens element 110 is CT1, and a maximum value among central thicknesses of the second through eighth lens elements 180 is MaxCT28, the following condition is satisfied: CT1/MaxCT28=2.36. In this embodiment, among the second lens element 120, the third lens element 130, the fourth lens element 140, the fifth lens element 150, the sixth lens element 160, the seventh lens element 170 and the eighth lens element 180, a central thickness of the fourth lens element 140 is larger than the central thicknesses of the other lens elements, and MaxCT28 is equal to the central thickness of the fourth lens element 140.

When an axial distance between the first lens element 110 and the second lens element 120 is T12, and an axial distance between the seventh lens element 170 and the eighth lens element 180 is T78, the following condition is satisfied: T78/T12=23.93. In this embodiment, an axial distance between two adjacent lens elements is an air gap in a paraxial region between the two adjacent lens elements.

When an axial distance between the second lens element 120 and the third lens element 130 is T23, and the axial distance between the seventh lens element 170 and the eighth lens element 180 is T78, the following condition is satisfied: T78/T23=2.27.

When an axial distance between the third lens element 130 and the fourth lens element 140 is T34, and the axial distance between the seventh lens element 170 and the eighth lens element 180 is T78, the following condition is satisfied: T78/T34=4.39.

When an axial distance between the fourth lens element 140 and the fifth lens element 150 is T45, and the axial distance between the seventh lens element 170 and the eighth lens element 180 is T78, the following condition is satisfied: T78/T45=7.80.

When an axial distance between the fifth lens element 150 and the sixth lens element 160 is T56, and the axial distance between the seventh lens element 170 and the eighth lens element 180 is T78, the following condition is satisfied: T78/T56=2.00.

When an axial distance between the sixth lens element 160 and the seventh lens element 170 is T67, and the axial distance between the seventh lens element 170 and the eighth lens element 180 is T78, the following condition is satisfied: T78/T67=12.10.

When the axial distance between the seventh lens element 170 and the eighth lens element 180 is T78, a central thickness of the seventh lens element 170 is CT7, and a central thickness of the eighth lens element 180 is CT8, the following condition is satisfied: T78/(CT7+CT8)=0.96.

When the axial distance between the seventh lens element 170 and the eighth lens element 180 is T78, and an axial distance between the image-side surface 182 of the eighth lens element 180 and the image surface 195 is BL, the following condition is satisfied: T78/BL=1.11.

When a sum of axial distances between each of all adjacent lens elements of the photographing lens assembly is ΣAT, the axial distance between the second lens element 120 and the third lens element 130 is T23, the axial distance between the fifth lens element 150 and the sixth lens element 160 is T56, and the axial distance between the seventh lens element 170 and the eighth lens element 180 is T78, the following condition is satisfied: ΣAT/(T23+T56+T78)=1.25. In this embodiment, ΣAT is the sum of the axial distances between the first lens element 110 and the second lens element 120, the second lens element 120 and the third lens element 130, the third lens element 130 and the fourth lens element 140, the fourth lens element 140 and the fifth lens element 150, the fifth lens element 150 and the sixth lens element 160, the sixth lens element 160 and the seventh lens element 170, and the seventh lens element 170 and the eighth lens element 180.

When an axial distance between the object-side surface 131 of the third lens element 130 and the image-side surface 152 of the fifth lens element 150 is Dr5r10, and an axial distance between the object-side surface 161 of the sixth lens element 160 and the image-side surface 182 of the eighth lens element 180 is Dr11r16, the following condition is satisfied: Dr5r10/Dr11r16=0.63.

When an entrance pupil diameter of the photographing lens assembly is EPD, and the axial distance between the object-side surface 131 of the third lens element 130 and the image-side surface 152 of the fifth lens element 150 is Dr5r10, the following condition is satisfied: EPD/Dr5r10=2.54.

When an axial distance between the object-side surface 111 of the first lens element 110 and the image surface 195 is TL, and a maximum image height of the photographing lens assembly is ImgH, the following condition is satisfied: TL/ImgH=1.42.

When the maximum image height of the photographing lens assembly is ImgH, and the axial distance between the image-side surface 182 of the eighth lens element 180 and the image surface 195 is BL, the following condition is satisfied: ImgH/BL=6.03.

When a vertical distance between the critical point on the image-side surface 162 of the sixth lens element 160 and the optical axis is Yc62, the following condition is satisfied: Yc62=1.06 [mm].

When a vertical distance between the critical point on the image-side surface 172 of the seventh lens element 170 and the optical axis is Yc72, the following condition is satisfied: Yc72=1.74 [mm].

When a vertical distance between the critical point on the image-side surface 182 of the eighth lens element 180 and the optical axis is Yc82, the following condition is satisfied: Yc82=1.21 [mm].

When a curvature radius of the image-side surface 172 of the seventh lens element 170 is R14, and a curvature radius of an object-side surface 181 of the eighth lens element 180 is R15, the following condition is satisfied: R14/R15=−0.94.

When the focal length of the photographing lens assembly is f, a curvature radius of the image-side surface 162 of the sixth lens element 160 is R12, the curvature radius of the image-side surface 172 of the seventh lens element 170 is R14, a curvature radius of the image-side surface 182 of the eighth lens element 180 is R16, the following condition is satisfied: f/R12+f/R14+f/R16=3.59.

When a focal length of the seventh lens element 170 is f7, and a focal length of the eighth lens element 180 is f8, the following condition is satisfied: f7/f8=−1.06.

When a focal length of the first lens element 110 is f1, and the focal length of the eighth lens element 180 is f8, the following condition is satisfied: |f8/f1|=0.88.

When a focal length of the second lens element 120 is f2, and the focal length of the eighth lens element 180 is f8, the following condition is satisfied: |f8/f2|=0.39.

When a focal length of the third lens element 130 is f3, and the focal length of the eighth lens element 180 is f8, the following condition is satisfied: |f8/f3|=0.02.

When a focal length of the fourth lens element 140 is f4, and the focal length of the eighth lens element 180 is f8, the following condition is satisfied: |f8/f4|=0.27.

When a focal length of the fifth lens element 150 is f5, and the focal length of the eighth lens element 180 is f8, the following condition is satisfied: |f8/f5|=0.04.

When a focal length of the sixth lens element 160 is f6, and the focal length of the eighth lens element 180 is f8, the following condition is satisfied: |f8/f6|=0.50.

When the focal length of the seventh lens element 170 is f7, and the focal length of the eighth lens element 180 is f8, the following condition is satisfied: |f8/f7|=0.95.

When the focal length of the photographing lens assembly is f, and the focal length of the first lens element 110 is f1, the following condition is satisfied: |f/f1|=1.09.

When the focal length of the photographing lens assembly is f, and the focal length of the second lens element 120 is f2, the following condition is satisfied: |f/f2|=0.48.

When the focal length of the photographing lens assembly is f, and the focal length of the third lens element 130 is f3, the following condition is satisfied: |f/f3|=0.03.

When the focal length of the photographing lens assembly is f, and the focal length of the fourth lens element 140 is f4, the following condition is satisfied: |f/f4|=0.33.

When the focal length of the photographing lens assembly is f, and the focal length of the fifth lens element 150 is f5, the following condition is satisfied: |f/f5|=0.05.

When the focal length of the photographing lens assembly is f, and the focal length of the sixth lens element 160 is f6, the following condition is satisfied: |f/f6|=0.62.

When the focal length of the photographing lens assembly is f, and the focal length of the seventh lens element 170 is f7, the following condition is satisfied: |f/f7|=1.17.

When the focal length of the photographing lens assembly is f, and the focal length of the eighth lens element 180 is f8, the following condition is satisfied: |f/f8|=1.23.

When a composite focal length of the first lens element 110 and the second lens element 120 is f12, and a composite focal length of the third lens element 130, the fourth lens element 140 and the fifth lens element 150 is f345, the following condition is satisfied: f12/f345=0.41.

When the focal length of the photographing lens assembly is f, and a composite focal length of the sixth lens element 160, the seventh lens element 170 and the eighth lens element 180 is f678, the following condition is satisfied: f/f678=−0.51.

When a vertical distance between the critical point closest to the optical axis on the image-side surface 132 of the third lens element 130 and the optical axis is Yc321, and a vertical distance between the critical point closest to a maximum effective radius position on the image-side surface 132 of the third lens element 130 and the optical axis is Yc322, the following condition is satisfied: |Yc322/Yc321|=1.31.

When a vertical distance between the critical point closest to the optical axis on the object-side surface 151 of the fifth lens element 150 and the optical axis is Yc511, and a vertical distance between the critical point closest to a maximum effective radius position on the object-side surface 151 of the fifth lens element 150 and the optical axis is Yc512, the following condition is satisfied: |Yc512/Yc511|=1.47.

The detailed optical data of the 1st embodiment are shown in Table 1 and the aspheric surface data are shown in Table 2 below.

TABLE 1

1st Embodiment
f = 6.68 mm, Fno = 1.53, HFOV = 39.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.972 | | | | |
| 2 | Lens 1 | 2.857 | (ASP) | 1.358 | Plastic | 1.545 | 56.0 | 6.15 |
| 3 | | 16.180 | (ASP) | 0.044 | | | | |
| 4 | Lens 2 | 12.935 | (ASP) | 0.320 | Plastic | 1.676 | 19.0 | −14.02 |
| 5 | | 5.415 | (ASP) | 0.410 | | | | |
| 6 | Stop | Plano | | 0.054 | | | | |
| 7 | Lens 3 | 6.015 | (ASP) | 0.350 | Plastic | 1.686 | 18.4 | 225.32 |
| 8 | | 6.111 | (ASP) | 0.158 | | | | |
| 9 | Stop | Plano | | 0.082 | | | | |
| 10 | Lens 4 | −73.239 | (ASP) | 0.576 | Plastic | 1.544 | 55.9 | 20.44 |
| 11 | | −9.676 | (ASP) | 0.135 | | | | |
| 12 | Lens 5 | −18.022 | (ASP) | 0.418 | Plastic | 1.544 | 55.9 | −125.33 |
| 13 | | −24.703 | (ASP) | 0.526 | | | | |
| 14 | Lens 6 | 36.414 | (ASP) | 0.474 | Plastic | 1.560 | 44.2 | −10.84 |
| 15 | | 5.178 | (ASP) | 0.087 | | | | |
| 16 | Lens 7 | 2.120 | (ASP) | 0.559 | Plastic | 1.544 | 55.9 | 5.73 |
| 17 | | 6.034 | (ASP) | −0.867 | | | | |
| 18 | Stop | Plano | | 1.920 | | | | |
| 19 | Lens 8 | −6.413 | (ASP) | 0.542 | Plastic | 1.544 | 55.9 | −5.42 |
| 20 | | 5.610 | (ASP) | 0.450 | | | | |
| 21 | IR-cut Filter | Plano | | 0.210 | Glass | 1.517 | 64.2 | — |
| 22 | | Plano | | 0.285 | | | | |
| 23 | Image | Plano | | 0.000 | | | | |

Note:
Reference wavelength is 587.6 nm (d-line).
An effective radius of the stop 101 (Surface 6) is 1.800 mm.
An effective radius of the stop 102 (Surface 9) is 1.980 mm.
An effective radius of the stop 103 (Surface 18) is 3.700 mm.

TABLE 2

Aspheric Coefficients

| Surface # | 2 | 3 | 4 | 5 | 7 |
|---|---|---|---|---|---|
| k = | 7.0804E−03 | −2.3366E+01 | 9.1085E+00 | −1.7123E−01 | 5.6658E+00 |
| A4 = | −1.8828E−03 | −1.6584E−02 | −1.9460E−02 | −7.1983E−03 | −2.4146E−02 |
| A6 = | 2.3955E−03 | 1.4743E−02 | 1.4960E−02 | 6.8045E−03 | −8.1392E−03 |
| A8 = | −1.5829E−03 | −6.2555E−03 | −5.1034E−03 | −4.2131E−03 | 6.8059E−03 |
| A10 = | 6.3492E−04 | 1.3930E−03 | 8.1859E−04 | 2.2954E−03 | −4.7232E−03 |
| A12 = | −1.5538E−04 | −1.4940E−04 | −1.7731E−05 | −7.0593E−04 | 1.4466E−03 |
| A14 = | 2.1916E−05 | 5.1911E−06 | −3.6368E−06 | 9.5363E−05 | −1.4845E−04 |
| A16 = | −1.4638E−06 | — | — | — | — |

| Surface # | 8 | 10 | 11 | 12 | 13 |
|---|---|---|---|---|---|
| k = | 5.5951E+00 | 0.0000E+00 | 3.6026E−01 | 3.0793E+01 | 5.0575E+01 |
| A4 = | −1.1880E−02 | 1.6692E−02 | 6.5801E−02 | 8.9064E−02 | 3.4936E−02 |
| A6 = | −2.0365E−02 | −3.7954E−02 | −9.8487E−02 | −1.1563E−01 | −4.0622E−02 |
| A8 = | 1.8889E−02 | 3.8152E−02 | 7.0499E−02 | 6.9774E−02 | 1.4252E−02 |
| A10 = | −1.0800E−02 | −2.0626E−02 | −2.8884E−02 | −2.3940E−02 | −8.9772E−04 |
| A12 = | 3.0147E−03 | 5.8390E−03 | 6.6963E−03 | 4.3469E−03 | −1.0389E−03 |
| A14 = | −3.2572E−04 | −8.0538E−04 | −8.1899E−04 | −3.5127E−04 | 3.4290E−04 |
| A16 = | 5.5921E−06 | 4.2796E−05 | 4.1501E−05 | 6.9412E−06 | −4.1572E−05 |
| A18 = | — | — | — | — | 1.7845E−06 |

TABLE 2-continued

| Aspheric Coefficients | | | | | |
|---|---|---|---|---|---|
| Surface # | 14 | 15 | 16 | 17 | 19 |
| k = | 0.0000E+00 | −3.1755E+01 | −1.0000E+00 | 0.0000E+00 | 0.0000E+00 |
| A4 = | 3.1776E−02 | −3.9640E−02 | −6.7105E−02 | 2.8365E−02 | −4.7231E−02 |
| A6 = | −3.0134E−02 | 1.0315E−02 | 2.0331E−02 | −1.9991E−02 | 1.0987E−02 |
| A8 = | 1.3807E−02 | −3.0035E−03 | −1.0274E−02 | 3.2189E−03 | −1.6780E−03 |
| A10 = | −4.6698E−03 | 6.0133E−04 | 2.8122E−03 | 3.0935E−05 | 2.2118E−04 |
| A12 = | 1.0074E−03 | −1.2688E−04 | −4.3062E−04 | −9.4739E−05 | −2.1749E−05 |
| A14 = | −1.3573E−04 | 2.5559E−05 | 3.9118E−05 | 1.6151E−05 | 1.4118E−06 |
| A16 = | 1.0322E−05 | −3.0513E−06 | −2.1041E−06 | −1.3112E−06 | −5.6333E−08 |
| A18 = | −3.2692E−07 | 1.7809E−07 | 6.2865E−08 | 5.3683E−08 | 1.2492E−09 |
| A20 = | — | −3.9553E−09 | −8.3078E−10 | −8.8687E−10 | −1.1779E−11 |

| Surface # | 20 |
|---|---|
| k = | −6.7889E−01 |
| A4 = | −4.7218E−02 |
| A6 = | 1.0481E−02 |
| A8 = | −1.9075E−03 |
| A10 = | 2.3983E−04 |
| A12 = | −1.8914E−05 |
| A14 = | 8.8448E−07 |
| A16 = | −2.2649E−08 |
| A18 = | 2.6144E−10 |
| A20 = | −6.0119E−13 |

In Table 1, the curvature radius, the thickness and the focal length are shown in millimeters (mm). Surface numbers 0-23 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
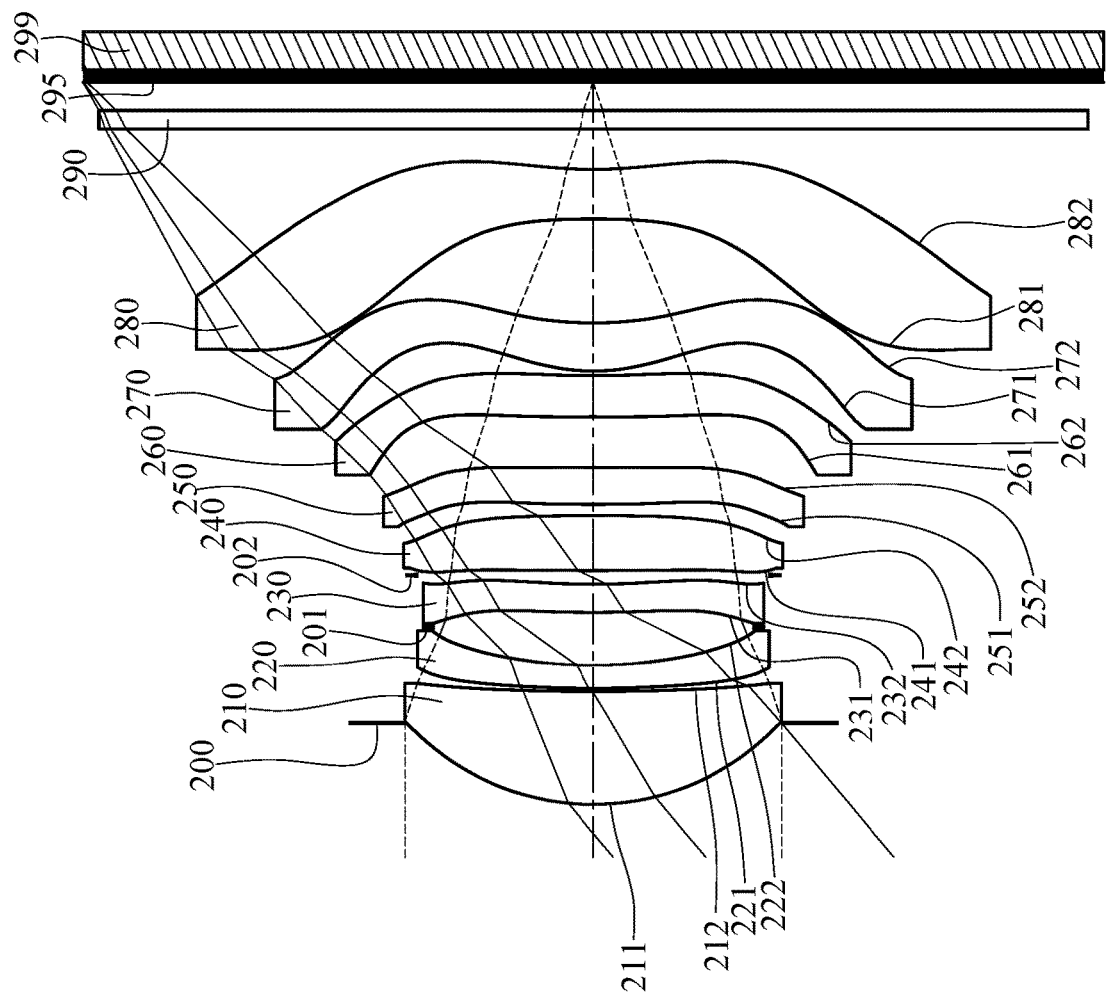
FIG. 3 is a schematic view of an image capturing unit according to the 2nd embodiment of the present disclosure.
Figure 4:
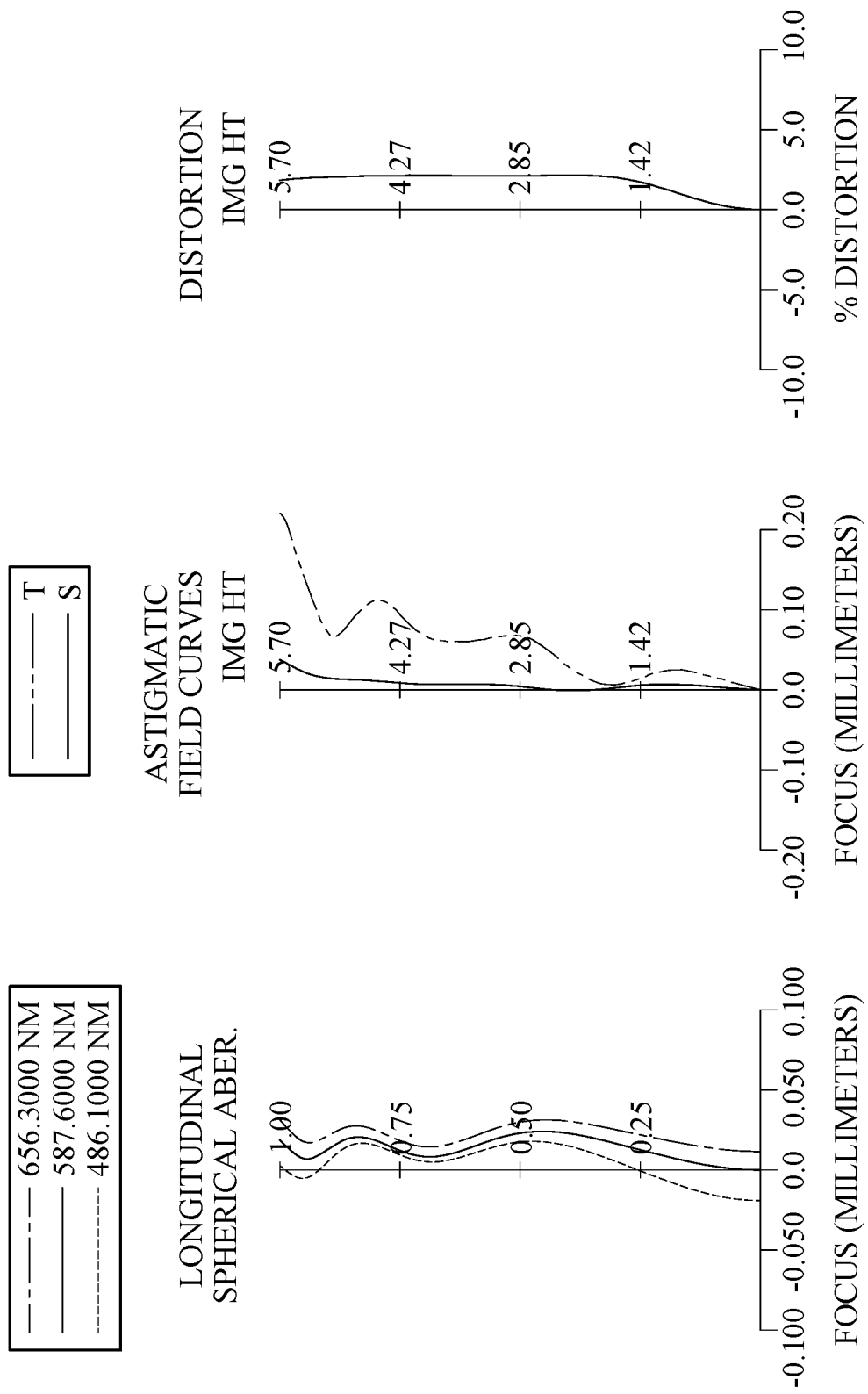
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing lens assembly (its reference numeral is omitted) of the present disclosure and an image sensor 299. The photographing lens assembly includes, in order from an object side to an image side, an aperture stop 200, a first lens element 210, a second lens element 220, a stop 201, a third lens element 230, a stop 202, a fourth lens element 240, a fifth lens element 250, a sixth lens element 260, a seventh lens element 270, an eighth lens element 280, an IR-cut filter 290 and an image surface 295. The photographing lens assembly includes eight lens elements (210, 220, 230, 240, 250, 260, 270 and 280) with no additional lens element disposed between each of the adjacent eight lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric. The image-side surface 212 of the first lens element 210 has one inflection point.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has two inflection points and one critical point in an off-axis region thereof. The image-side surface 232 of the third lens element 230 has two inflection points and two critical points in an off-axis region thereof.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric. The object-side surface 241 of the fourth lens element 240 has two inflection points and two critical points in an off-axis region thereof. The image-side surface 242 of the fourth lens element 240 has one inflection point.

The fifth lens element 250 with positive refractive power has an object-side surface 251 being planar in a paraxial region thereof and an image-side surface 252 being convex in a paraxial region thereof. The fifth lens element 250 is made of plastic material and has the object-side surface 251 and the image-side surface 252 being both aspheric. The object-side surface 251 of the fifth lens element 250 has three inflection points and one critical point in an off-axis region thereof. The image-side surface 252 of the fifth lens element 250 has fourth inflection points and two critical points in an off-axis region thereof.

The sixth lens element 260 with negative refractive power has an object-side surface 261 being concave in a paraxial region thereof and an image-side surface 262 being concave in a paraxial region thereof. The sixth lens element 260 is made of plastic material and has the object-side surface 261 and the image-side surface 262 being both aspheric. The object-side surface 261 of the sixth lens element 260 has two inflection points and two critical points in an off-axis region thereof. The image-side surface 262 of the sixth lens element 260 has two inflection points and one critical point in an off-axis region thereof.

The seventh lens element 270 with positive refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. The object-side surface 271 of the seventh lens element 270 has two inflection points and one critical point in an off-axis region thereof. The image-side surface 272 of the seventh lens element 270 has two inflection points and one critical point in an off-axis region thereof.

The eighth lens element 280 with negative refractive power has an object-side surface 281 being concave in a paraxial region thereof and an image-side surface 282 being concave in a paraxial region thereof. The eighth lens element 280 is made of plastic material and has the object-side surface 281 and the image-side surface 282 being both aspheric. The object-side surface 281 of the eighth lens element 280 has one inflection point and one critical point in an off-axis region thereof. The image-side surface 282 of the eighth lens element 280 has three inflection points and one critical point in an off-axis region thereof.

The IR-cut filter 290 is made of glass material and located between the eighth lens element 280 and the image surface 295, and will not affect the focal length of the photographing lens assembly. The image sensor 299 is disposed on or near the image surface 295 of the photographing lens assembly.

When a vertical distance between the critical point closest to the optical axis on the object-side surface 241 of the fourth lens element 240 and the optical axis is Yc411, and a vertical distance between the critical point closest to a maximum effective radius position on the object-side surface 241 of the fourth lens element 240 and the optical axis is Yc412, the following condition is satisfied: |Yc412/Yc411|=1.64.

When a vertical distance between the critical point closest to the optical axis on the image-side surface 252 of the fifth lens element 250 and the optical axis is Yc521, and a vertical distance between the critical point closest to a maximum effective radius position on the image-side surface 252 of the fifth lens element 250 and the optical axis is Yc522, the following condition is satisfied: |Yc522/Yc521|=3.47.

When a vertical distance between the critical point closest to the optical axis on the object-side surface 261 of the sixth lens element 260 and the optical axis is Yc611, and a vertical distance between the critical point closest to a maximum effective radius position on the object-side surface 261 of the sixth lens element 260 and the optical axis is Yc612, the following condition is satisfied: |Yc612/Yc611|=4.13.

The detailed optical data of the 2nd embodiment are shown in Table 3 and the aspheric surface data are shown in Table 4 below.

TABLE 3

2nd Embodiment
f = 6.66 mm, Fno = 1.58, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.908 | | | | |
| 2 | Lens 1 | 2.841 | (ASP) | 1.264 | Plastic | 1.544 | 56.0 | 5.95 |
| 3 | | 19.635 | (ASP) | 0.035 | | | | |
| 4 | Lens 2 | 11.306 | (ASP) | 0.259 | Plastic | 1.650 | 21.8 | −14.43 |
| 5 | | 5.078 | (ASP) | 0.428 | | | | |
| 6 | Stop | Plano | | 0.168 | | | | |
| 7 | Lens 3 | 11.034 | (ASP) | 0.313 | Plastic | 1.686 | 18.4 | −54.15 |
| 8 | | 8.409 | (ASP) | 0.101 | | | | |
| 9 | Stop | Plano | | 0.054 | | | | |
| 10 | Lens 4 | 79.224 | (ASP) | 0.618 | Plastic | 1.550 | 49.0 | 21.03 |
| 11 | | −13.503 | (ASP) | 0.123 | | | | |
| 12 | Lens 5 | ∞ | (ASP) | 0.410 | Plastic | 1.544 | 56.0 | 194.54 |
| 13 | | −105.836 | (ASP) | 0.569 | | | | |
| 14 | Lens 6 | −62.361 | (ASP) | 0.466 | Plastic | 1.559 | 40.4 | −15.18 |
| 15 | | 9.845 | (ASP) | 0.051 | | | | |
| 16 | Lens 7 | 2.208 | (ASP) | 0.539 | Plastic | 1.544 | 56.0 | 7.02 |
| 17 | | 4.786 | (ASP) | 1.160 | | | | |
| 18 | Lens 8 | −10.690 | (ASP) | 0.553 | Plastic | 1.544 | 56.0 | −5.90 |
| 19 | | 4.666 | (ASP) | 0.450 | | | | |
| 20 | IR-cut Filter | Plano | | 0.210 | Glass | 1.517 | 64.2 | — |
| 21 | | Plano | | 0.321 | | | | |
| 22 | Image | Plano | | 0.000 | | | | |

Note:
Reference wavelength is 587.6 nm (d-line).
An effective radius of the stop 201 (Surface 6) is 1.800 mm.
An effective radius of the stop 202 (Surface 9) is 1.980 mm.
An effective radius of the object-side surface 261 (Surface 14) is 2.500 mm.

TABLE 4

Aspheric Coefficients

| Surface # | 2 | 3 | 4 | 5 | 7 |
|---|---|---|---|---|---|
| k = | 5.4720E−03 | 5.2868E+00 | 5.9462E+00 | 3.1103E−01 | 1.0872E+01 |
| A4 = | −1.6425E−03 | −1.6114E−02 | −1.9928E−02 | −6.6451E−03 | −2.1774E−02 |
| A6 = | 2.3585E−03 | 1.4588E−02 | 1.5089E−02 | 6.4721E−03 | −7.5141E−03 |
| A8 = | −1.5689E−03 | −6.2291E−03 | −5.1354E−03 | −4.1564E−03 | 6.9861E−03 |
| A10 = | 6.3668E−04 | 1.3899E−03 | 8.3183E−04 | 2.2968E−03 | −4.6910E−03 |
| A12 = | −1.5572E−04 | −1.4131E−04 | −1.2176E−05 | −7.0814E−04 | 1.4346E−03 |
| A14 = | 2.1748E−05 | 3.8695E−06 | −4.0489E−06 | 9.5719E−05 | −1.4856E−04 |
| A16 = | −1.4494E−06 | — | — | — | — |

| Surface # | 8 | 10 | 11 | 12 | 13 |
|---|---|---|---|---|---|
| k = | 6.9434E+00 | 0.0000E+00 | 2.7761E+01 | 0.0000E+00 | 2.9321E+01 |
| A4 = | −1.2543E−02 | 1.5868E−02 | 6.4401E−02 | 8.8360E−02 | 3.6623E−02 |
| A6 = | −1.9225E−02 | −3.8438E−02 | −9.8805E−02 | −1.1582E−01 | −4.0316E−02 |
| A8 = | 1.9039E−02 | 3.8107E−02 | 7.0408E−02 | 6.9777E−02 | 1.4267E−02 |
| A10 = | −1.0814E−02 | −2.0612E−02 | −2.8898E−02 | −2.3942E−02 | −8.9895E−04 |
| A12 = | 3.0119E−03 | 5.8434E−03 | 6.6987E−03 | 4.3434E−03 | −1.0400E−03 |
| A14 = | −3.2384E−04 | −8.0461E−04 | −8.1795E−04 | −3.5175E−04 | 3.4254E−04 |
| A16 = | 5.4063E−06 | 4.2587E−05 | 4.1594E−05 | 7.1215E−06 | −4.1619E−05 |
| A18 = | — | — | — | — | 1.7932E−06 |

| Surface # | 14 | 15 | 16 | 17 | 18 |
|---|---|---|---|---|---|
| k = | 0.0000E+00 | 2.1145E+00 | −1.0000E+00 | 0.0000E+00 | 0.0000E+00 |
| A4 = | 4.2289E−02 | −2.6927E−02 | −4.1678E−02 | 3.4946E−02 | −3.8270E−02 |
| A6 = | −2.7400E−02 | −3.3306E−04 | 2.9611E−03 | −2.9271E−02 | 2.0882E−03 |
| A8 = | 8.8060E−03 | 4.7378E−03 | −1.6791E−03 | 7.9017E−03 | 3.5181E−04 |
| A10 = | −2.5439E−03 | −3.9829E−03 | −3.8033E−06 | −1.3345E−03 | 4.2782E−07 |
| A12 = | 6.2218E−04 | 1.5816E−03 | 1.9829E−04 | 1.5571E−04 | −9.8171E−06 |
| A14 = | −1.0614E−04 | −3.4606E−04 | −5.3889E−05 | −1.2936E−05 | 1.2369E−06 |
| A16 = | 9.8176E−06 | 4.2986E−05 | 6.2934E−06 | 7.3673E−07 | −7.0336E−08 |
| A18 = | −3.5336E−07 | −2.8463E−06 | −3.4691E−07 | −2.5174E−08 | 1.9949E−09 |
| A20 = | — | 7.8081E−08 | 7.3577E−09 | 3.7763E−10 | −2.2977E−11 |

| Surface # | 19 |
|---|---|
| k = | −7.8182E−01 |
| A4 = | −3.9717E−02 |
| A6 = | 5.3102E−03 |
| A8 = | −7.0552E−04 |
| A10 = | 7.9120E−05 |
| A12 = | −5.4382E−06 |
| A14 = | 1.7289E−07 |
| A16 = | 2.7955E−10 |
| A18 = | −1.5217E−10 |
| A20 = | 2.6284E−12 |

In the 2nd embodiment, the equation of the aspheric surface profiles of the aforementioned lens elements is the same as the equation of the 1st embodiment. Also, except for the Yc411, Yc412, Yc521, Yc522, Yc611 and Yc612 mentioned in this embodiment, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.66 | Yc62 [mm] | 1.04 |
| Fno | 1.58 | Yc72 [mm] | 1.83 |
| HFOV [deg.] | 40.0 | Yc82 [mm] | 1.38 |
| Fno/tan(HFOV) | 1.88 | R14/R15 | −0.45 |
| V1/N1 | 36.26 | f/R12 + f/R14 + f/R16 | 3.49 |
| V2/N2 | 13.21 | f7/f8 | −1.19 |
| V3/N3 | 10.90 | |f8/f1| | 0.99 |
| V4/N4 | 31.61 | |f8/f2| | 0.41 |
| V5/N5 | 36.26 | |f8/f3| | 0.11 |
| V6/N6 | 25.95 | |f8/f4| | 0.28 |
| V7/N7 | 36.26 | |f8/f5| | 0.03 |
| V8/N8 | 36.26 | |f8/f6| | 0.39 |
| (V3 − V6)/(V3 + V6) | −0.37 | |f8/f7| | 0.84 |
| CT1/MaxCT28 | 2.05 | |f/f1| | 1.12 |
| T78/T12 | 33.14 | |f/f2| | 0.46 |
| T78/T23 | 1.95 | |f/f3| | 0.12 |
| T78/T34 | 7.48 | |f/f4| | 0.32 |
| T78/T45 | 9.43 | |f/f5| | 0.03 |
| T78/T56 | 2.04 | |f/f6| | 0.44 |
| T78/T67 | 22.75 | |f/f7| | 0.95 |
| T78/(CT7 + CT8) | 1.06 | |f/f8| | 1.13 |
| T78/BL | 1.18 | f12/f345 | 0.30 |
| ΣAT/(T23 + T56 + T78) | 1.16 | f/f678 | −0.45 |
| Dr5r10/Dr1r16 | 0.58 | |Yc322/Yc321| | 1.51 |
| EPD/Dr5r10 | 2.60 | |Yc412/Yc411| | 1.64 |
| TL/ImgH | 1.42 | |Yc522/Yc521| | 3.47 |
| ImgH/BL | 5.81 | |Yc612/Yc611| | 4.13 |

3rd Embodiment

Figure 5:
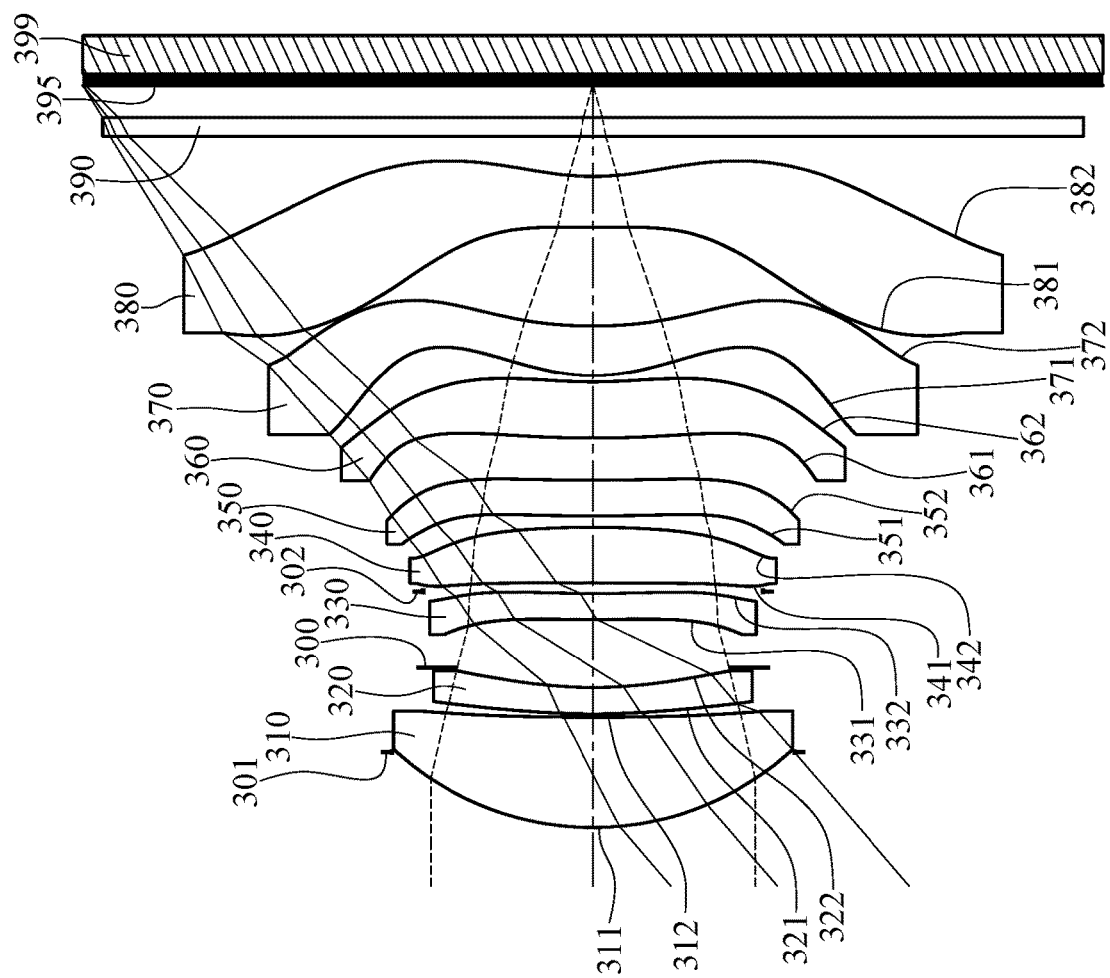
FIG. 5 is a schematic view of an image capturing unit according to the 3rd embodiment of the present disclosure.
Figure 6:
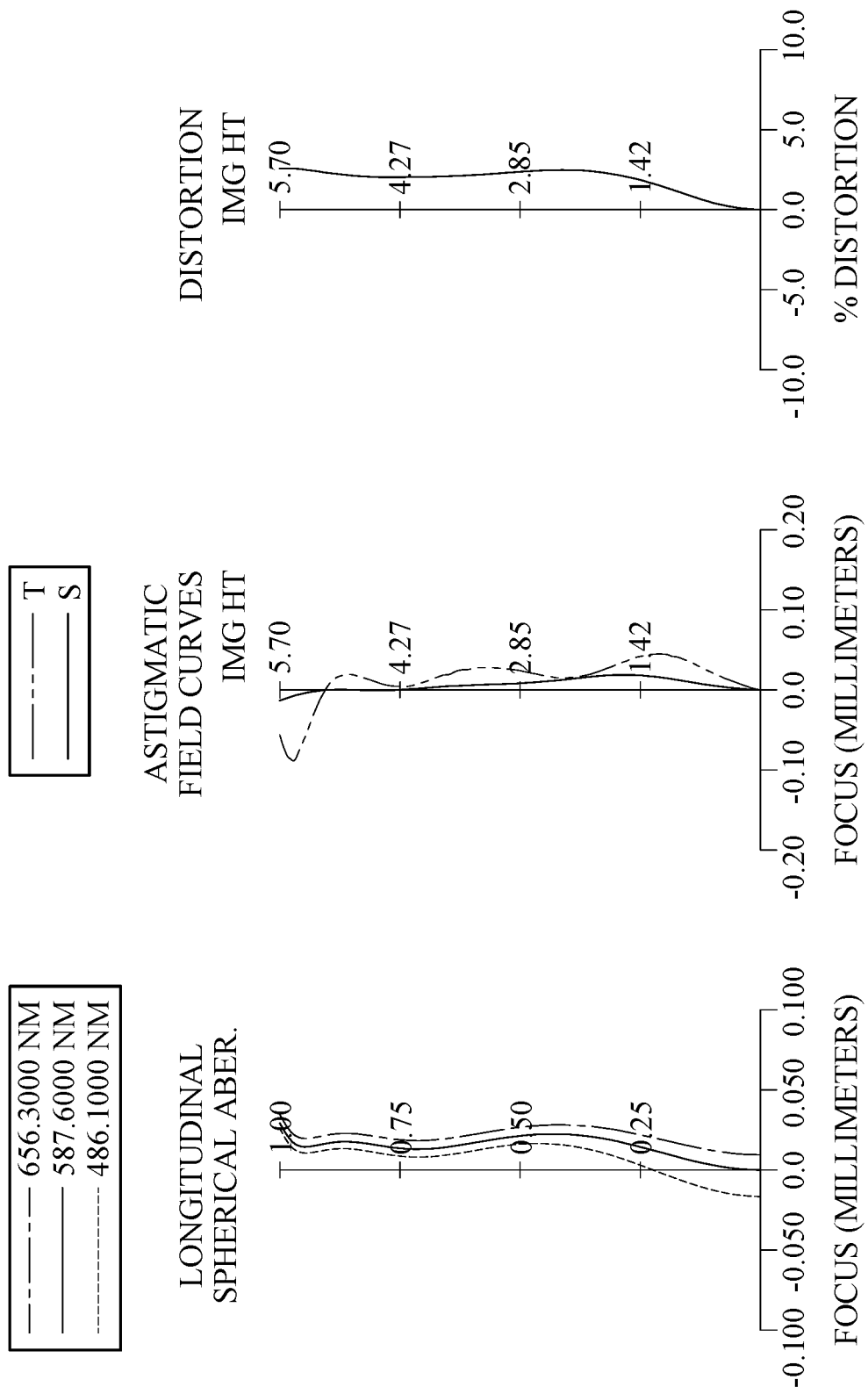
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing lens assembly (its reference numeral is omitted) of the present disclosure and an image sensor 399. The photographing lens assembly includes, in order from an object side to an image side, a stop 301, a first lens element 310, a second lens element 320, an aperture stop 300, a third lens element 330, a stop 302, a fourth lens element 340, a fifth lens element 350, a sixth lens element 360, a seventh lens element 370, an eighth lens element 380, an IR-cut filter 390 and an image surface 395. The photographing lens assembly includes eight lens elements (310, 320, 330, 340, 350, 360, 370 and 380) with no additional lens element disposed between each of the adjacent eight lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has one inflection point and one critical point in an off-axis region thereof. The image-side surface 332 of the third lens element 330 has three inflection points and one critical point in an off-axis region thereof.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has three inflection points and one critical point in an off-axis region thereof. The image-side surface 342 of the fourth lens element 340 has one inflection point and one critical point in an off-axis region thereof.

The fifth lens element 350 with negative refractive power has an object-side surface 351 being concave in a paraxial region thereof and an image-side surface 352 being concave in a paraxial region thereof. The fifth lens element 350 is made of plastic material and has the object-side surface 351 and the image-side surface 352 being both aspheric. The object-side surface 351 of the fifth lens element 350 has two inflection points and two critical points in an off-axis region thereof. The image-side surface 352 of the fifth lens element 350 has one inflection point and one critical point in an off-axis region thereof.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The object-side surface 361 of the sixth lens element 360 has two inflection points and one critical point in an off-axis region thereof. The image-side surface 362 of the sixth lens element 360 has one inflection point and one critical point in an off-axis region thereof.

The seventh lens element 370 with positive refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. The object-side surface 371 of the seventh lens element 370 has two inflection points and one critical point in an off-axis region thereof. The image-side surface 372 of the seventh lens element 370 has two inflection points and one critical point in an off-axis region thereof.

The eighth lens element 380 with negative refractive power has an object-side surface 381 being convex in a paraxial region thereof and an image-side surface 382 being concave in a paraxial region thereof. The eighth lens element 380 is made of plastic material and has the object-side surface 381 and the image-side surface 382 being both aspheric. The object-side surface 381 of the eighth lens element 380 has two inflection points and two critical points in an off-axis region thereof. The image-side surface 382 of the eighth lens element 380 has two inflection points and one critical point in an off-axis region thereof.

The IR-cut filter 390 is made of glass material and located between the eighth lens element 380 and the image surface 395, and will not affect the focal length of the photographing lens assembly. The image sensor 399 is disposed on or near the image surface 395 of the photographing lens assembly.

When a vertical distance between the critical point closest to the optical axis on the object-side surface 381 of the eighth lens element 380 and the optical axis is Yc811, and a vertical distance between the critical point closest to a maximum effective radius position on the object-side surface 381 of the eighth lens element 380 and the optical axis is Yc812, the following condition is satisfied: |Yc812/Yc811|=12.77.

The detailed optical data of the 3rd embodiment are shown in Table 5 and the aspheric surface data are shown in Table 6 below.

TABLE 5

3rd Embodiment
f = 6.46 mm, Fno = 1.78, HFOV = 40.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Stop | Plano | −0.844 | | | | |

TABLE 5-continued

3rd Embodiment
f = 6.46 mm, Fno = 1.78, HFOV = 40.6 deg.

| Surface # | | Curvature Radius | | Thickness | Material | Index | Abbe # | Focal Length |
|---|---|---|---|---|---|---|---|---|
| 2 | Lens 1 | 3.289 | (ASP) | 1.234 | Plastic | 1.545 | 56.0 | 6.80 |
| 3 | | 25.399 | (ASP) | 0.035 | | | | |
| 4 | Lens 2 | 7.442 | (ASP) | 0.295 | Plastic | 1.655 | 17.5 | −21.97 |
| 5 | | 4.828 | (ASP) | 0.223 | | | | |
| 6 | Ape. Stop | Plano | | 0.546 | | | | |
| 7 | Lens 3 | 27.857 | (ASP) | 0.288 | Plastic | 1.655 | 17.5 | −43.44 |
| 8 | | 14.018 | (ASP) | 0.023 | | | | |
| 9 | Stop | Plano | | 0.098 | | | | |
| 10 | Lens 4 | −185.687 | (ASP) | 0.622 | Plastic | 1.544 | 55.9 | 16.35 |
| 11 | | −8.492 | (ASP) | 0.128 | | | | |
| 12 | Lens 5 | −71.936 | (ASP) | 0.400 | Plastic | 1.544 | 55.9 | −76.89 |
| 13 | | 100.000 | (ASP) | 0.471 | | | | |
| 14 | Lens 6 | 15.527 | (ASP) | 0.626 | Plastic | 1.550 | 48.5 | −16.09 |
| 15 | | 5.556 | (ASP) | 0.072 | | | | |
| 16 | Lens 7 | 2.184 | (ASP) | 0.557 | Plastic | 1.544 | 55.9 | 6.27 |
| 17 | | 5.536 | (ASP) | 1.104 | | | | |
| 18 | Lens 8 | 43.170 | (ASP) | 0.566 | Plastic | 1.534 | 55.9 | −5.67 |
| 19 | | 2.816 | (ASP) | 0.450 | | | | |
| 20 | IR-cut Filter | Plano | | 0.210 | Glass | 1.517 | 64.2 | — |
| 21 | | Plano | | 0.357 | | | | |
| 22 | Image | Plano | | 0.000 | | | | |

Note:
Reference wavelength is 587.6 nm (d-line).
An effective radius of the stop 301 (Surface 1) is 2.250 mm.
An effective radius of the stop 302 (Surface 9) is 1.900 mm.
An effective radius of the object-side surface 361 (Surface 14) is 2.500 mm.

TABLE 6

Aspheric Coefficients

| Surface # | 2 | 3 | 4 | 5 | 7 |
|---|---|---|---|---|---|
| k = | 3.5499E−02 | 8.4220E+01 | −1.1829E+01 | −5.2971E+00 | −7.0704E+01 |
| A4 = | −1.3739E−03 | −1.4006E−02 | −2.1892E−02 | −1.0387E−02 | −2.2644E−02 |
| A6 = | 1.8512E−03 | 1.3010E−02 | 1.4881E−02 | 5.1849E−03 | −7.1821E−03 |
| A8 = | −1.3982E−03 | −5.5770E−03 | −5.2367E−03 | −3.4064E−03 | 6.3214E−03 |
| A10 = | 6.0076E−04 | 1.2543E−03 | 7.5242E−04 | 1.9551E−03 | −4.1481E−03 |
| A12 = | −1.4223E−04 | −1.4700E−04 | 7.7772E−06 | −7.0422E−04 | 1.3440E−03 |
| A14 = | 1.7758E−05 | 7.1938E−06 | −7.0072E−06 | 1.0431E−04 | −1.5447E−04 |
| A16 = | −9.4495E−07 | — | — | — | — |

| Surface # | 8 | 10 | 11 | 12 | 13 |
|---|---|---|---|---|---|
| k = | −1.7005E+00 | 0.0000E+00 | 1.1553E+01 | 0.0000E+00 | −9.0000E+01 |
| A4 = | −1.3172E−02 | 1.3600E−02 | 5.9928E−02 | 8.3962E−02 | 3.4499E−02 |
| A6 = | −1.8067E−02 | −3.6152E−02 | −9.3969E−02 | −1.1012E−01 | −4.2740E−02 |
| A8 = | 1.7988E−02 | 3.5594E−02 | 6.5826E−02 | 6.5073E−02 | 1.8587E−02 |
| A10 = | −9.8263E−03 | −1.8817E−02 | −2.6418E−02 | −2.1898E−02 | −3.7023E−03 |
| A12 = | 2.6935E−03 | 5.2419E−03 | 5.9990E−03 | 3.8943E−03 | −5.5741E−05 |
| A14 = | −2.8856E−04 | −7.0951E−04 | −7.1854E−04 | −3.0933E−04 | 1.4562E−04 |
| A16 = | 3.6319E−06 | 3.6943E−05 | 3.6767E−05 | 5.9537E−06 | −2.1607E−05 |
| A18 = | — | — | — | — | 1.0040E−06 |

| Surface # | 14 | 15 | 16 | 17 | 18 |
|---|---|---|---|---|---|
| k = | 0.0000E+00 | −1.4183E+01 | −1.0000E+00 | 0.0000E+00 | 0.0000E+00 |
| A4 = | 1.2613E−02 | −5.9007E−02 | −5.2477E−02 | 3.4483E−02 | −6.8533E−02 |
| A6 = | −1.1667E−02 | 2.1006E−02 | 1.4360E−02 | −2.2729E−02 | 8.5322E−03 |
| A8 = | 1.4150E−03 | −6.7581E−03 | −7.3962E−03 | 5.5508E−03 | 5.9449E−04 |
| A10 = | 7.5484E−04 | 9.6601E−04 | 2.1060E−03 | −8.8198E−04 | −2.6426E−04 |
| A12 = | −3.6001E−04 | 1.6745E−04 | −3.6061E−04 | 9.6051E−05 | 3.2119E−05 |
| A14 = | 6.4517E−05 | −9.4777E−05 | 3.6224E−05 | −6.9966E−06 | −2.1049E−06 |
| A16 = | −5.9144E−06 | 1.6132E−05 | −1.8511E−06 | 3.1937E−07 | 8.0089E−08 |
| A18 = | 2.4121E−07 | −1.2546E−06 | 3.0798E−08 | −7.9928E−09 | −1.6694E−09 |
| A20 = | — | 3.7669E−08 | 3.7561E−10 | 7.9227E−11 | 1.4793E−11 |

TABLE 6-continued

| Aspheric Coefficients | |
|---|---|
| Surface # | 19 |
| k = | −8.0930E−01 |
| A4 = | −6.8066E−02 |
| A6 = | 1.3917E−02 |
| A8 = | −2.2089E−03 |
| A10 = | 2.3940E−04 |
| A12 = | −1.6918E−05 |
| A14 = | 7.6339E−07 |
| A16 = | −2.1198E−08 |
| A18 = | 3.3113E−10 |
| A20 = | −2.2448E−12 |

In the 3rd embodiment, the equation of the aspheric surface profiles of the aforementioned lens elements is the same as the equation of the 1st embodiment. Also, except for the Yc811 and Yc812 mentioned in this embodiment, the definitions of these parameters shown in the following table are the same as those stated in the 1st and 2nd embodiments with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 6.46 | ImgH/BL | 5.60 |
| Fno | 1.78 | Yc62 [mm] | 0.99 |
| HFOV [deg.] | 40.6 | Yc72 [mm] | 2.01 |
| Fno/tan(HFOV) | 2.08 | Yc82 [mm] | 1.62 |
| V1/N1 | 36.27 | R14/R15 | 0.13 |
| V2/N2 | 10.57 | f/R12 + f/R14 + f/R16 | 4.62 |
| V3/N3 | 10.57 | f7/f8 | −1.11 |
| V4/N4 | 36.23 | |f8/f1| | 0.83 |
| V5/N5 | 36.23 | |f8/f2| | 0.26 |
| V6/N6 | 31.29 | |f8/f3| | 0.13 |
| V7/N7 | 36.23 | |f8/f4| | 0.35 |
| V8/N8 | 36.46 | |f8/f5| | 0.07 |
| (V3 − V6)/(V3 + V6) | −0.47 | |f8/f6| | 0.35 |
| CT1/MaxCT28 | 1.97 | |f8/f7| | 0.90 |
| T78/T12 | 31.54 | |f/f1| | 0.95 |
| T78/T23 | 1.44 | |f/f2| | 0.29 |
| T78/T34 | 9.12 | |f/f3| | 0.15 |
| T78/T45 | 8.63 | |f/f4| | 0.39 |
| T78/T56 | 2.34 | |f/f5| | 0.08 |
| T78/T67 | 15.33 | |f/f6| | 0.40 |
| T78/(CT7 + CT8) | 0.98 | |f/f7| | 1.03 |
| T78/BL | 1.09 | |f/f8| | 1.14 |
| ΣAT/(T23 + T56 + T78) | 1.15 | f12/f345 | 0.23 |
| Dr5r10/Dr11r16 | 0.53 | f/f678 | −0.29 |
| EPD/Dr5r10 | 2.33 | |Yc512/Yc511| | 4.83 |
| TL/ImgH | 1.46 | |Yc812/Yc811| | 12.77 |

4th Embodiment

Figure 7:
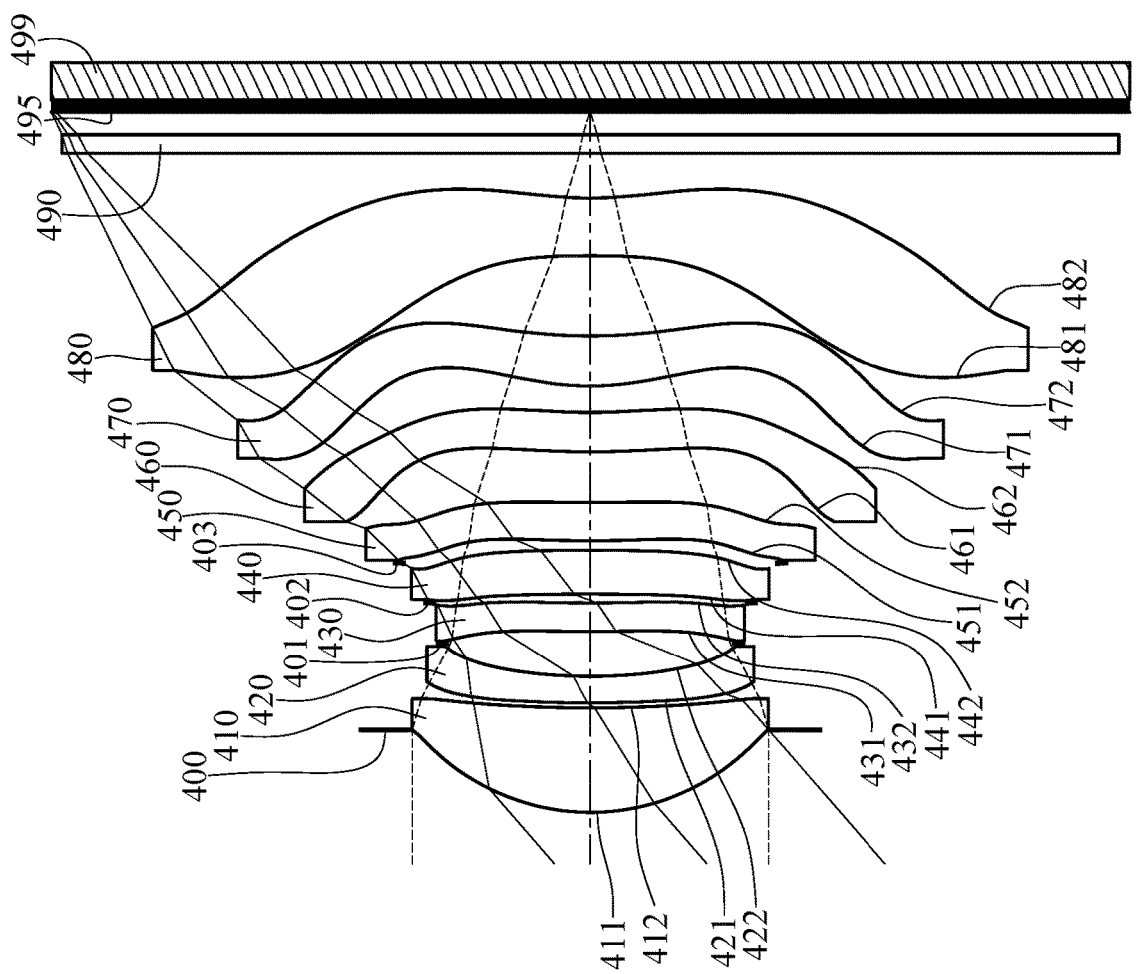
FIG. 7 is a schematic view of an image capturing unit according to the 4th embodiment of the present disclosure.
Figure 8:
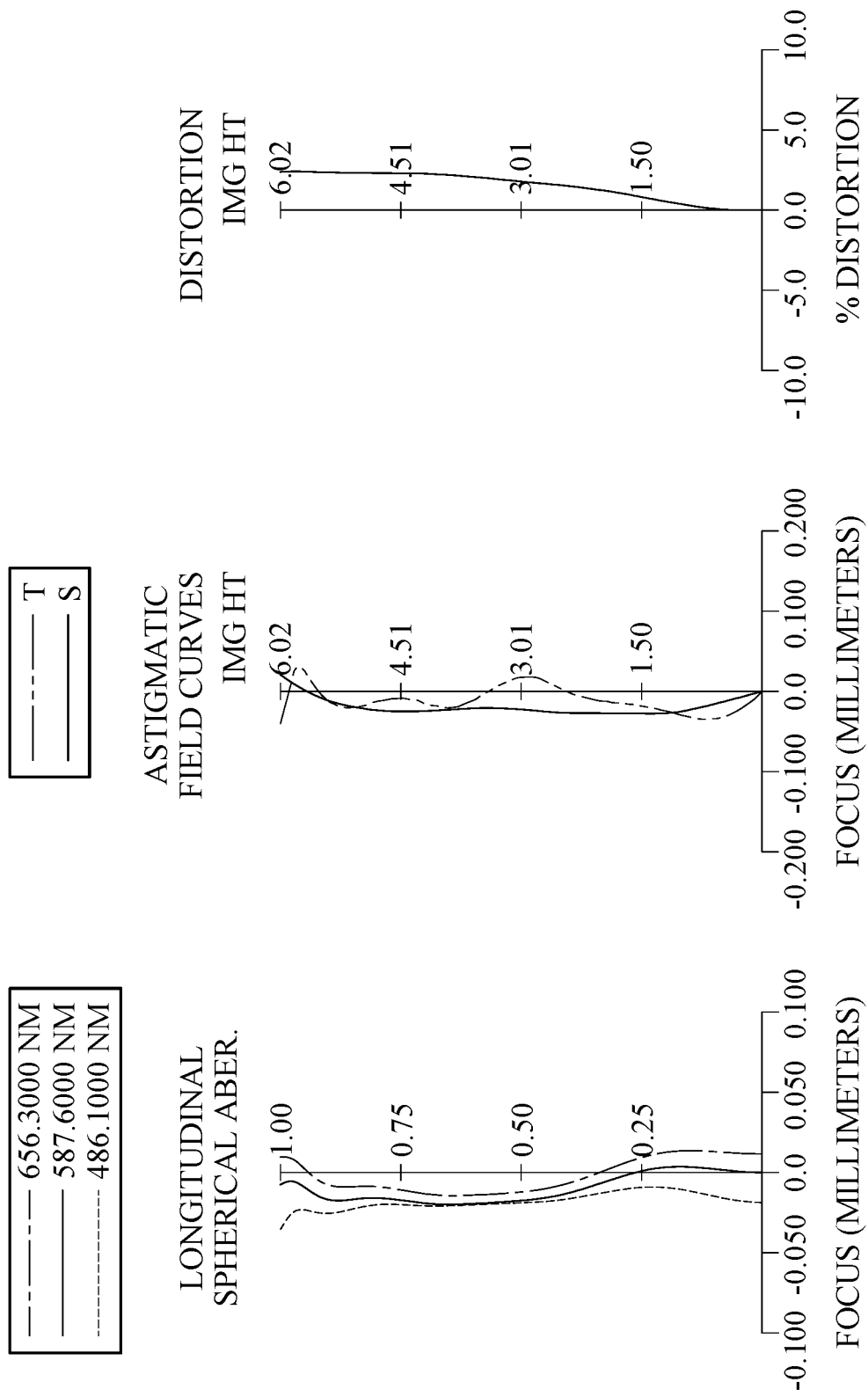
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing lens assembly (its reference numeral is omitted) of the present disclosure and an image sensor 499. The photographing lens assembly includes, in order from an object side to an image side, an aperture stop 400, a first lens element 410, a second lens element 420, a stop 401, a third lens element 430, a stop 402, a fourth lens element 440, a stop 403, a fifth lens element 450, a sixth lens element 460, a seventh lens element 470, an eighth lens element 480, an IR-cut filter 490 and an image surface 495. The photographing lens assembly includes eight lens elements (410, 420, 430, 440, 450, 460, 470 and 480) with no additional lens element disposed between each of the adjacent eight lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has one inflection point. The image-side surface 412 of the first lens element 410 has one inflection point and one critical point in an off-axis region thereof.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has one inflection point and one critical point in an off-axis region thereof. The image-side surface 432 of the third lens element 430 has two inflection points and two critical points in an off-axis region thereof.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric. The object-side surface 441 of the fourth lens element 440 has two inflection points and one critical point in an off-axis region thereof. The image-side surface 442 of the fourth lens element 440 has two inflection points and one critical point in an off-axis region thereof.

The fifth lens element 450 with positive refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has three inflection points and one critical point in an off-axis region thereof. The image-side surface 452 of the fifth lens element 450 has four inflection points and one critical point in an off-axis region thereof.

The sixth lens element 460 with negative refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The object-side surface 461 of the sixth lens element 460 has two inflection points and one critical point in an off-axis region thereof. The image-side surface 462 of the sixth lens element 460 has two inflection points and one critical point in an off-axis region thereof.

The seventh lens element 470 with positive refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. The object-side surface 471 of the seventh lens element 470 has three inflection points and two critical points in an off-axis region thereof. The image-side surface 472 of the seventh lens element 470 has three inflection points and two critical points in an off-axis region thereof.

The eighth lens element 480 with negative refractive power has an object-side surface 481 being concave in a paraxial region thereof and an image-side surface 482 being concave in a paraxial region thereof. The eighth lens element 480 is made of plastic material and has the object-side surface 481 and the image-side surface 482 being both aspheric. The object-side surface 481 of the eighth lens element 480 has two inflection points and one critical point in an off-axis region thereof. The image-side surface 482 of the eighth lens element 480 has three inflection points and one critical point in an off-axis region thereof.

The IR-cut filter 490 is made of glass material and located between the eighth lens element 480 and the image surface 495, and will not affect the focal length of the photographing lens assembly. The image sensor 499 is disposed on or near the image surface 495 of the photographing lens assembly.

When a vertical distance between the critical point closest to the optical axis on the object-side surface 471 of the seventh lens element 470 and the optical axis is Yc711, and a vertical distance between the critical point closest to a maximum effective radius position on the object-side surface 471 of the seventh lens element 470 and the optical axis is Yc712, the following condition is satisfied: |Yc712/Yc711|=2.22.

When a vertical distance between the critical point closest to the optical axis on the image-side surface 472 of the seventh lens element 470 and the optical axis is Yc721, and a vertical distance between the critical point closest to a maximum effective radius position on the image-side surface 472 of the seventh lens element 470 and the optical axis is Yc722, the following condition is satisfied: |Yc722/Yc721|=2.21.

The detailed optical data of the 4th embodiment are shown in Table 7 and the aspheric surface data are shown in Table 8 below.

TABLE 7

4th Embodiment
f = 6.77 mm, Fno = 1.70, HFOV = 41.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.924 | | | | |
| 2 | Lens 1 | 2.566 | (ASP) | 1.166 | Plastic | 1.545 | 56.1 | 5.64 |
| 3 | | 13.033 | (ASP) | 0.057 | | | | |
| 4 | Lens 2 | 12.834 | (ASP) | 0.300 | Plastic | 1.686 | 18.4 | −15.55 |
| 5 | | 5.770 | (ASP) | 0.382 | | | | |
| 6 | Stop | Plano | | 0.123 | | | | |
| 7 | Lens 3 | 19.077 | (ASP) | 0.320 | Plastic | 1.686 | 18.4 | −135.77 |
| 8 | | 15.726 | (ASP) | −0.005 | | | | |
| 9 | Stop | Plano | | 0.106 | | | | |
| 10 | Lens 4 | −21.605 | (ASP) | 0.491 | Plastic | 1.544 | 56.0 | 126.10 |
| 11 | | −16.563 | (ASP) | −0.152 | | | | |
| 12 | Stop | Plano | | 0.257 | | | | |
| 13 | Lens 5 | 19.016 | (ASP) | 0.430 | Plastic | 1.544 | 56.0 | 61.72 |
| 14 | | 43.498 | (ASP) | 0.564 | | | | |
| 15 | Lens 6 | 9.638 | (ASP) | 0.440 | Plastic | 1.566 | 37.4 | −29.75 |
| 16 | | 6.028 | (ASP) | 0.293 | | | | |
| 17 | Lens 7 | 2.938 | (ASP) | 0.568 | Plastic | 1.544 | 56.0 | 9.52 |
| 18 | | 6.326 | (ASP) | 0.896 | | | | |
| 19 | Lens 8 | −11.758 | (ASP) | 0.646 | Plastic | 1.534 | 55.9 | −5.67 |
| 20 | | 4.150 | (ASP) | 0.500 | | | | |
| 21 | IR-cut Filter | Plano | | 0.210 | Glass | 1.517 | 64.2 | — |
| 22 | | Plano | | 0.250 | | | | |
| 23 | Image | Plano | | 0.000 | | | | |

Note:
Reference wavelength is 587.6 nm (d-line).
An effective radius of the stop 401 (Surface 6) is 1.611 mm.
An effective radius of the stop 402 (Surface 9) is 1.750 mm.
An effective radius of the stop 403 (Surface 12) is 2.088 mm.

TABLE 8

Aspheric Coefficients

| Surface # | 2 | 3 | 4 | 5 | 7 |
|---|---|---|---|---|---|
| k = | −5.2225E−01 | −8.2028E+01 | 4.0679E+01 | 8.7310E+00 | 3.6049E+01 |
| A4 = | 2.4131E−03 | −1.3979E−02 | −2.3603E−02 | −1.1472E−02 | −3.0660E−02 |
| A6 = | 4.6246E−03 | 1.5929E−02 | 2.5007E−02 | 1.3236E−02 | 1.0129E−03 |
| A8 = | −4.3458E−03 | −6.1078E−03 | −1.2275E−02 | −8.7628E−03 | −2.9842E−04 |
| A10 = | 2.7212E−03 | 2.2296E−04 | 3.1805E−03 | 3.9272E−03 | −1.0596E−03 |
| A12 = | −9.5217E−04 | 5.4301E−04 | −2.7491E−04 | −1.0376E−03 | 1.1155E−03 |
| A14 = | 1.7829E−04 | −1.5312E−04 | −1.5772E−05 | 1.5496E−04 | −2.8072E−04 |
| A16 = | −1.4348E−05 | 1.2309E−05 | 2.7562E−06 | — | 1.6309E−05 |

| Surface # | 8 | 10 | 11 | 13 | 14 |
|---|---|---|---|---|---|
| k = | 2.9000E+01 | 3.3276E+01 | 3.6000E+01 | −5.8231E+01 | 7.0959E+01 |
| A4 = | −1.0066E−02 | 3.9439E−02 | 5.3121E−02 | 3.9976E−02 | 2.4130E−03 |
| A6 = | −4.2986E−02 | −9.9579E−02 | −1.1178E−01 | −1.0231E−01 | −2.5678E−02 |
| A8 = | 6.6479E−02 | 1.4611E−01 | 1.0919E−01 | 8.3369E−02 | 1.0797E−02 |
| A10 = | −6.4441E−02 | −1.3714E−01 | −6.0600E−02 | −3.6958E−02 | 8.6148E−05 |
| A12 = | 3.6303E−02 | 7.6070E−02 | 1.6231E−02 | 6.9150E−03 | −2.0586E−03 |
| A14 = | −1.1137E−02 | −2.4089E−02 | −2.3948E−04 | 6.2921E−04 | 8.8541E−04 |
| A16 = | 1.7414E−03 | 4.0552E−03 | −1.0062E−03 | −5.0812E−04 | −1.6837E−04 |
| A18 = | −1.0858E−04 | −2.8232E−04 | 2.3879E−04 | 8.2807E−05 | 1.5269E−05 |
| A20 = | — | — | −1.7995E−05 | −4.6804E−06 | −5.3657E−07 |

| Surface # | 15 | 16 | 17 | 18 | 19 |
|---|---|---|---|---|---|
| k = | 2.5110E−01 | −9.9000E+01 | −1.2331E+00 | −1.6044E+01 | 4.4442E+00 |
| A4 = | −1.6966E−02 | −1.7617E−02 | −4.0733E−02 | 1.4666E−02 | −4.8623E−02 |
| A6 = | 4.2979E−03 | −5.5215E−04 | 8.2887E−03 | −1.2815E−02 | 9.6165E−03 |
| A8 = | −5.2864E−03 | 8.0386E−04 | −4.4793E−03 | 3.2114E−03 | −1.1311E−03 |
| A10 = | 2.4524E−03 | −4.9758E−04 | 1.4751E−03 | −4.9936E−04 | 1.0943E−04 |
| A12 = | −7.3081E−04 | 1.5321E−04 | −2.9456E−04 | 4.8773E−05 | −8.3371E−06 |
| A14 = | 1.4720E−04 | −2.3201E−05 | 3.5953E−05 | −2.9651E−06 | 4.4170E−07 |
| A16 = | −1.9493E−05 | 1.8169E−06 | −2.5697E−06 | 1.1191E−07 | −1.4758E−08 |
| A18 = | 1.5261E−06 | −7.0795E−08 | 9.8204E−08 | −2.4685E−09 | 2.7757E−10 |
| A20 = | −5.2154E−08 | 1.0853E−09 | −1.5477E−09 | 2.4482E−11 | −2.2403E−12 |

| Surface # | 20 |
|---|---|
| k = | −4.5915E−01 |
| A4 = | −5.1206E−02 |
| A6 = | 1.0506E−02 |
| A8 = | −1.7252E−03 |
| A10 = | 1.9325E−04 |
| A12 = | −1.3918E−05 |
| A14 = | 6.2125E−07 |
| A16 = | −1.6366E−08 |
| A18 = | 2.2995E−10 |
| A20 = | −1.3095E−12 |

In the 4th embodiment, the equation of the aspheric surface profiles of the aforementioned lens elements is the same as the equation of the 1st embodiment. Also, except for the Yc711, Yc712, Yc721 and Yc722 mentioned in this embodiment, the definitions of these parameters shown in the following table are the same as those stated in the 1st to 3rd embodiments with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 6.77 | Yc62 [mm] | 1.08 |
| Fno | 1.70 | Yc72 [mm] | 1.71/3.81 |
| HFOV [deg.] | 41.0 | Yc82 [mm] | 1.45 |
| Fno/tan(HFOV) | 1.95 | R14/R15 | −0.54 |
| V1/N1 | 36.30 | f/R12 + f/R14 + f/R16 | 3.83 |
| V2/N2 | 10.90 | f7/f8 | −1.68 |
| V3/N3 | 10.90 | |f8/f1| | 1.00 |
| V4/N4 | 36.26 | |f8/f2| | 0.36 |
| V5/N5 | 36.26 | |f8/f3| | 0.04 |
| V6/N6 | 23.91 | |f8/f4| | 0.04 |
| V7/N7 | 36.26 | |f8/f5| | 0.09 |
| V8/N8 | 36.46 | |f8/f6| | 0.19 |
| (V3 − V6)/(V3 + V6) | −0.34 | |f8/f7| | 0.60 |
| CT1/MaxCT28 | 1.80 | f/f1 | 1.20 |
| T78/T12 | 15.72 | |f/f2| | 0.44 |
| T78/T23 | 1.77 | |f/f3| | 0.05 |
| T78/T34 | 8.87 | |f/f4| | 0.05 |
| T78/T45 | 8.53 | |f/f5| | 0.11 |
| T78/T56 | 1.59 | |f/f6| | 0.23 |
| T78/T67 | 3.06 | |f/f7| | 0.71 |
| T78/(CT7 + CT8) | 0.74 | |f/f8| | 1.20 |
| T78/BL | 0.93 | f12/f345 | 0.13 |
| ΣAT/(T23 + T56 + T78) | 1.28 | f/f678 | −0.55 |
| Dr5r10/Dr11r16 | 0.51 | |Yc322/Yc321| | 1.93 |
| EPD/Dr5r10 | 2.75 | |Yc712/Yc711| | 2.22 |
| TL/ImgH | 1.30 | |Yc722/Yc721| | 2.21 |
| ImgH/BL | 6.27 | — | — |

5th Embodiment

Figure 9:
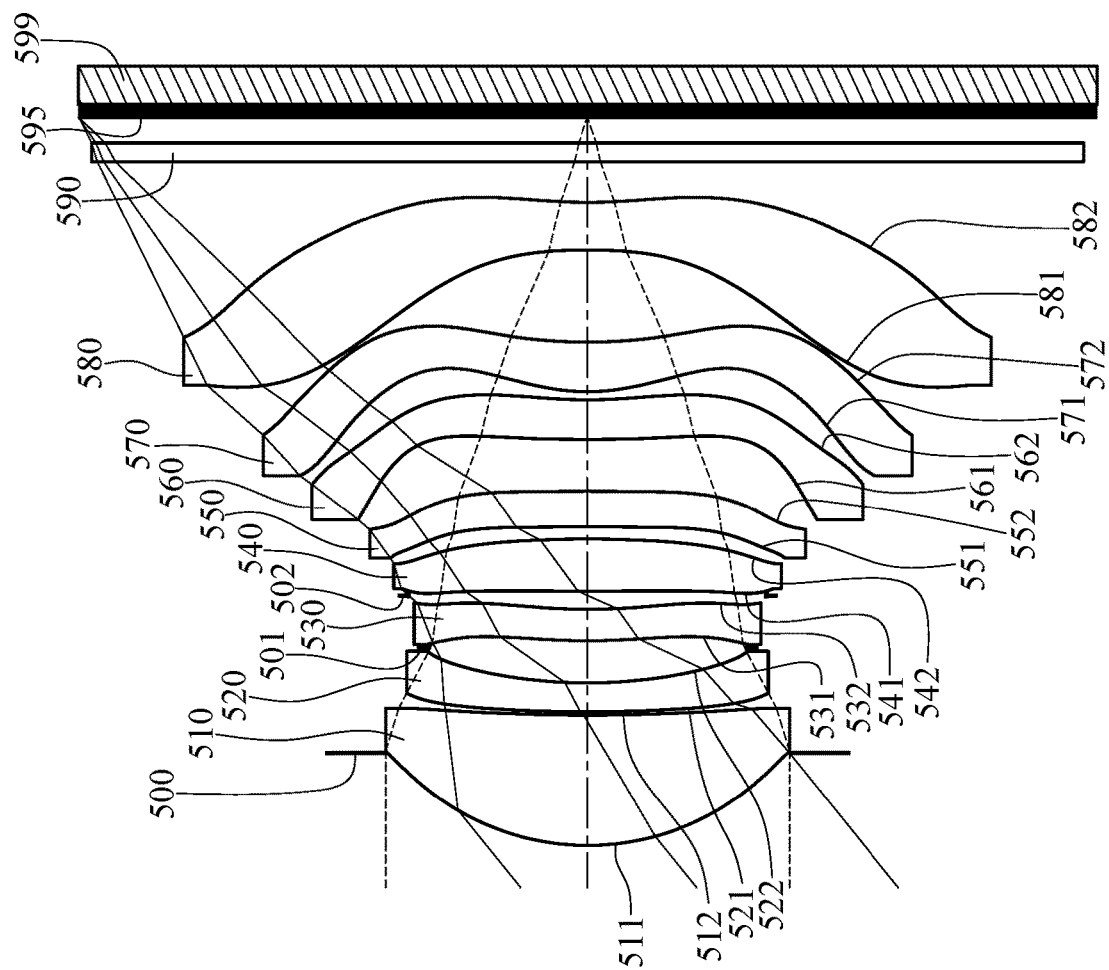
FIG. 9 is a schematic view of an image capturing unit according to the 5th embodiment of the present disclosure.
Figure 10:
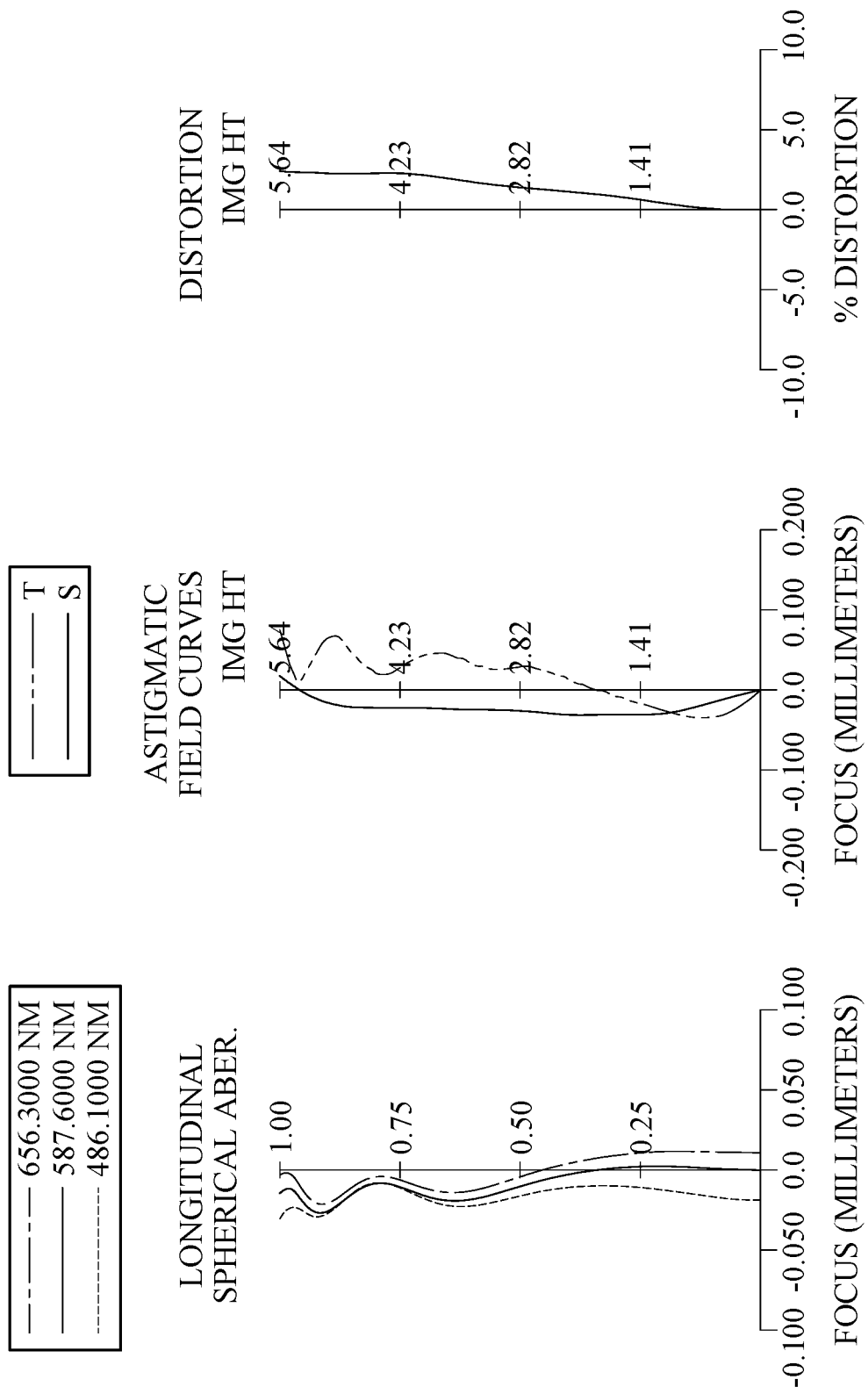
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing lens assembly (its reference numeral is omitted) of the present disclosure and an image sensor 599. The photographing lens assembly includes, in order from an object side to an image side, an aperture stop 500, a first lens element 510, a second lens element 520, a stop 501, a third lens element 530, a stop 502, a fourth lens element 540, a fifth lens element 550, a sixth lens element 560, a seventh lens element 570, an eighth lens element 580, an IR-cut filter 590 and an image surface 595. The photographing lens assembly includes eight lens elements (510, 520, 530, 540, 550, 560, 570 and 580) with no additional lens element disposed between each of the adjacent eight lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has one inflection point. The image-side surface 512 of the first lens element 510 has one inflection point and one critical point in an off-axis region thereof.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The object-side surface 531 of the third lens element 530 has two inflection points and one critical point in an off-axis region thereof. The image-side surface 532 of the third lens element 530 has three inflection points and two critical points in an off-axis region thereof.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric. The object-side surface 541 of the fourth lens element 540 has two inflection points and two critical points in an off-axis region thereof. The image-side surface 542 of the fourth lens element 540 has one inflection point and one critical point in an off-axis region thereof.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The object-side surface 551 of the fifth lens element 550 has fourth inflection points. The image-side surface 552 of the fifth lens element 550 has two inflection points.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The object-side surface 561 of the sixth lens element 560 has two inflection points and one critical point in an off-axis region thereof. The image-side surface 562 of the sixth lens element 560 has three inflection points and one critical point in an off-axis region thereof.

The seventh lens element 570 with positive refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric. The object-side surface 571 of the seventh lens element 570 has two inflection points and one critical point in an off-axis region thereof. The image-side surface 572 of the seventh lens element 570 has two inflection points and one critical point in an off-axis region thereof.

The eighth lens element 580 with negative refractive power has an object-side surface 581 being concave in a paraxial region thereof and an image-side surface 582 being concave in a paraxial region thereof. The eighth lens element 580 is made of plastic material and has the object-side surface 581 and the image-side surface 582 being both aspheric. The object-side surface 581 of the eighth lens element 580 has one inflection point and one critical point in an off-axis region thereof. The image-side surface 582 of the eighth lens element 580 has two inflection points and one critical point in an off-axis region thereof.

The IR-cut filter 590 is made of glass material and located between the eighth lens element 580 and the image surface 595, and will not affect the focal length of the photographing lens assembly. The image sensor 599 is disposed on or near the image surface 595 of the photographing lens assembly.

The detailed optical data of the 5th embodiment are shown in Table 9 and the aspheric surface data are shown in Table 10 below.

TABLE 9

5th Embodiment
f = 6.84 mm, Fno = 1.53, HFOV = 38.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.029 | | | | |
| 2 | Lens 1 | 2.839 | (ASP) | 1.450 | Plastic | 1.545 | 56.1 | 6.03 |
| 3 | | 17.112 | (ASP) | 0.035 | | | | |
| 4 | Lens 2 | 12.624 | (ASP) | 0.320 | Plastic | 1.669 | 19.4 | −14.69 |
| 5 | | 5.470 | (ASP) | 0.383 | | | | |

TABLE 9-continued

5th Embodiment
f = 6.84 mm, Fno = 1.53, HFOV = 38.9 deg.

| Surface # | | Curvature Radius | | Thickness | Material | Index | Abbe # | Focal Length |
|---|---|---|---|---|---|---|---|---|
| 6 | Stop | Plano | | 0.085 | | | | |
| 7 | Lens 3 | 7.392 | (ASP) | 0.350 | Plastic | 1.669 | 19.4 | −107.22 |
| 8 | | 6.574 | (ASP) | 0.152 | | | | |
| 9 | Stop | Plano | | 0.050 | | | | |
| 10 | Lens 4 | 221.507 | (ASP) | 0.575 | Plastic | 1.544 | 56.0 | 15.71 |
| 11 | | −8.879 | (ASP) | 0.136 | | | | |
| 12 | Lens 5 | −14.355 | (ASP) | 0.399 | Plastic | 1.561 | 38.7 | −66.74 |
| 13 | | −23.505 | (ASP) | 0.576 | | | | |
| 14 | Lens 6 | 26.399 | (ASP) | 0.435 | Plastic | 1.569 | 38.8 | −10.22 |
| 15 | | 4.734 | (ASP) | 0.090 | | | | |
| 16 | Lens 7 | 2.217 | (ASP) | 0.551 | Plastic | 1.547 | 51.6 | 5.82 |
| 17 | | 6.649 | (ASP) | 1.019 | | | | |
| 18 | Lens 8 | −6.789 | (ASP) | 0.535 | Plastic | 1.544 | 56.0 | −5.37 |
| 19 | | 5.273 | (ASP) | 0.450 | | | | |
| 20 | IR-cut Filter | Plano | | 0.210 | Glass | 1.517 | 64.2 | — |
| 21 | | Plano | | 0.284 | | | | |
| 22 | Image | Plano | | 0.000 | | | | |

Note:
Reference wavelength is 587.6 nm (d-line).
An effective radius of the stop 501 (Surface 6) is 1.770 mm.
An effective radius of the stop 502 (Surface 9) is 1.980 mm.

TABLE 10

Aspheric Coefficients

| Surface # | 2 | 3 | 4 | 5 | 7 |
|---|---|---|---|---|---|
| k = | 1.3472E−03 | −5.1991E+01 | 7.5250E+00 | 3.6022E−01 | 8.1426E+00 |
| A4 = | −1.7238E−03 | −1.6038E−02 | −1.9028E−02 | −5.9198E−03 | −2.3060E−02 |
| A6 = | 1.9329E−03 | 1.4088E−02 | 1.4115E−02 | 5.4112E−03 | −8.0136E−03 |
| A8 = | −1.2065E−03 | −5.7265E−03 | −4.5578E−03 | −3.0916E−03 | 7.1318E−03 |
| A10 = | 4.6668E−04 | 1.1992E−03 | 6.1855E−04 | 1.7284E−03 | −4.6829E−03 |
| A12 = | −1.1389E−04 | −1.2153E−04 | 1.6060E−05 | −5.7226E−04 | 1.4332E−03 |
| A14 = | 1.6654E−05 | 3.8996E−06 | −5.6998E−06 | 8.6069E−05 | −1.5061E−04 |
| A16 = | −1.1918E−06 | — | — | — | — |

| Surface # | 8 | 10 | 11 | 12 | 13 |
|---|---|---|---|---|---|
| k = | 5.5275E+00 | 0.0000E+00 | −4.5785E−01 | 2.6677E+01 | 5.9644E+01 |
| A4 = | −1.2883E−02 | 1.5527E−02 | 6.6433E−02 | 9.0173E−02 | 3.5014E−02 |
| A6 = | −2.0355E−02 | −3.8987E−02 | −9.9762E−02 | −1.1717E−01 | −4.1017E−02 |
| A8 = | 1.9787E−02 | 3.8901E−02 | 7.2147E−02 | 7.1199E−02 | 1.4656E−02 |
| A10 = | −1.1310E−02 | −2.1000E−02 | −2.9727E−02 | −2.4551E−02 | −1.0937E−03 |
| A12 = | 3.2321E−03 | 5.9658E−03 | 6.9282E−03 | 4.5003E−03 | −9.8483E−04 |
| A14 = | −3.7214E−04 | −8.2584E−04 | −8.5371E−04 | −3.6924E−04 | 3.3552E−04 |
| A16 = | 8.9917E−06 | 4.3988E−05 | 4.3810E−05 | 7.5766E−06 | −4.1007E−05 |
| A18 = | — | — | — | — | 1.7591E−06 |

| Surface # | 14 | 15 | 16 | 17 | 18 |
|---|---|---|---|---|---|
| k = | 0.0000E+00 | −4.5420E+01 | −1.0000E+00 | 0.0000E+00 | 0.0000E+00 |
| A4 = | 2.2621E−02 | −2.6515E−02 | −6.4412E−02 | 2.8901E−02 | −5.0633E−02 |
| A6 = | −2.0224E−02 | 3.6110E−03 | 1.9742E−02 | −1.9417E−02 | 1.2483E−02 |
| A8 = | 7.2844E−03 | −8.0941E−04 | −1.0017E−02 | 2.7569E−03 | −1.9279E−03 |
| A10 = | −2.1511E−03 | −7.5198E−05 | 2.4873E−03 | 1.9552E−04 | 2.2050E−04 |
| A12 = | 4.1899E−04 | 6.4382E−05 | −2.6609E−04 | −1.2442E−04 | −1.7024E−05 |
| A14 = | −5.7559E−05 | −1.3090E−05 | 1.9278E−06 | 1.8910E−05 | 8.2161E−07 |
| A16 = | 5.0281E−06 | 1.6645E−06 | 2.0738E−06 | −1.4380E−06 | −2.2914E−08 |
| A18 = | −1.8752E−07 | −1.2877E−07 | −1.6624E−07 | 5.6012E−08 | 3.1676E−10 |
| A20 = | — | 4.2058E−09 | 4.0632E−09 | −8.8941E−10 | −1.3905E−12 |

| Surface # | 19 |
|---|---|
| k = | −2.2440E+00 |
| A4 = | −5.0491E−02 |
| A6 = | 1.1482E−02 |
| A8 = | −1.9842E−03 |
| A10 = | 2.2972E−04 |

TABLE 10-continued

| Aspheric Coefficients | |
|---|---|
| A12 = | -1.6126E-05 |
| A14 = | 6.1816E-07 |
| A16 = | -9.7751E-09 |
| A18 = | -4.9733E-11 |
| A20 = | 2.3607E-12 |

In the 5th embodiment, the equation of the aspheric surface profiles of the aforementioned lens elements is the same as the equation of the 1st embodiment. Also, the definitions of these parameters shown in the following table are the same as those stated in the 1st to 4th embodiments with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 6.84 | ImgH/BL | 5.98 |
| Fno | 1.53 | Yc62 [mm] | 1.13 |
| HFOV [deg.] | 38.9 | Yc72 [mm] | 1.71 |
| Fno/tan(HFOV) | 1.89 | Yc82 [mm] | 1.19 |
| V1/N1 | 36.30 | R14/R15 | -0.98 |
| V2/N2 | 11.62 | f/R12 + f/R14 + f/R16 | 3.77 |
| V3/N3 | 11.62 | f7/f8 | -1.08 |
| V4/N4 | 36.27 | |f8/f1| | 0.89 |
| V5/N5 | 24.81 | |f8/f2| | 0.37 |
| V6/N6 | 24.74 | |f8/f3| | 0.05 |
| V7/N7 | 33.33 | |f8/f4| | 0.34 |
| V8/N8 | 36.27 | |f8/f5| | 0.08 |
| (V3 − V6)/(V3 + V6) | -0.33 | |f8/f6| | 0.53 |
| CT1/MaxCT28 | 2.52 | |f8/f7| | 0.92 |
| T78/T12 | 29.11 | |f/f1| | 1.13 |
| T78/T23 | 2.18 | |f/f2| | 0.47 |
| T78/T34 | 5.04 | |f/f3| | 0.06 |
| T78/T45 | 7.49 | |f/f4| | 0.44 |
| T78/T56 | 1.77 | |f/f5| | 0.10 |
| T78/T67 | 11.32 | |f/f6| | 0.67 |
| T78/(CT7 + CT8) | 0.94 | |f/f7| | 1.17 |
| T78/BL | 1.08 | |f/f8| | 1.27 |
| ΣAT/(T23 + T56 + T78) | 1.22 | f12/f345 | 0.34 |
| Dr5r10/Dr11r16 | 0.63 | f/f678 | -0.61 |
| EPD/Dr5r10 | 2.69 | |Yc322/Yc321| | 1.32 |
| TL/ImgH | 1.43 | |Yc412/Yc411| | 2.08 |

6th Embodiment

Figure 11:
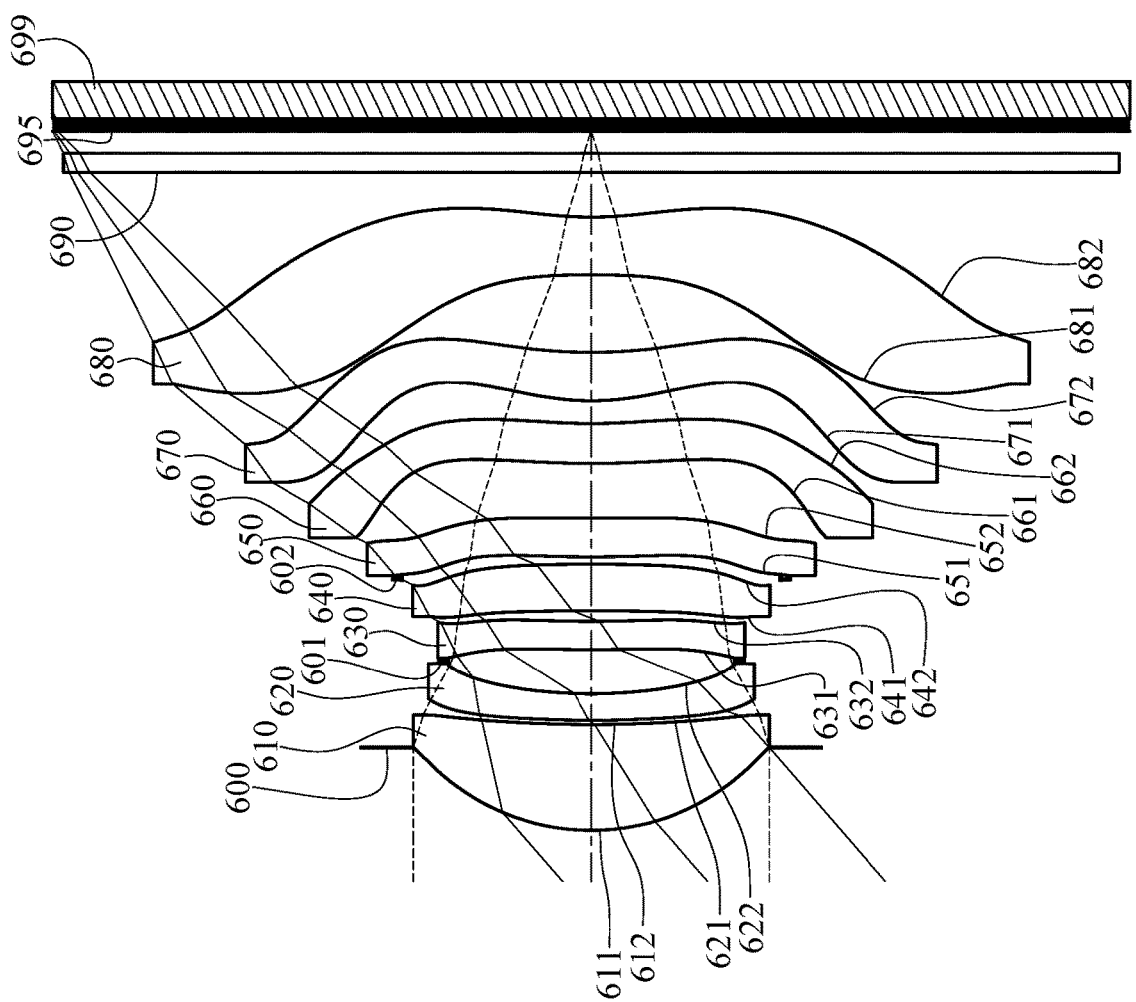
FIG. 11 is a schematic view of an image capturing unit according to the 6th embodiment of the present disclosure.
Figure 12:
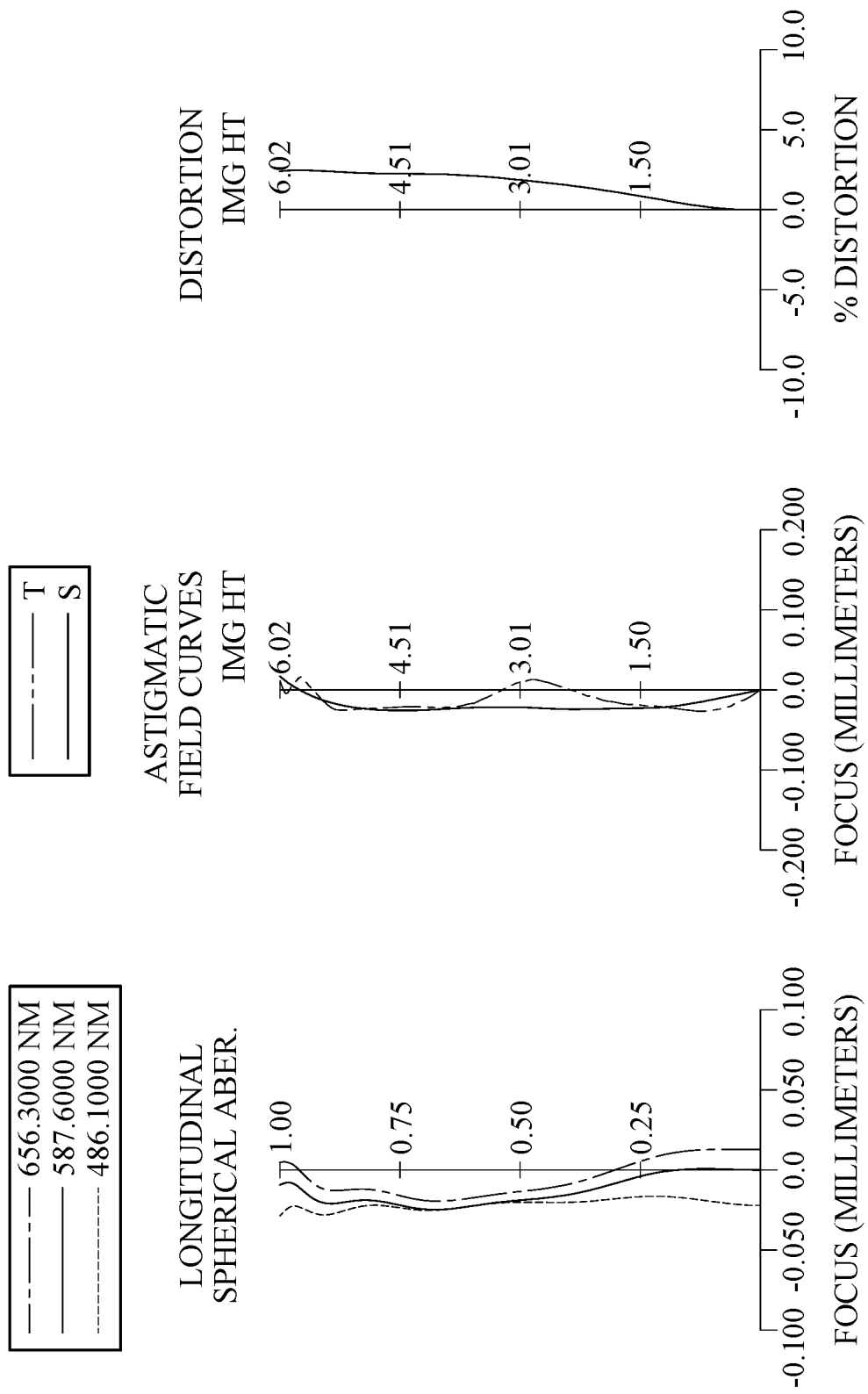
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing lens assembly (its reference numeral is omitted) of the present disclosure and an image sensor 699. The photographing lens assembly includes, in order from an object side to an image side, an aperture stop 600, a first lens element 610, a second lens element 620, a stop 601, a third lens element 630, a fourth lens element 640, a stop 602, a fifth lens element 650, a sixth lens element 660, a seventh lens element 670, an eighth lens element 680, an IR-cut filter 690 and an image surface 695. The photographing lens assembly includes eight lens elements (610, 620, 630, 640, 650, 660, 670 and 680) with no additional lens element disposed between each of the adjacent eight lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. The object-side surface 611 of the first lens element 610 has one inflection point. The image-side surface 612 of the first lens element 610 has one inflection point and one critical point in an off-axis region thereof.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has one inflection point and one critical point in an off-axis region thereof. The image-side surface 632 of the third lens element 630 has two inflection points and two critical points in an off-axis region thereof.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has one inflection point and one critical point in an off-axis region thereof. The image-side surface 642 of the fourth lens element 640 has two inflection points and one critical point in an off-axis region thereof.

The fifth lens element 650 with positive refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. The object-side surface 651 of the fifth lens element 650 has three inflection points and one critical point in an off-axis region thereof. The image-side surface 652 of the fifth lens element 650 has two inflection points and one critical point in an off-axis region thereof.

The sixth lens element 660 with negative refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The object-side surface 661 of the sixth lens element 660 has four inflection points and one critical point in an off-axis region thereof. The image-side surface 662 of the sixth lens element 660 has two inflection points and one critical point in an off-axis region thereof.

The seventh lens element 670 with positive refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. The object-side surface 671 of the seventh lens element 670 has three inflection points and three critical points in an off-axis region thereof. The image-side surface 672 of the seventh lens element 670 has three inflection points and one critical point in an off-axis region thereof.

The eighth lens element 680 with negative refractive power has an object-side surface 681 being concave in a paraxial region thereof and an image-side surface 682 being concave in a paraxial region thereof. The eighth lens element 680 is made of plastic material and has the object-side surface 681 and the image-side surface 682 being both aspheric. The object-side surface 681 of the eighth lens element 680 has two inflection points and one critical point in an off-axis region thereof. The image-side surface 682 of the eighth lens element 680 has three inflection points and one critical point in an off-axis region thereof.

The IR-cut filter 690 is made of glass material and located between the eighth lens element 680 and the image surface 695, and will not affect the focal length of the photographing lens assembly. The image sensor 699 is disposed on or near the image surface 695 of the photographing lens assembly.

The detailed optical data of the 6th embodiment are shown in Table 11 and the aspheric surface data are shown in Table 12 below.

TABLE 11

6th Embodiment
f = 6.78 mm, Fno = 1.70, HFOV = 41.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.972 |  |  |  |  |
| 2 | Lens 1 | 2.571 | (ASP) | 1.184 | Plastic | 1.545 | 56.1 | 5.74 |
| 3 |  | 12.050 | (ASP) | 0.048 |  |  |  |  |
| 4 | Lens 2 | 11.446 | (ASP) | 0.300 | Plastic | 1.686 | 18.4 | −16.24 |
| 5 |  | 5.586 | (ASP) | 0.378 |  |  |  |  |
| 6 | Stop | Plano |  | 0.120 |  |  |  |  |
| 7 | Lens 3 | 15.679 | (ASP) | 0.320 | Plastic | 1.686 | 18.4 | −172.63 |
| 8 |  | 13.731 | (ASP) | 0.118 |  |  |  |  |
| 9 | Lens 4 | −18.105 | (ASP) | 0.520 | Plastic | 1.544 | 56.0 | 120.00 |
| 10 |  | −14.318 | (ASP) | −0.168 |  |  |  |  |
| 11 | Stop | Plano |  | 0.248 |  |  |  |  |
| 12 | Lens 5 | 17.778 | (ASP) | 0.434 | Plastic | 1.544 | 56.0 | 48.81 |
| 13 |  | 53.314 | (ASP) | 0.614 |  |  |  |  |
| 14 | Lens 6 | 9.946 | (ASP) | 0.446 | Plastic | 1.566 | 37.4 | −27.01 |
| 15 |  | 5.928 | (ASP) | 0.255 |  |  |  |  |
| 16 | Lens 7 | 2.944 | (ASP) | 0.548 | Plastic | 1.544 | 56.0 | 9.82 |
| 17 |  | 6.124 | (ASP) | 0.869 |  |  |  |  |
| 18 | Lens 8 | −11.942 | (ASP) | 0.650 | Plastic | 1.534 | 55.9 | −5.69 |
| 19 |  | 4.150 | (ASP) | 0.500 |  |  |  |  |
| 20 | IR-cut Filter | Plano |  | 0.210 | Glass | 1.517 | 64.2 | — |
| 21 |  | Plano |  | 0.247 |  |  |  |  |
| 22 | Image | Plano |  | 0.000 |  |  |  |  |

Note:
Reference wavelength is 587.6 nm (d-line).
An effective radius of the stop 601 (Surface 6) is 1.608 mm.
An effective radius of the image-side surface 632 (Surface 8) is 1.720 mm.
An effective radius of the stop 602 (Surface 11) is 2.121 mm.

TABLE 12

Aspheric Coefficients

| Surface # | 2 | 3 | 4 | 5 | 7 |
|---|---|---|---|---|---|
| k = | −5.5277E−01 | −8.5643E+01 | 2.9350E+01 | 8.7158E+00 | 9.9768E+00 |
| A4 = | 2.9165E−03 | −1.7140E−02 | −2.7607E−02 | −1.2345E−02 | −2.8953E−02 |
| A6 = | 4.2391E−03 | 1.9695E−02 | 2.8424E−02 | 1.2977E−02 | −2.9499E−03 |
| A8 = | −4.1381E−03 | −8.0720E−03 | −1.3998E−02 | −8.7750E−03 | 3.4292E−03 |
| A10 = | 2.6826E−03 | 6.9623E−03 | 3.6490E−03 | 3.8703E−03 | −3.9077E−03 |
| A12 = | −9.5648E−04 | 5.3165E−04 | −3.2843E−04 | −1.0166E−03 | 2.5120E−03 |
| A14 = | 1.8061E−04 | −1.6836E−04 | −1.5306E−05 | 1.4978E−04 | −6.3979E−04 |
| A16 = | −1.4489E−05 | 1.4194E−05 | 2.9486E−06 | — | 5.4755E−05 |

| Surface # | 8 | 9 | 10 | 12 | 13 |
|---|---|---|---|---|---|
| k = | 2.6052E+01 | −2.4255E+01 | 3.5996E+01 | −9.8224E+01 | −9.0285E+01 |
| A4 = | −1.2637E−02 | 3.2998E−02 | 5.0963E−02 | 3.7295E−02 | −1.9185E−03 |
| A6 = | −2.9335E−02 | −6.9663E−02 | −9.9621E−02 | −9.6990E−02 | −1.8165E−02 |

TABLE 12-continued

| Aspheric Coefficients | | | | | |
|---|---|---|---|---|---|
| A8 = | 4.1027E−02 | 9.8667E−02 | 8.9448E−02 | 7.9042E−02 | 5.6560E−03 |
| A10 = | −4.0761E−02 | −9.5407E−02 | −4.4399E−02 | −3.7355E−02 | 1.7329E−03 |
| A12 = | 2.3790E−02 | 5.4554E−02 | 8.8781E−03 | 9.3968E−03 | −2.1627E−03 |
| A14 = | −7.3896E−03 | −1.7688E−02 | 1.6151E−03 | −8.8430E−04 | 8.1230E−04 |
| A16 = | 1.1582E−03 | 3.0390E−03 | −1.2416E−03 | −7.9290E−05 | −1.4853E−04 |
| A18 = | −7.2652E−05 | −2.1562E−04 | 2.4792E−04 | 2.2379E−05 | 1.3304E−05 |
| A20 = | — | — | −1.7523E−05 | −1.2568E−06 | −4.6691E−07 |

| Surface # | 14 | 15 | 16 | 17 | 18 |
|---|---|---|---|---|---|
| k = | 4.1119E−01 | −9.0125E+01 | −1.2583E+00 | −2.1605E+01 | 4.3954E+00 |
| A4 = | −1.5031E−02 | −1.0016E−02 | −3.0701E−02 | 2.8547E−02 | −4.6242E−02 |
| A6 = | 8.4404E−03 | −5.1566E−03 | −9.2346E−04 | −2.3998E−02 | 7.4894E−03 |
| A8 = | −1.0099E−02 | 3.2982E−03 | −1.1426E−03 | 7.5122E−03 | −5.3039E−04 |
| A10 = | 5.8187E−03 | −1.1951E−03 | 9.4452E−04 | −1.4946E−03 | 2.4972E−05 |
| A12 = | −2.1721E−03 | 2.2636E−04 | −2.9585E−04 | 1.9357E−04 | −1.4635E−06 |
| A14 = | 5.1552E−04 | −2.0864E−05 | 4.7625E−05 | −1.6208E−05 | 1.0154E−07 |
| A16 = | −7.4441E−05 | 6.9579E−07 | −4.1053E−06 | 8.4792E−07 | −4.6408E−09 |
| A18 = | 5.9043E−06 | 1.5001E−08 | 1.8061E−07 | −2.5100E−08 | 1.1114E−10 |
| A20 = | −1.9482E−07 | −1.0796E−09 | −3.1963E−09 | 3.1875E−10 | −1.0767E−12 |

| Surface # | 19 |
|---|---|
| k = | −4.6164E−01 |
| A4 = | −5.1870E−02 |
| A6 = | 1.0299E−02 |
| A8 = | −1.6520E−03 |
| A10 = | 1.8722E−04 |
| A12 = | −1.4112E−05 |
| A14 = | 6.7780E−07 |
| A16 = | −1.9697E−08 |
| A18 = | 3.1380E−10 |
| A20 = | −2.0988E−12 |

In the 6th embodiment, the equation of the aspheric surface profiles of the aforementioned lens elements is the same as the equation of the 1st embodiment. Also, the definitions of these parameters shown in the following table are the same as those stated in the 1st to 5th embodiments with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 6.78 | ImgH/BL | 6.28 |
| Fno | 1.70 | Yc62 [mm] | 1.19 |
| HFOV [deg.] | 41.0 | Yc72 [mm] | 1.68 |
| Fno/tan(HFOV) | 1.95 | Yc82 [mm] | 1.42 |
| V1/N1 | 36.30 | R14/R15 | −0.51 |
| V2/N2 | 10.90 | f/R12 + f/R14 + f/R16 | 3.88 |
| V3/N3 | 10.90 | f7/f8 | −1.73 |
| V4/N4 | 36.26 | |f8/f1| | 0.99 |
| V5/N5 | 36.26 | |f8/f2| | 0.35 |
| V6/N6 | 23.91 | |f8/f3| | 0.03 |
| V7/N7 | 36.26 | |f8/f4| | 0.05 |
| V8/N8 | 36.46 | |f8/f5| | 0.12 |
| (V3 − V6)/(V3 + V6) | −0.34 | |f8/f6| | 0.21 |
| CT1/MaxCT28 | 1.82 | |f8/f7| | 0.58 |
| T78/T12 | 18.10 | |f/f1| | 1.18 |
| T78/T23 | 1.74 | |f/f2| | 0.42 |
| T78/T34 | 7.36 | |f/f3| | 0.04 |
| T78/T45 | 10.86 | |f/f4| | 0.06 |
| T78/T56 | 1.42 | |f/f5| | 0.14 |
| T78/T67 | 3.41 | |f/f6| | 0.25 |
| T78/(CT7 + CT8) | 0.73 | |f/f7| | 0.69 |
| T78/BL | 0.91 | |f/f8| | 1.19 |
| ΣAT/(T23 + T56 + T78) | 1.25 | f12/f345 | 0.18 |
| Dr5r10/Dr11r16 | 0.53 | f/f678 | −0.61 |
| EPD/Dr5r10 | 2.71 | |Yc322/Yc321| | 1.80 |
| TL/ImgH | 1.30 | |Yc712/Yc711| | 2.27 |

7th Embodiment

Figure 13:
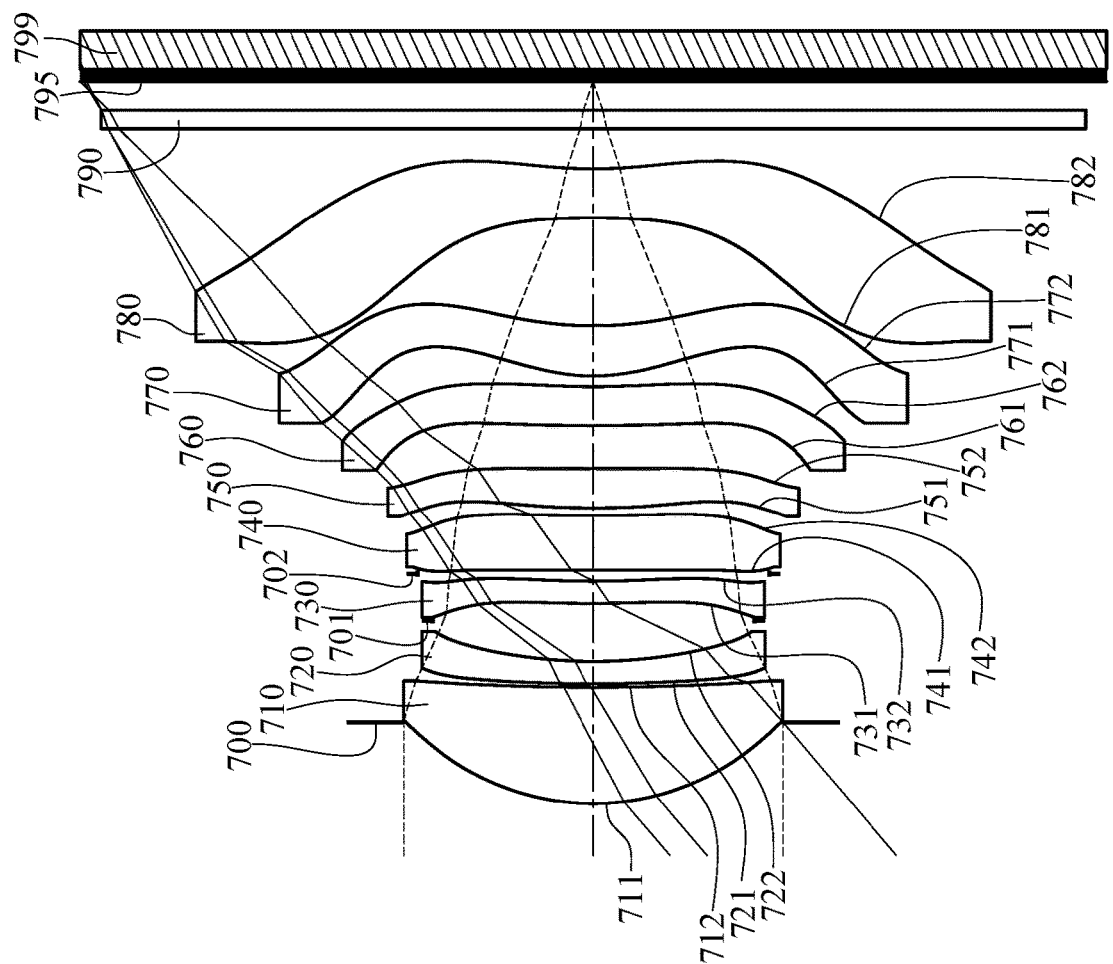
FIG. 13 is a schematic view of an image capturing unit according to the 7th embodiment of the present disclosure.
Figure 14:
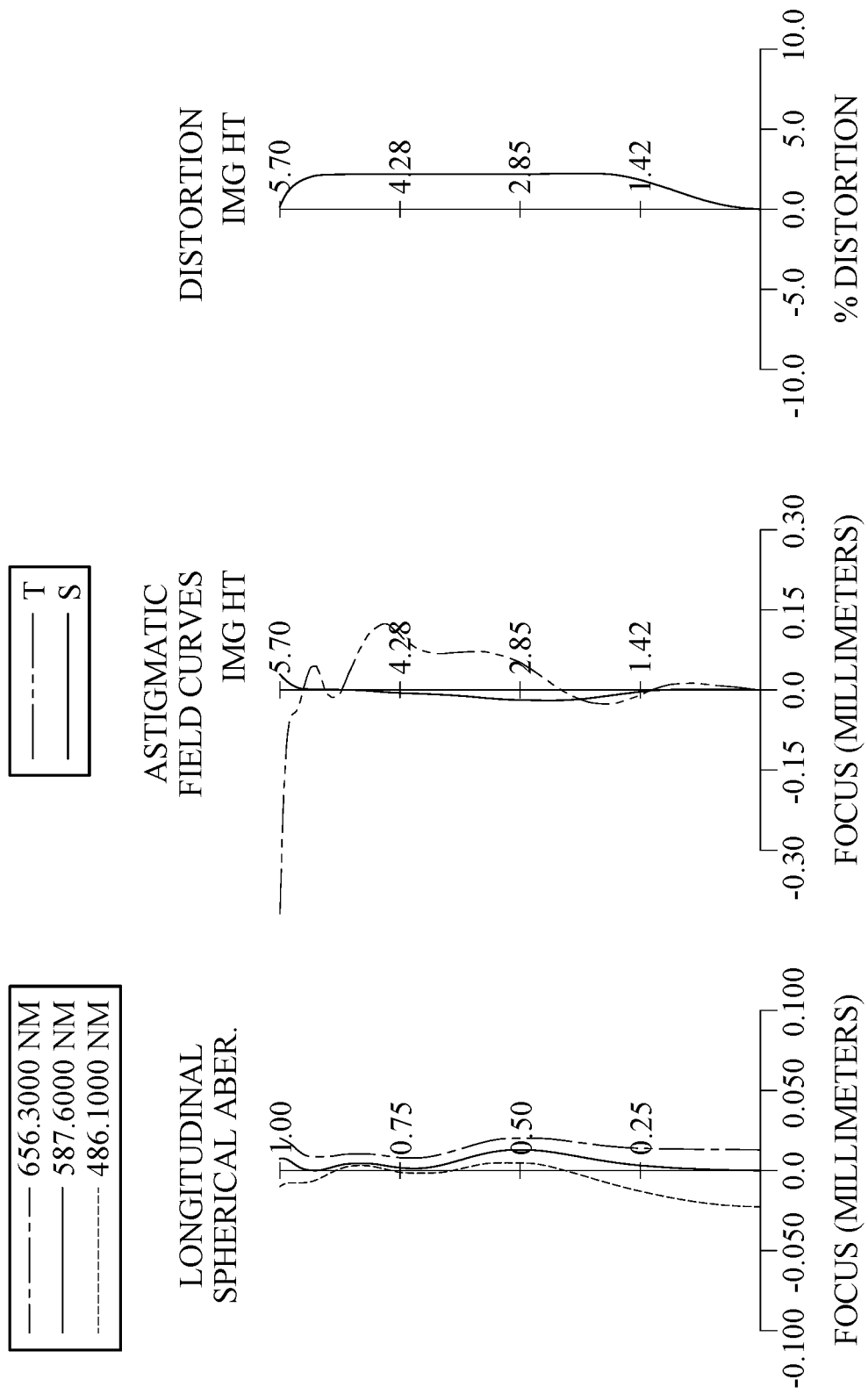
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing lens assembly (its reference numeral is omitted) of the present disclosure and an image sensor 799. The photographing lens assembly includes, in order from an object side to an image side, an aperture stop 700, a first lens element 710, a second lens element 720, a stop 701, a third lens element 730, a stop 702, a fourth lens element 740, a fifth lens element 750, a sixth lens element 760, a seventh lens element 770, an eighth lens element 780, an IR-cut filter 790 and an image surface 795. The photographing lens assembly includes eight lens elements (710, 720, 730, 740, 750, 760, 770 and 780) with no additional lens element disposed between each of the adjacent eight lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has one inflection point. The image-side surface 712 of the first lens element 710 has one inflection point.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The object-side surface 731 of the third lens element 730 has one inflection point and one critical point in an off-axis region thereof. The image-side surface 732 of the third lens element 730 has three inflection points and two critical points in an off-axis region thereof.

The fourth lens element 740 with negative refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The object-side surface 741 of the fourth lens element 740 has two inflection points and two critical points in an off-axis region thereof. The image-side surface 742 of the fourth lens element 740 has two inflection points and one critical point in an off-axis region thereof.

The fifth lens element 750 with positive refractive power has an object-side surface 751 being convex in a paraxial region thereof and an image-side surface 752 being convex in a paraxial region thereof. The fifth lens element 750 is made of plastic material and has the object-side surface 751 and the image-side surface 752 being both aspheric. The object-side surface 751 of the fifth lens element 750 has three inflection points and one critical point in an off-axis region thereof. The image-side surface 752 of the fifth lens element 750 has four inflection points and two critical points in an off-axis region thereof.

The sixth lens element 760 with negative refractive power has an object-side surface 761 being concave in a paraxial region thereof and an image-side surface 762 being concave in a paraxial region thereof. The sixth lens element 760 is made of plastic material and has the object-side surface 761 and the image-side surface 762 being both aspheric. The object-side surface 761 of the sixth lens element 760 has two inflection points and two critical points in an off-axis region thereof. The image-side surface 762 of the sixth lens element 760 has one inflection point and one critical point in an off-axis region thereof.

The seventh lens element 770 with positive refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric. The object-side surface 771 of the seventh lens element 770 has two inflection points and one critical point in an off-axis region thereof. The image-side surface 772 of the seventh lens element 770 has two inflection points and one critical point in an off-axis region thereof.

The eighth lens element 780 with negative refractive power has an object-side surface 781 being concave in a paraxial region thereof and an image-side surface 782 being concave in a paraxial region thereof. The eighth lens element 780 is made of plastic material and has the object-side surface 781 and the image-side surface 782 being both aspheric. The object-side surface 781 of the eighth lens element 780 has one inflection point and one critical point in an off-axis region thereof. The image-side surface 782 of the eighth lens element 780 has three inflection points and one critical point in an off-axis region thereof.

The IR-cut filter 790 is made of glass material and located between the eighth lens element 780 and the image surface 795, and will not affect the focal length of the photographing lens assembly. The image sensor 799 is disposed on or near the image surface 795 of the photographing lens assembly.

The detailed optical data of the 7th embodiment are shown in Table 13 and the aspheric surface data are shown in Table 14 below.

TABLE 13

7th Embodiment
f = 6.70 mm, Fno = 1.58, HFOV = 40.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.914 | | | | |
| 2 | Lens 1 | 2.841 | (ASP) | 1.304 | Plastic | 1.544 | 56.0 | 5.89 |
| 3 | | 20.907 | (ASP) | 0.038 | | | | |
| 4 | Lens 2 | 12.951 | (ASP) | 0.250 | Plastic | 1.656 | 21.3 | −15.19 |
| 5 | | 5.589 | (ASP) | 0.455 | | | | |
| 6 | Stop | Plano | | 0.194 | | | | |
| 7 | Lens 3 | 13.835 | (ASP) | 0.250 | Plastic | 1.669 | 19.5 | −77.24 |
| 8 | | 10.834 | (ASP) | 0.082 | | | | |
| 9 | Stop | Plano | | 0.040 | | | | |
| 10 | Lens 4 | 271.105 | (ASP) | 0.615 | Plastic | 1.559 | 40.4 | −307.71 |
| 11 | | 105.117 | (ASP) | 0.086 | | | | |
| 12 | Lens 5 | 17.420 | (ASP) | 0.440 | Plastic | 1.544 | 56.0 | 22.47 |
| 13 | | −40.611 | (ASP) | 0.485 | | | | |
| 14 | Lens 6 | −89.688 | (ASP) | 0.431 | Plastic | 1.566 | 37.4 | −13.30 |
| 15 | | 8.231 | (ASP) | 0.122 | | | | |
| 16 | Lens 7 | 2.152 | (ASP) | 0.563 | Plastic | 1.553 | 47.5 | 6.80 |
| 17 | | 4.563 | (ASP) | 1.208 | | | | |
| 18 | Lens 8 | −12.127 | (ASP) | 0.550 | Plastic | 1.544 | 56.0 | −6.19 |
| 19 | | 4.734 | (ASP) | 0.450 | | | | |

TABLE 13-continued

7th Embodiment
f = 6.70 mm, Fno = 1.58, HFOV = 40.3 deg.

| Surface # | | Curvature Radius | Thickness | Material | Index | Abbe # | Focal Length |
|---|---|---|---|---|---|---|---|
| 20 | IR-cut Filter | Plano | 0.210 | Glass | 1.517 | 64.2 | — |
| 21 | | Plano | 0.319 | | | | |
| 22 | Image | Plano | 0.000 | | | | |

Note:
Reference wavelength is 587.6 nm (d-line).
An effective radius of the stop 701 (Surface 6) is 1.800 mm.
An effective radius of the object-side surface 761 (Surface 14) is 2.430 mm.

TABLE 14

Aspheric Coefficients

| Surface # | 2 | 3 | 4 | 5 | 7 |
|---|---|---|---|---|---|
| k = | 1.2025E−03 | 1.2336E+01 | 3.4726E+00 | 4.8386E−02 | 1.1951E+01 |
| A4 = | −1.6396E−03 | −1.6009E−02 | −2.0143E−02 | −6.9152E−03 | −2.1885E−02 |
| A6 = | 2.4018E−03 | 1.4419E−02 | 1.5129E−02 | 6.4816E−03 | −7.5208E−03 |
| A8 = | −1.5808E−03 | −6.2499E−03 | −5.1503E−03 | −4.1039E−03 | 6.9962E−03 |
| A10 = | 6.3648E−04 | 1.3875E−03 | 8.2981E−04 | 2.3081E−03 | −4.6591E−03 |
| A12 = | −1.5492E−04 | −1.4069E−04 | −1.2961E−05 | −7.0678E−04 | 1.4433E−03 |
| A14 = | 2.1959E−05 | 3.7562E−06 | −3.5012E−06 | 9.5001E−05 | −1.5245E−04 |
| A16 = | −1.5587E−06 | — | — | — | — |

| Surface # | 8 | 10 | 11 | 12 | 13 |
|---|---|---|---|---|---|
| k = | 1.4359E+01 | 0.0000E+00 | −9.0000E+01 | 0.0000E+00 | −8.6995E+01 |
| A4 = | −1.0608E−02 | 1.6508E−02 | 5.9491E−02 | 8.7795E−02 | 3.9840E−02 |
| A6 = | −1.9046E−02 | −3.8076E−02 | −9.9538E−02 | −1.1516E−01 | −4.0291E−02 |
| A8 = | 1.9077E−02 | 3.8166E−02 | 7.0406E−02 | 6.9752E−02 | 1.4298E−02 |
| A10 = | −1.0808E−02 | −2.0610E−02 | −2.8890E−02 | −2.3963E−02 | −8.9125E−04 |
| A12 = | 3.0130E−03 | 5.8420E−03 | 6.7005E−03 | 4.3398E−03 | −1.0396E−03 |
| A14 = | −3.2428E−04 | −8.0474E−04 | −8.1783E−04 | −3.5179E−04 | 3.4238E−04 |
| A16 = | 5.0550E−06 | 4.2473E−05 | 4.1571E−05 | 7.3097E−06 | −4.1670E−05 |
| A18 = | — | — | — | — | 1.7978E−06 |

| Surface # | 14 | 15 | 16 | 17 | 18 |
|---|---|---|---|---|---|
| k = | 0.0000E+00 | 1.5027E+00 | −1.0000E+00 | 0.0000E+00 | 0.0000E+00 |
| A4 = | 4.8214E−02 | −3.4353E−02 | −6.1036E−02 | 1.6088E−02 | −4.2629E−02 |
| A6 = | −4.0153E−02 | 6.2833E−03 | 1.7715E−02 | −2.0138E−02 | 6.0294E−03 |
| A8 = | 1.8425E−02 | 1.0050E−03 | −8.3794E−03 | 5.9465E−03 | −1.4976E−03 |
| A10 = | −6.3534E−03 | −1.6917E−03 | 2.7611E−03 | −1.0754E−03 | 4.2605E−04 |
| A12 = | 1.4503E−03 | 6.3081E−04 | −5.8420E−04 | 1.2221E−04 | −6.4039E−05 |
| A14 = | −2.0105E−04 | −1.2460E−04 | 7.5022E−05 | −8.5776E−06 | 5.3123E−06 |
| A16 = | 1.4874E−05 | 1.4634E−05 | −5.5487E−06 | 3.5916E−07 | −2.5134E−07 |
| A18 = | −4.3673E−07 | −9.7134E−07 | 2.1667E−07 | −8.1131E−09 | 6.4051E−09 |
| A20 = | — | 2.7886E−08 | −3.4645E−09 | 7.2942E−11 | −6.8537E−11 |

| Surface # | 19 |
|---|---|
| k = | −5.4892E−01 |
| A4 = | −4.0208E−02 |
| A6 = | 6.4337E−03 |
| A8 = | −1.2425E−03 |
| A10 = | 1.9746E−04 |
| A12 = | −2.0298E−05 |
| A14 = | 1.2801E−06 |
| A16 = | −4.7698E−08 |
| A18 = | 9.5982E−10 |
| A20 = | −8.0070E−12 |

In the 7th embodiment, the equation of the aspheric surface profiles of the aforementioned lens elements is the same as the equation of the 1st embodiment. Also, the definitions of these parameters shown in the following table are the same as those stated in the 1st to 6th embodiments with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 6.70 | Yc62 [mm] | 1.14 |
| Fno | 1.58 | Yc72 [mm] | 1.85 |
| HFOV [deg.] | 40.3 | Yc82 [mm] | 1.39 |
| Fno/tan(HFOV) | 1.86 | R14/R15 | −0.38 |
| V1/N1 | 36.26 | f/R12 + f/R14 + f/R16 | 3.70 |
| V2/N2 | 12.84 | f7/f8 | −1.10 |
| V3/N3 | 11.65 | |f8/f1| | 1.05 |
| V4/N4 | 25.95 | |f8/f2| | 0.41 |
| V5/N5 | 36.26 | |f8/f3| | 0.08 |
| V6/N6 | 23.91 | |f8/f4| | 0.02 |
| V7/N7 | 30.56 | |f8/f5| | 0.28 |
| V8/N8 | 36.26 | |f8/f6| | 0.47 |
| (V3 − V6)/(V3 + V6) | −0.32 | |f8/f7| | 0.91 |
| CT1/MaxCT28 | 2.12 | |f/f1| | 1.14 |
| T78/T12 | 31.79 | |f/f2| | 0.44 |
| T78/T23 | 1.86 | |f/f3| | 0.09 |
| T78/T34 | 9.90 | |f/f4| | 0.02 |
| T78/T45 | 14.05 | |f/f5| | 0.30 |
| T78/T56 | 2.49 | |f/f6| | 0.50 |
| T78/T67 | 9.90 | |f/f7| | 0.99 |
| T78/(CT7 + CT8) | 1.09 | |f/f8| | 1.08 |
| T78/BL | 1.23 | f12/f345 | 0.24 |
| ΣAT/(T23 + T56 + T78) | 1.16 | f/f678 | −0.44 |
| Dr5r10/Dr11r16 | 0.53 | |Yc322/Yc321| | 1.60 |
| EPD/Dr5r10 | 2.80 | |Yc412/Yc411| | 1.72 |
| TL/ImgH | 1.42 | |Yc522/Yc521| | 1.93 |
| ImgH/BL | 5.82 | |Yc612/Yc611| | 5.26 |

8th Embodiment

Figure 15:
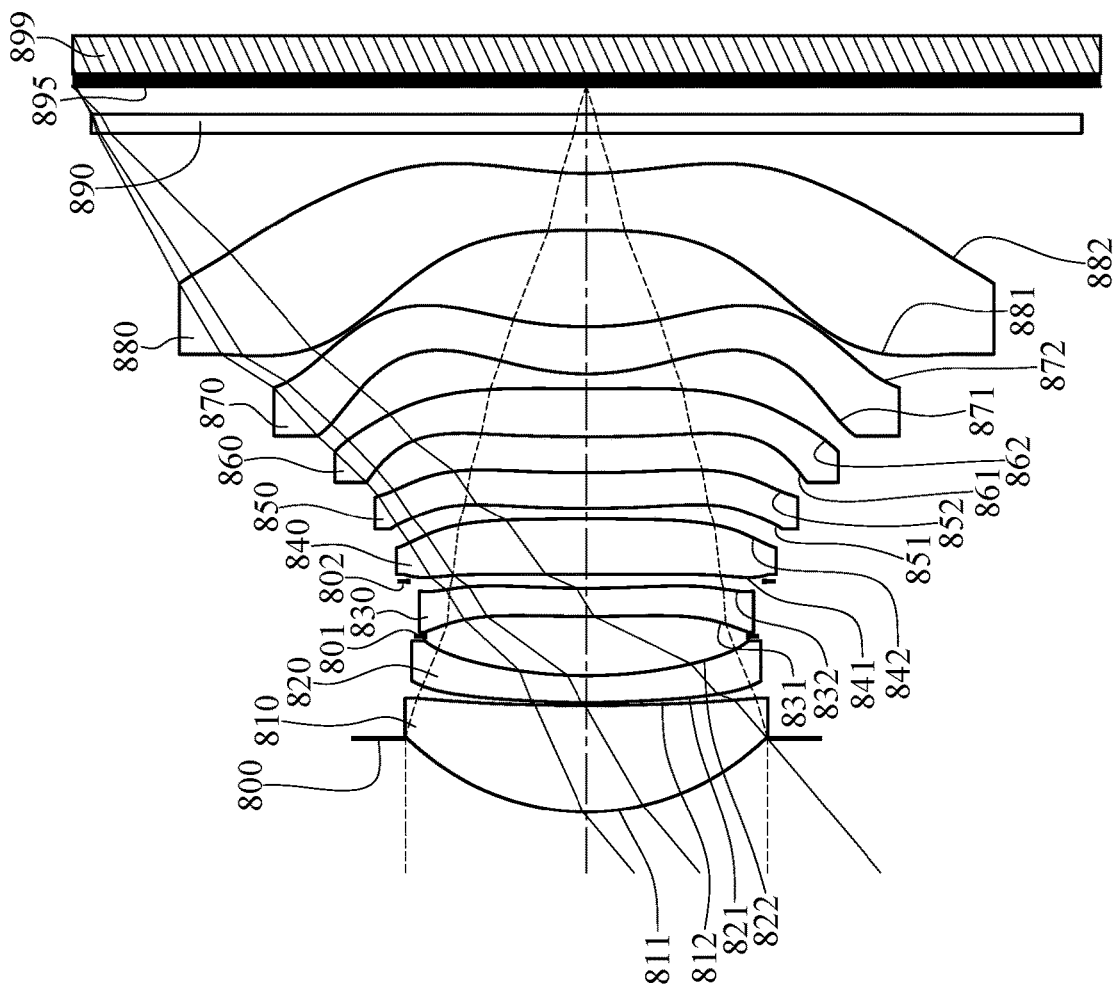
FIG. 15 is a schematic view of an image capturing unit according to the 8th embodiment of the present disclosure.
Figure 16:
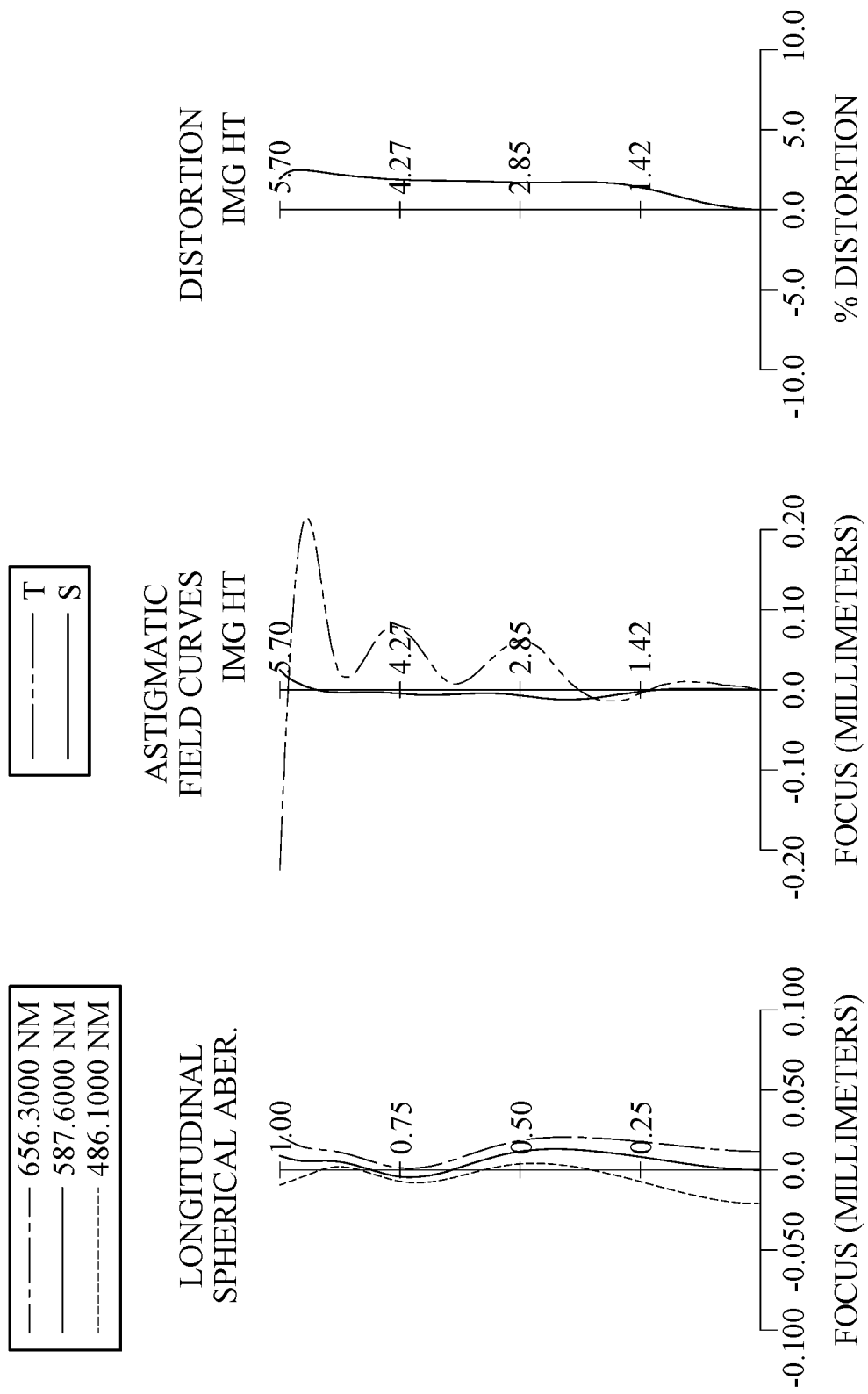
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing lens assembly (its reference numeral is omitted) of the present disclosure and an image sensor 899. The photographing lens assembly includes, in order from an object side to an image side, an aperture stop 800, a first lens element 810, a second lens element 820, a stop 801, a third lens element 830, a stop 802, a fourth lens element 840, a fifth lens element 850, a sixth lens element 860, a seventh lens element 870, an eighth lens element 880, an IR-cut filter 890 and an image surface 895. The photographing lens assembly includes eight lens elements (810, 820, 830, 840, 850, 860, 870 and 880) with no additional lens element disposed between each of the adjacent eight lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric. The object-side surface 811 of the first lens element 810 has one inflection point. The image-side surface 812 of the first lens element 810 has one inflection point.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. The object-side surface 831 of the third lens element 830 has one inflection point and one critical point in an off-axis region thereof. The image-side surface 832 of the third lens element 830 has two inflection points and two critical points in an off-axis region thereof.

The fourth lens element 840 with positive refractive power has an object-side surface 841 being planar in a paraxial region thereof and an image-side surface 842 being convex in a paraxial region thereof. The fourth lens element 840 is made of plastic material and has the object-side surface 841 and the image-side surface 842 being both aspheric. The object-side surface 841 of the fourth lens element 840 has two inflection points and two critical points in an off-axis region thereof. The image-side surface 842 of the fourth lens element 840 has one inflection point.

The fifth lens element 850 with negative refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. The object-side surface 851 of the fifth lens element 850 has one inflection point and one critical point in an off-axis region thereof. The image-side surface 852 of the fifth lens element 850 has three inflection points and one critical point in an off-axis region thereof.

The sixth lens element 860 with positive refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The object-side surface 861 of the sixth lens element 860 has one inflection point and one critical point in an off-axis region thereof. The image-side surface 862 of the sixth lens element 860 has two inflection points and one critical point in an off-axis region thereof.

The seventh lens element 870 with positive refractive power has an object-side surface 871 being convex in a paraxial region thereof and an image-side surface 872 being concave in a paraxial region thereof. The seventh lens element 870 is made of plastic material and has the object-side surface 871 and the image-side surface 872 being both aspheric. The object-side surface 871 of the seventh lens element 870 has two inflection points and one critical point in an off-axis region thereof. The image-side surface 872 of the seventh lens element 870 has two inflection points and one critical point in an off-axis region thereof.

The eighth lens element 880 with negative refractive power has an object-side surface 881 being concave in a paraxial region thereof and an image-side surface 882 being concave in a paraxial region thereof. The eighth lens element 880 is made of plastic material and has the object-side surface 881 and the image-side surface 882 being both aspheric. The object-side surface 881 of the eighth lens element 880 has one inflection point and one critical point in an off-axis region thereof. The image-side surface 882 of the eighth lens element 880 has three inflection points and one critical point in an off-axis region thereof.

The IR-cut filter 890 is made of glass material and located between the eighth lens element 880 and the image surface 895, and will not affect the focal length of the photographing lens assembly. The image sensor 899 is disposed on or near the image surface 895 of the photographing lens assembly.

The detailed optical data of the 8th embodiment are shown in Table 15 and the aspheric surface data are shown in Table 16 below.

TABLE 15

8th Embodiment
f = 6.65 mm, Fno = 1.65, HFOV = 40.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.820 | | | | |
| 2 | Lens 1 | 2.835 | (ASP) | 1.184 | Plastic | 1.545 | 56.1 | 6.02 |
| 3 | | 17.804 | (ASP) | 0.035 | | | | |
| 4 | Lens 2 | 9.914 | (ASP) | 0.300 | Plastic | 1.650 | 20.0 | −16.88 |
| 5 | | 5.146 | (ASP) | 0.437 | | | | |
| 6 | Stop | Plano | | 0.223 | | | | |
| 7 | Lens 3 | 16.610 | (ASP) | 0.311 | Plastic | 1.679 | 18.4 | −53.44 |
| 8 | | 11.309 | (ASP) | 0.077 | | | | |
| 9 | Stop | Plano | | 0.077 | | | | |
| 10 | Lens 4 | ∞ | (ASP) | 0.621 | Plastic | 1.544 | 56.0 | 28.12 |
| 11 | | −15.298 | (ASP) | 0.121 | | | | |
| 12 | Lens 5 | 40.687 | (ASP) | 0.400 | Plastic | 1.555 | 46.0 | −119.40 |
| 13 | | 25.121 | (ASP) | 0.397 | | | | |
| 14 | Lens 6 | 26.933 | (ASP) | 0.536 | Plastic | 1.555 | 46.0 | 235.16 |
| 15 | | 33.695 | (ASP) | 0.163 | | | | |
| 16 | Lens 7 | 2.681 | (ASP) | 0.526 | Plastic | 1.544 | 56.0 | 11.08 |
| 17 | | 4.496 | (ASP) | 1.075 | | | | |
| 18 | Lens 8 | −12.192 | (ASP) | 0.637 | Plastic | 1.534 | 55.9 | −5.76 |
| 19 | | 4.187 | (ASP) | 0.450 | | | | |
| 20 | IR-cut Filter | Plano | | 0.210 | Glass | 1.517 | 64.2 | — |
| 21 | | Plano | | 0.311 | | | | |
| 22 | Image | Plano | | 0.000 | | | | |

Note:
Reference wavelength is 587.6 nm (d-line).
An effective radius of the stop 801 (Surface 6) is 1.800 mm.
An effective radius of the stop 802 (Surface 9) is 1.980 mm.

TABLE 16

Aspheric Coefficients

| Surface # | 2 | 3 | 4 | 5 | 7 |
|---|---|---|---|---|---|
| k = | 1.4991E−02 | 7.9615E+00 | 3.6768E+00 | 1.3382E−01 | 1.7886E+01 |
| A4 = | −1.4245E−03 | −1.6097E−02 | −2.0079E−02 | −6.8773E−03 | −2.1490E−02 |
| A6 = | 2.3396E−03 | 1.4517E−02 | 1.5008E−02 | 6.4890E−03 | −7.5978E−03 |
| A8 = | −1.5826E−03 | −6.2478E−03 | −5.1606E−03 | −4.1447E−03 | 6.9569E−03 |
| A10 = | 6.3938E−04 | 1.3888E−03 | 8.4282E−04 | 2.2948E−03 | −4.6608E−03 |
| A12 = | −1.5463E−04 | −1.4083E−04 | −1.2188E−05 | −7.0585E−04 | 1.4447E−03 |
| A14 = | 2.1858E−05 | 3.2842E−06 | −3.8244E−06 | 9.6567E−05 | −1.5213E−04 |
| A16 = | −1.6380E−06 | — | — | — | — |

| Surface # | 8 | 10 | 11 | 12 | 13 |
|---|---|---|---|---|---|
| k = | 1.0301E+01 | 0.0000E+00 | −7.2815E+01 | 0.0000E+00 | −9.0000E+01 |
| A4 = | −1.1518E−02 | 1.6537E−02 | 6.2116E−02 | 8.6859E−02 | 3.4946E−02 |
| A6 = | −1.9113E−02 | −3.8282E−02 | −9.9240E−02 | −1.1564E−01 | −4.0556E−02 |
| A8 = | 1.9080E−02 | 3.8052E−02 | 7.0391E−02 | 6.9753E−02 | 1.4257E−02 |
| A10 = | −1.0813E−02 | −2.0622E−02 | −2.8902E−02 | −2.3951E−02 | −8.9759E−04 |
| A12 = | 3.0129E−03 | 5.8433E−03 | 6.6988E−03 | 4.3419E−03 | −1.0398E−03 |
| A14 = | −3.2422E−04 | −8.0422E−04 | −8.1813E−04 | −3.5178E−04 | 3.4251E−04 |
| A16 = | 5.5110E−06 | 4.2632E−05 | 4.1571E−05 | 7.2031E−06 | −4.1629E−05 |
| A18 = | — | — | — | — | 1.7994E−06 |

| Surface # | 14 | 15 | 16 | 17 | 18 |
|---|---|---|---|---|---|
| k = | 0.0000E+00 | 9.0000E+01 | −1.0000E+00 | 0.0000E+00 | 0.0000E+00 |
| A4 = | 1.0740E−02 | −3.2275E−02 | −2.5813E−02 | 2.0653E−02 | −4.2164E−02 |
| A6 = | 2.9219E−03 | 1.7984E−02 | −3.8641E−03 | −2.1548E−02 | 7.0165E−03 |
| A8 = | −1.1200E−02 | −8.8735E−03 | 1.1017E−03 | 5.2698E−03 | −1.9398E−03 |
| A10 = | 6.1241E−03 | 2.0518E−03 | −6.8258E−04 | −7.3945E−04 | 5.0392E−04 |
| A12 = | −1.7376E−03 | −8.1006E−05 | 2.9536E−04 | 5.8091E−05 | −7.1329E−05 |
| A14 = | 2.7483E−04 | −6.6494E−05 | −6.4250E−05 | −1.8734E−06 | 5.7023E−06 |
| A16 = | −2.3079E−05 | 1.5507E−05 | 7.2690E−06 | −4.2281E−08 | −2.6300E−07 |
| A18 = | 8.0940E−07 | −1.4183E−06 | −4.0842E−07 | 4.8064E−09 | 6.5748E−09 |
| A20 = | — | 4.8398E−08 | 8.9700E−09 | −1.0123E−10 | −6.9286E−11 |

TABLE 16-continued

| Aspheric Coefficients | |
|---|---|
| Surface # | 19 |
| k = | −7.5089E−01 |
| A4 = | −4.3321E−02 |
| A6 = | 7.8962E−03 |
| A8 = | −1.5999E−03 |
| A10 = | 2.4883E−04 |
| A12 = | −2.4269E−05 |
| A14 = | 1.4224E−06 |
| A16 = | −4.8429E−08 |
| A18 = | 8.7479E−10 |
| A20 = | −6.3964E−12 |

In the 8th embodiment, the equation of the aspheric surface profiles of the aforementioned lens elements is the same as the equation of the 1st embodiment. Also, the definitions of these parameters shown in the following table are the same as those stated in the 1st to 7th embodiments with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 6.65 | ImgH/BL | 5.87 |
| Fno | 1.65 | Yc62 [mm] | 0.54 |
| HFOV [deg.] | 40.1 | Yc72 [mm] | 1.77 |
| Fno/tan(HFOV) | 1.96 | Yc82 [mm] | 1.48 |
| V1/N1 | 36.30 | R14/R15 | −0.37 |
| V2/N2 | 12.12 | f/R12 + f/R14 + f/R16 | 3.26 |
| V3/N3 | 10.98 | f7/f8 | −1.92 |
| V4/N4 | 36.26 | |f8/f1| | 0.96 |
| V5/N5 | 29.58 | |f8/f2| | 0.34 |
| V6/N6 | 29.58 | |f8/f3| | 0.11 |
| V7/N7 | 36.26 | |f8/f4| | 0.20 |
| V8/N8 | 36.46 | |f8/f5| | 0.05 |
| (V3 − V6)/(V3 + V6) | −0.43 | |f8/f6| | 0.02 |
| CT1/MaxCT28 | 1.86 | |f8/f7| | 0.52 |
| T78/T12 | 30.71 | |f/f1| | 1.10 |
| T78/T23 | 1.63 | |f/f2| | 0.39 |
| T78/T34 | 6.98 | |f/f3| | 0.12 |
| T78/T45 | 8.88 | |f/f4| | 0.24 |
| T78/T56 | 2.71 | |f/f5| | 0.06 |
| T78/T67 | 6.60 | |f/f6| | 0.03 |
| T78/(CT7 + CT8) | 0.92 | |f/f7| | 0.60 |
| T78/BL | 1.11 | |f/f8| | 1.15 |
| ΣAT/(T23 + T56 + T78) | 1.22 | f12/f345 | 0.07 |
| Dr5r10/Dr11r16 | 0.55 | f/f678 | −0.29 |
| EPD/Dr5r10 | 2.51 | |Yc322/Yc321| | 1.71 |
| TL/ImgH | 1.42 | |Yc412/Yc411| | 2.23 |

9th Embodiment

Figure 17:
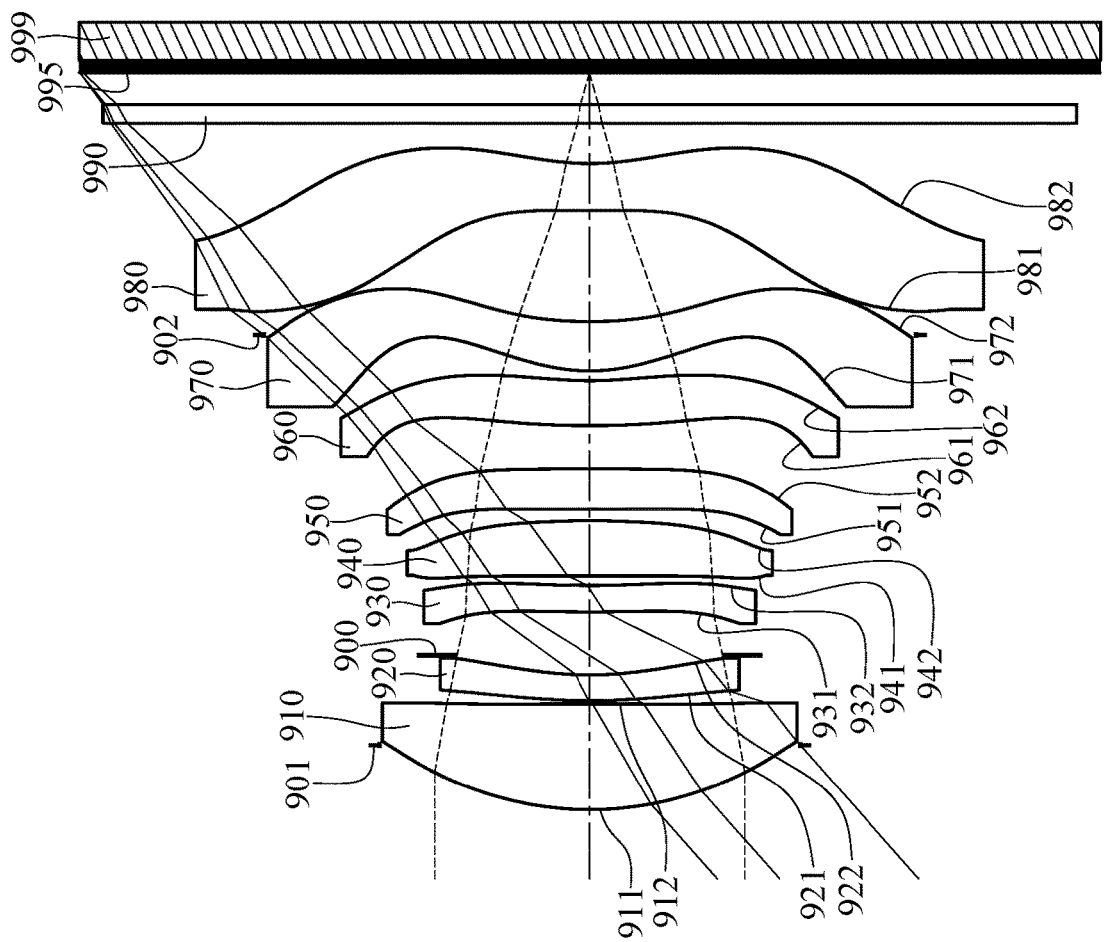
FIG. 17 is a schematic view of an image capturing unit according to the 9th embodiment of the present disclosure.
Figure 18:
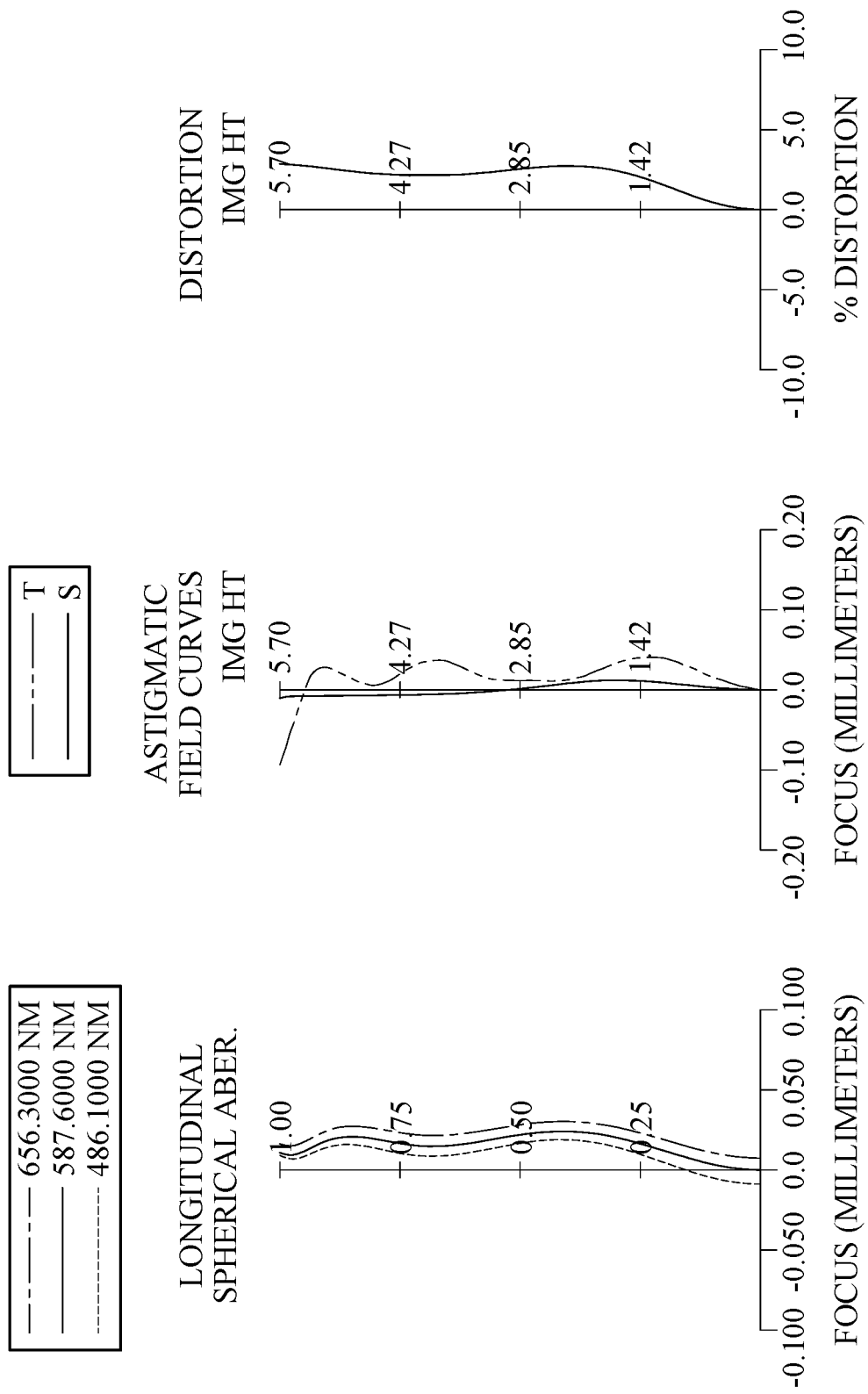
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing lens assembly (its reference numeral is omitted) of the present disclosure and an image sensor 999. The photographing lens assembly includes, in order from an object side to an image side, a stop 901, a first lens element 910, a second lens element 920, an aperture stop 900, a third lens element 930, a fourth lens element 940, a fifth lens element 950, a sixth lens element 960, a seventh lens element 970, a stop 902, an eighth lens element 980, an IR-cut filter 990 and an image surface 995. The photographing lens assembly includes eight lens elements (910, 920, 930, 940, 950, 960, 970 and 980) with no additional lens element disposed between each of the adjacent eight lens elements.

The first lens element 910 with positive refractive power has an object-side surface 911 being convex in a paraxial region thereof and an image-side surface 912 being convex in a paraxial region thereof. The first lens element 910 is made of plastic material and has the object-side surface 911 and the image-side surface 912 being both aspheric. The object-side surface 911 of the first lens element 910 has one inflection point. The image-side surface 912 of the first lens element 910 has two inflection points and two critical points in an off-axis region thereof.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric. The object-side surface 921 of the second lens element 920 has one inflection point. The image-side surface 922 of the second lens element 920 has one inflection point.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric. The object-side surface 931 of the third lens element 930 has one inflection point and one critical point in an off-axis region thereof. The image-side surface 932 of the third lens element 930 has three inflection points and one critical point in an off-axis region thereof.

The fourth lens element 940 with positive refractive power has an object-side surface 941 being planar in a paraxial region thereof and an image-side surface 942 being convex in a paraxial region thereof. The fourth lens element 940 is made of plastic material and has the object-side surface 941 and the image-side surface 942 being both aspheric. The object-side surface 941 of the fourth lens element 940 has two inflection points and two critical points in an off-axis region thereof. The image-side surface 942 of the fourth lens element 940 has one inflection point and one critical point in an off-axis region thereof.

The fifth lens element 950 with positive refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric. The object-side surface 951 of the fifth lens element 950 has two inflection points. The object-side surface 951 of the fifth lens element 950 has two critical points in an off-axis region thereof.

The sixth lens element 960 with negative refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. The object-side surface 961 of the sixth lens element 960 has one inflection point and one critical point in an off-axis region thereof. The image-side surface 962 of the sixth lens element 960 has one inflection point and one critical point in an off-axis region thereof.

The seventh lens element 970 with positive refractive power has an object-side surface 971 being convex in a paraxial region thereof and an image-side surface 972 being concave in a paraxial region thereof. The seventh lens element 970 is made of plastic material and has the object-side surface 971 and the image-side surface 972 being both aspheric. The object-side surface 971 of the seventh lens element 970 has two inflection points and one critical point in an off-axis region thereof. The image-side surface 972 of the seventh lens element 970 has two inflection points and one critical point in an off-axis region thereof.

The eighth lens element 980 with negative refractive power has an object-side surface 981 being convex in a paraxial region thereof and an image-side surface 982 being concave in a paraxial region thereof. The eighth lens element 980 is made of plastic material and has the object-side surface 981 and the image-side surface 982 being both aspheric. The object-side surface 981 of the eighth lens element 980 has two inflection points and two critical points in an off-axis region thereof. The image-side surface 982 of the eighth lens element 980 has two inflection points and one critical point in an off-axis region thereof.

The IR-cut filter 990 is made of glass material and located between the eighth lens element 980 and the image surface 995, and will not affect the focal length of the photographing lens assembly. The image sensor 999 is disposed on or near the image surface 995 of the photographing lens assembly.

When a vertical distance between the critical point closest to the optical axis on the image-side surface 912 of the first lens element 910 and the optical axis is Yc121, and a vertical distance between the critical point closest to a maximum effective radius position on the image-side surface 912 of the first lens element 910 and the optical axis is Yc122, the following condition is satisfied: |Yc122/Yc121|=2.06.

The detailed optical data of the 9th embodiment are shown in Table 17 and the aspheric surface data are shown in Table 18 below.

TABLE 17

9th Embodiment
f = 6.24 mm, Fno = 1.80, HFOV = 41.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.724 | | | | |
| 2 | Lens 1 | 3.762 | (ASP) | 1.185 | Plastic | 1.544 | 56.0 | 6.69 |
| 3 | | −100.000 | (ASP) | 0.035 | | | | |
| 4 | Lens 2 | 6.557 | (ASP) | 0.291 | Plastic | 1.641 | 20.1 | −16.89 |
| 5 | | 4.013 | (ASP) | 0.217 | | | | |
| 6 | Ape. Stop | Plano | | 0.485 | | | | |
| 7 | Lens 3 | 17.071 | (ASP) | 0.298 | Plastic | 1.692 | 15.5 | −45.46 |
| 8 | | 10.987 | (ASP) | 0.106 | | | | |
| 9 | Lens 4 | ∞ | (ASP) | 0.616 | Plastic | 1.544 | 56.0 | 15.38 |
| 10 | | −8.364 | (ASP) | 0.128 | | | | |
| 11 | Lens 5 | −24.527 | (ASP) | 0.459 | Plastic | 1.544 | 56.0 | 698.50 |
| 12 | | −23.192 | (ASP) | 0.482 | | | | |
| 13 | Lens 6 | 11.811 | (ASP) | 0.502 | Plastic | 1.554 | 45.0 | −13.63 |
| 14 | | 4.536 | (ASP) | 0.107 | | | | |
| 15 | Lens 7 | 2.048 | (ASP) | 0.552 | Plastic | 1.544 | 56.0 | 5.91 |
| 16 | | 5.111 | (ASP) | −0.148 | | | | |
| 17 | Stop | Plano | | 1.392 | | | | |
| 18 | Lens 8 | 58.994 | (ASP) | 0.530 | Plastic | 1.548 | 51.3 | −5.60 |
| 19 | | 2.908 | (ASP) | 0.450 | | | | |
| 20 | IR-cut Filter | Plano | | 0.210 | Glass | 1.517 | 64.2 | — |
| 21 | | Plano | | 0.356 | | | | |
| 22 | Image | Plano | | 0.000 | | | | |

Note:
Reference wavelength is 587.6 nm (d-line).
An effective radius of the stop 901 (Surface 1) is 2.350 mm.
An effective radius of the stop 902 (Surface 17) is 3.650 mm.

TABLE 18

| Aspheric Coefficients | | | | | |
|---|---|---|---|---|---|
| Surface # | 2 | 3 | 4 | 5 | 7 |
| k = | −1.1022E−01 | −9.0000E+01 | −1.0180E+01 | −8.8543E+00 | −4.2969E+01 |
| A4 = | −1.1174E−03 | −9.6499E−04 | −2.1673E−02 | −1.2664E−02 | −2.1308E−02 |
| A6 = | 1.4818E−03 | 4.8638E−03 | 1.2440E−02 | 4.7385E−03 | −6.3858E−03 |
| A8 = | −1.2027E−03 | −2.2415E−03 | −4.5825E−03 | −2.9966E−03 | 5.3949E−03 |
| A10 = | 5.1315E−04 | 4.5538E−04 | 6.6504E−04 | 1.4864E−03 | −3.4519E−03 |
| A12 = | −1.1525E−04 | −4.5805E−05 | 1.2982E−05 | −5.3572E−04 | 1.1026E−03 |
| A14 = | 1.3236E−05 | 1.7544E−06 | −6.9872E−06 | 8.8802E−05 | −1.2174E−04 |
| A16 = | −6.5011E−07 | — | — | — | — |
| Surface # | 8 | 9 | 10 | 11 | 12 |
| k = | −5.9622E+00 | 0.0000E+00 | 1.0847E+01 | 0.0000E+00 | 5.2421E+01 |
| A4 = | −1.2736E−02 | 1.2324E−02 | 5.6607E−02 | 7.9060E−02 | 3.3710E−02 |
| A6 = | −1.6353E−02 | −3.2657E−02 | −8.5056E−02 | −9.9559E−02 | −3.9375E−02 |
| A8 = | 1.5734E−02 | 3.1045E−02 | 5.7407E−02 | 5.6787E−02 | 1.5718E−02 |
| A10 = | −8.2027E−03 | −1.5771E−02 | −2.2146E−02 | −1.8335E−02 | −2.7650E−03 |
| A12 = | 2.1699E−03 | 4.2346E−03 | 4.8348E−03 | 3.1413E−03 | −9.9338E−05 |
| A14 = | −2.2446E−04 | −5.5020E−04 | −5.5701E−04 | −2.4004E−04 | 1.1164E−04 |
| A16 = | 1.9627E−06 | 2.7158E−05 | 2.7651E−05 | 4.2558E−06 | −1.5023E−05 |
| A18 = | — | — | — | — | 6.5279E−07 |
| Surface # | 13 | 14 | 15 | 16 | 18 |
| k = | 0.0000E+00 | −8.7992E+00 | −1.0000E+00 | 0.0000E+00 | 0.0000E+00 |
| A4 = | 1.4333E−02 | −6.5370E−02 | −5.2992E−02 | 4.2008E−02 | −6.3377E−02 |
| A6 = | −1.2390E−02 | 2.9611E−02 | 1.7075E−02 | −2.3841E−02 | 7.4952E−03 |
| A8 = | 3.3486E−03 | −1.0087E−02 | −8.4870E−03 | 4.8875E−03 | 4.6298E−04 |
| A10 = | −6.5530E−04 | 1.8637E−03 | 2.2645E−03 | −5.4797E−04 | −1.8359E−04 |
| A12 = | 9.3823E−05 | −7.2345E−05 | −3.6075E−04 | 2.8785E−05 | 1.9185E−05 |
| A14 = | −9.4373E−06 | −3.9823E−05 | 3.4772E−05 | 5.0495E−07 | −1.0504E−06 |
| A16 = | 1.6867E−07 | 8.1783E−06 | −1.8805E−06 | −1.6462E−07 | 3.2082E−08 |
| A18 = | 3.4735E−08 | −6.4987E−07 | 4.8364E−08 | 8.8328E−09 | −5.0109E−10 |
| A20 = | — | 1.9305E−08 | −3.6954E−10 | −1.6343E−10 | 2.8807E−12 |
| Surface # | 19 | | | | |
| k = | −7.5401E−01 | | | | |
| A4 = | −6.2862E−02 | | | | |
| A6 = | 1.1930E−02 | | | | |
| A8 = | −1.8682E−03 | | | | |
| A10 = | 2.1284E−04 | | | | |
| A12 = | −1.7302E−05 | | | | |
| A14 = | 9.8879E−07 | | | | |
| A16 = | −3.7402E−08 | | | | |
| A18 = | 8.2683E−10 | | | | |
| A20 = | −7.9810E−12 | | | | |

In the 9th embodiment, the equation of the aspheric surface profiles of the aforementioned lens elements is the same as the equation of the 1st embodiment. Also, except for the Yc121 and Yc122 mentioned in this embodiment, the definitions of these parameters shown in the following table are the same as those stated in the 1st to 8th embodiments with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 6.24 | Yc62 [mm] | 1.20 |
| Fno | 1.80 | Yc72 [mm] | 2.17 |
| HFOV [deg.] | 41.5 | Yc82 [mm] | 1.62 |
| Fno/tan(HFOV) | 2.03 | R14/R15 | 0.09 |
| V1/N1 | 36.27 | f/R12 + f/R14 + f/R16 | 4.74 |
| V2/N2 | 12.25 | f7/f8 | −1.05 |
| V3/N3 | 9.16 | |f8/f1| | 0.84 |
| V4/N4 | 36.27 | |f8/f2| | 0.33 |
| V5/N5 | 36.27 | |f8/f3| | 0.12 |
| V6/N6 | 28.93 | |f8/f4| | 0.36 |
| V7/N7 | 36.27 | |f8/f5| | 0.01 |
| V8/N8 | 33.14 | |f8/f6| | 0.41 |
| (V3 − V6)/(V3 + V6) | −0.49 | |f8/f7| | 0.95 |
| CT1/MaxCT28 | 1.92 | |f/f1| | 0.93 |
| T78/T12 | 35.54 | |f/f2| | 0.37 |
| T78/T23 | 1.77 | |f/f3| | 0.14 |
| T78/T34 | 11.74 | |f/f4| | 0.41 |
| T78/T45 | 9.72 | |f/f5| | 0.01 |
| T78/T56 | 2.58 | |f/f6| | 0.46 |
| T78/T67 | 11.63 | |f/f7| | 1.06 |
| T78/(CT7 + CT8) | 1.15 | |f/f8| | 1.11 |
| T78/BL | 1.23 | f12/f345 | 0.44 |
| ΣAT/(T23 + T56 + T78) | 1.15 | f/f678 | −0.29 |
| Dr5r10/Dr11r16 | 0.55 | |Yc122/Yc121| | 2.06 |
| EPD/Dr5r10 | 2.16 | |Yc412/Yc411| | 2.65 |
| TL/ImgH | 1.45 | |Yc512/Yc511| | 2.06 |
| ImgH/BL | 5.61 | |Yc812/Yc811| | 14.27 |

10th Embodiment

Figure 19:
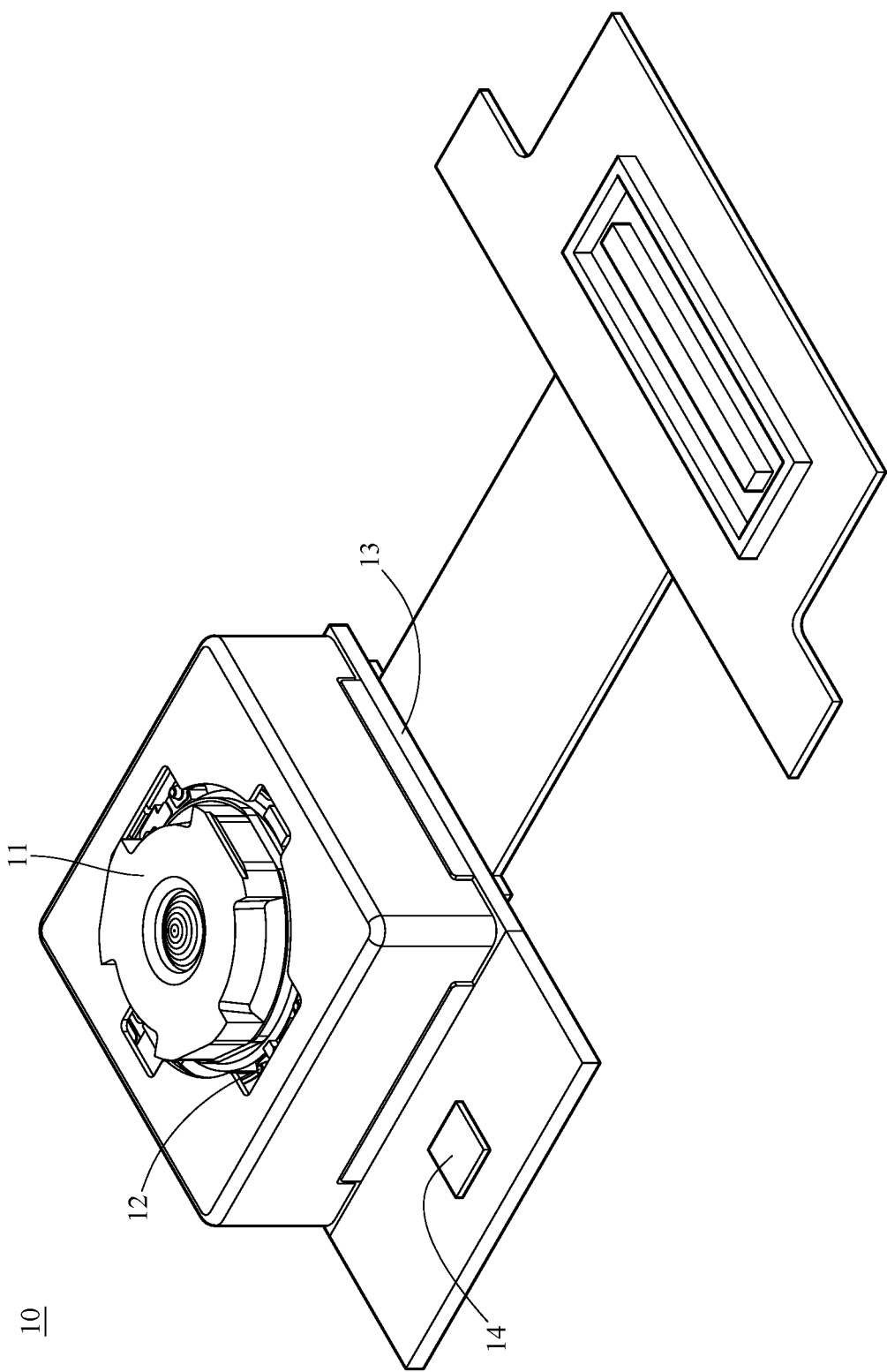
FIG. 19 is a perspective view of an image capturing unit according to the 10th embodiment of the present disclosure.

FIG. 19 is a perspective view of an image capturing unit according to the 10th embodiment of the present disclosure. In this embodiment, an image capturing unit 10 is a camera module including a lens unit 11, a driving device 12, an image sensor 13 and an image stabilizer 14. The lens unit 11 includes the photographing lens assembly disclosed in the 1st embodiment, a barrel and a holder member (their reference numerals are omitted) for holding the photographing lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the photographing lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

11th Embodiment

Figure 20:
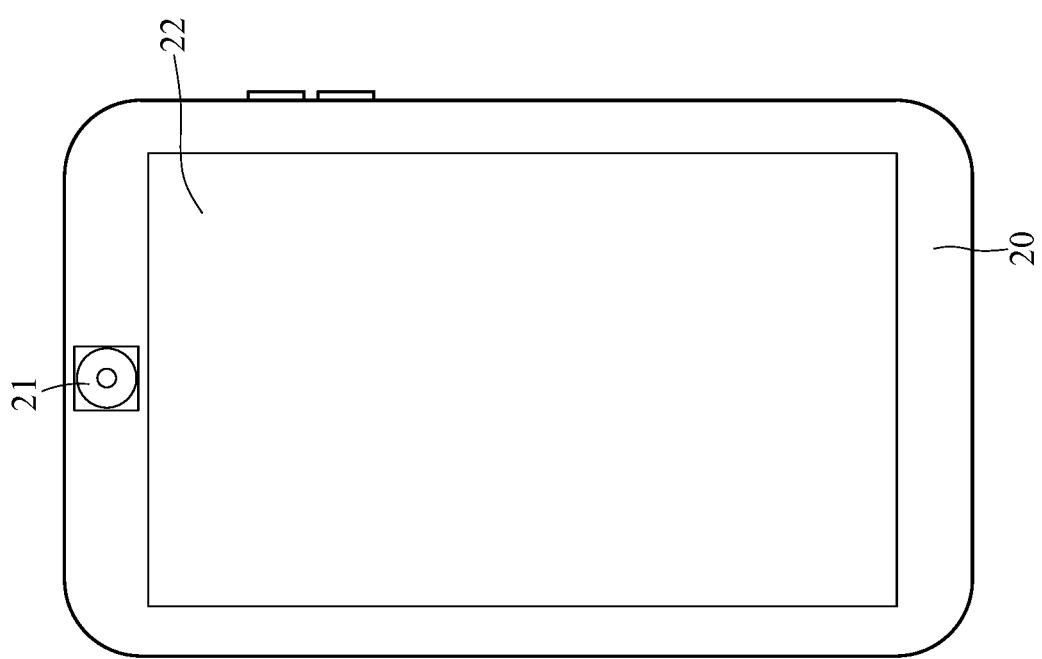
FIG. 20 is a front view of an electronic device according to the 11th embodiment of the present disclosure.

FIG. 20 is a front view of an electronic device according to the 11th embodiment of the present disclosure.

In this embodiment, an electronic device 20 is a smartphone including an image capturing unit 21 and a display unit 22. In this embodiment, the image capturing unit 21 includes the photographing lens assembly disclosed in the 1st embodiment and an image sensor (their reference numbers are omitted). In FIG. 20, the image capturing unit 21 and the display unit 22 are all disposed on one side of the electronic device 20. The image capturing unit 21 is a front-facing camera of the electronic device 20 for taking selfies, but the present disclosure is not limited thereto.

12th Embodiment

Figure 21:
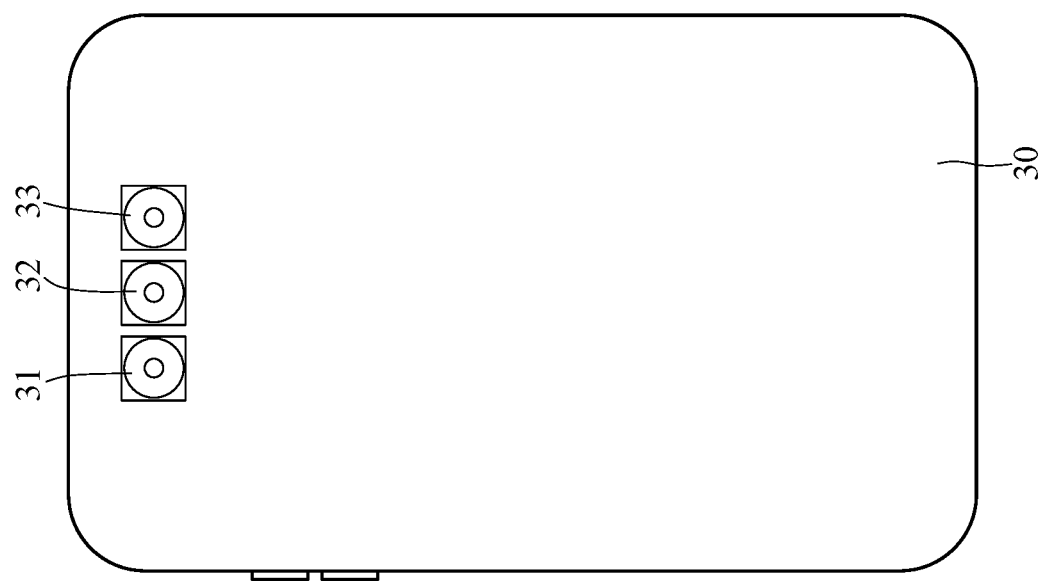
FIG. 21 is a rear view of an electronic device according to the 12th embodiment of the present disclosure.

FIG. 21 is a rear view of an electronic device according to the 12th embodiment of the present disclosure.

In this embodiment, an electronic device 30 is a smartphone including an image capturing unit 31, an image capturing unit 32, an image capturing unit 33 and a display unit (its reference number is omitted). In this embodiment, the image capturing units 31, 32 and 33 have different fields of view (e.g., the image capturing unit 31 is a telephoto image capturing unit, the image capturing unit 32 is a standard image capturing unit and the image capturing unit 33 is a wide-angle image capturing unit), such that the electronic device 30 has various magnification ratios so as to meet the requirement of optical zoom functionality. The image capturing unit 32 includes the photographing lens assembly disclosed in the 4th embodiment and an image sensor (their reference numbers are omitted). In this embodiment, the image capturing unit 31, 32 and 33 are all disposed on one side of the electronic device 30, while the display unit is disposed on the opposite side of the electronic device 30.

13th Embodiment

Figure 22:
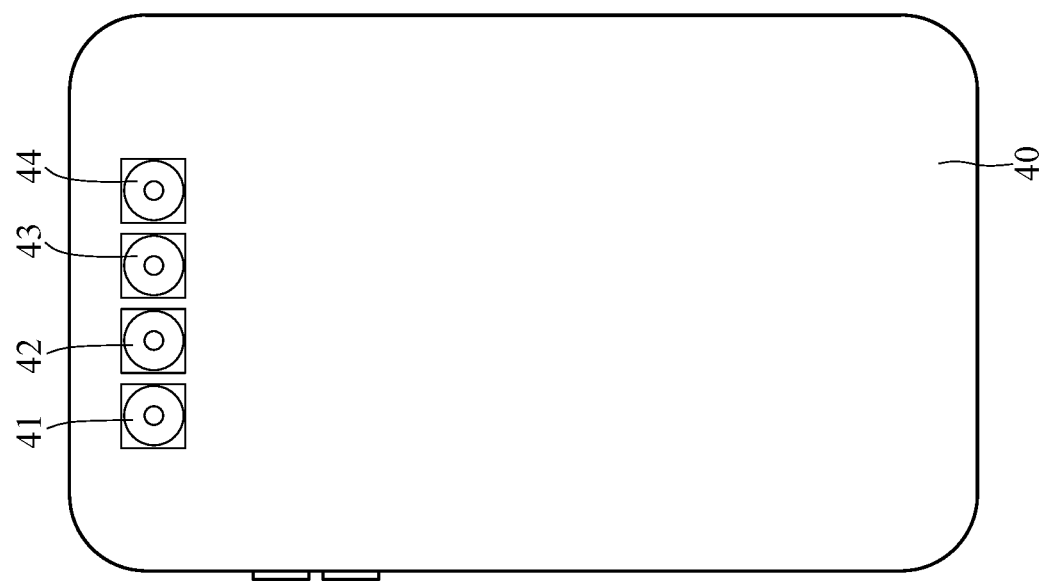
FIG. 22 is a rear view of an electronic device according to the 13th embodiment of the present disclosure.

FIG. 22 is a rear view of an electronic device according to the 13th embodiment of the present disclosure.

In this embodiment, an electronic device 40 is a smartphone including an image capturing unit 41, an image capturing unit 42, an image capturing unit 43, an image capturing unit 44 and a display unit (its reference number is omitted). In this embodiment, the image capturing units 41, 42 43 and 44 have different fields of view (e.g., the image capturing unit 41 is a telephoto image capturing unit, the image capturing unit 42 is a wide-angle image capturing unit, the image capturing unit 43 is a standard image capturing unit and the image capturing unit 44 is an ultra-wide-angle image capturing unit), such that the electronic device 40 has various magnification ratios so as to meet the requirement of optical zoom functionality. The image capturing unit 43 includes the photographing lens assembly disclosed in the 4th embodiment and an image sensor (their reference numbers are omitted). In this embodiment, the image capturing unit 41, 42, 43 and 44 are all disposed on one side of the electronic device 40, while the display unit is disposed on the opposite side of the electronic device 40.

14th Embodiment

Figure 23:
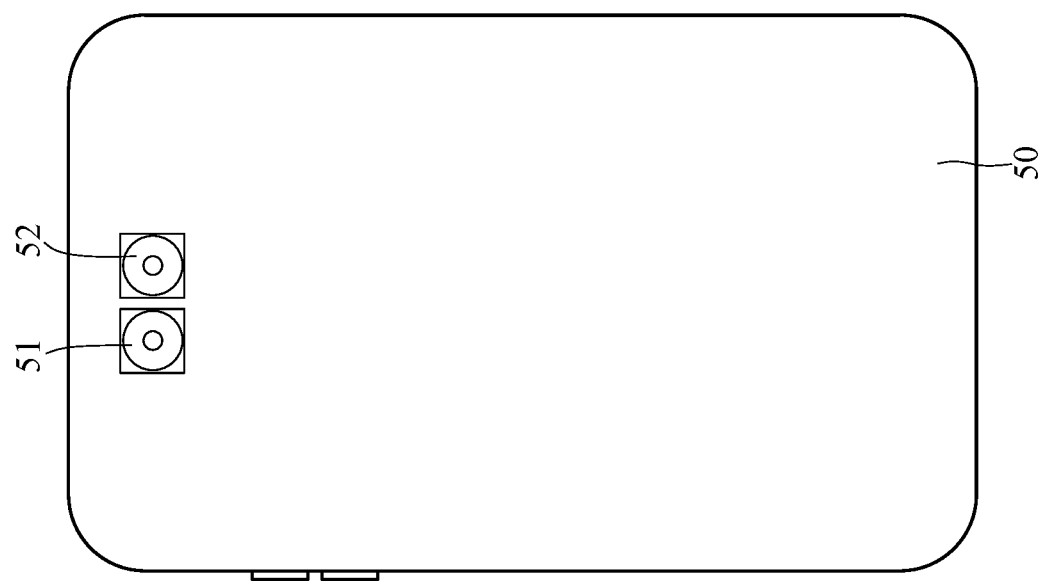
FIG. 23 is a rear view of an electronic device according to the 14th embodiment of the present disclosure.

FIG. 23 is a rear view of an electronic device according to the 14th embodiment of the present disclosure.

In this embodiment, an electronic device 50 is a smartphone including an image capturing unit 51, an image capturing unit 52 and a display unit (its reference number is omitted). In this embodiment, the image capturing units 51 and 52 have different fields of view (e.g., the image capturing unit 51 is a wide-angle image capturing unit and the image capturing unit 52 is a standard image capturing unit), such that the electronic device 50 has various magnification ratios so as to meet the requirement of optical zoom functionality. The image capturing unit 52 includes the photographing lens assembly disclosed in the 4th embodiment and an image sensor (their reference numbers are omitted). In this embodiment, the image capturing unit 51 and 52 are all disposed on one side of the electronic device 50, while the display unit is disposed on the opposite side of the electronic device 50.

The smartphone in this embodiment is only exemplary for showing the image capturing units including the photographing lens assembly of the present disclosure installed in an electronic device, and the present disclosure is not limited thereto. The photographing lens assembly can be optionally applied to systems with a movable focus. Furthermore, the photographing lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens assembly comprising eight lens elements, the eight lens elements being, in order from an object side to an image side, a first lens element, a second lens element, a third lens element, a fourth lens element, a fifth lens element, a sixth lens element, a seventh lens element and an eighth lens element;

wherein the first lens element with positive refractive power has an object-side surface being convex in a paraxial region thereof, the sixth lens element has an image-side surface being concave in a paraxial region thereof, the seventh lens element has an image-side surface being concave in a paraxial region thereof, the eighth lens element with negative refractive power has an object-side surface being concave in a paraxial region thereof and an image-side surface being concave in a paraxial region thereof, and the image-side surface of the eighth lens element has at least one critical point in an off-axis region thereof;

wherein a central thickness of the first lens element is CT1, a maximum value among central thicknesses of the second through eighth lens elements is MaxCT28, a curvature radius of the image-side surface of the seventh lens element is R14, a curvature radius of the object-side surface of the eighth lens element is R15, an axial distance between an object-side surface of the third lens element and an image-side surface of the fifth lens element is Dr5r10, an axial distance between an object-side surface of the sixth lens element and the image-side surface of the eighth lens element is Dr11r16, and the following conditions are satisfied:

$1.0 < CT1/\text{Max}CT28$;

$R14/R15 < 1.20$; and $Dr5r10/Dr11r16 < 0.90$.

2. The photographing lens assembly of claim 1, wherein each of object-side surfaces and image-side surfaces of the sixth through eighth lens elements has at least one critical point in an off-axis region thereof.

3. The photographing lens assembly of claim 1, wherein the central thickness of the first lens element is CT1, the maximum value among central thicknesses of the second through eighth lens elements is MaxCT28, and the following condition is satisfied:

$1.5 < CT1/\text{Max}CT28 < 3.5$.

4. The photographing lens assembly of claim 1, wherein the curvature radius of the image-side surface of the seventh lens element is R14, the curvature radius of the object-side surface of the eighth lens element is R15, and the following condition is satisfied:

$-2.5 < R14/R15 < 0.50$.

5. The photographing lens assembly of claim 1, wherein the axial distance between the object-side surface of the third lens element and the image-side surface of the fifth lens element is Dr5r10, the axial distance between the object-side surface of the sixth lens element and the image-side surface of the eighth lens element is Dr11r16, and the following condition is satisfied:

$0.30 < Dr5r10/Dr11r16 < 0.75$.

6. The photographing lens assembly of claim 1, wherein at least one lens surface of at least one lens element has at least two critical points in an off-axis region thereof, a vertical distance between a critical point closest to an optical axis of the at least two critical points and the optical axis is Yc1, a vertical distance between a critical point closest to a maximum effective radius position of the at least two critical points and the optical axis is Yc2, and the following condition is satisfied:

$1.20 < |Yc2/Yc1| < 5.0$.

7. The photographing lens assembly of claim 1, wherein an axial distance between the seventh lens element and the eighth lens element is T78, a central thickness of the seventh lens element is CT7, a central thickness of the eighth lens element is CT8, and the following condition is satisfied:

$0.40 < T78/(CT7+CT8) < 1.5$.

8. The photographing lens assembly of claim 1, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, an axial distance between the sixth lens element and the seventh lens element is T67, an axial distance between the seventh lens element and the eighth lens element is T78, an axial distance between the image-side surface of the eighth lens element and an image surface is BL, and the following conditions are satisfied:

$1.0 < T78/T12$;

$1.0 < T78/T23$;

$1.0 < T78/T34$;

$1.0 < T78/T45$;

$1.0 < T78/T56$;

$1.10 < T78/T67$; and $0.80 < T78/BL$.

9. The photographing lens assembly of claim 1, wherein an Abbe number of the third lens element is V3, an Abbe number of the sixth lens element is V6, and the following condition is satisfied:

$-1.0 < (V3-V6)/(V3+V6) < -0.30$.

10. The photographing lens assembly of claim 1, wherein a vertical distance between a critical point on the image-side surface of the sixth lens element and an optical axis is Yc62, a vertical distance between a critical point on the image-side surface of the seventh lens element and the optical axis is Yc72, a vertical distance between the critical point on the image-side surface of the eighth lens element and the optical axis is Yc82, and the following condition is satisfied:

$$Yc62<Yc82<Yc72.$$

11. The photographing lens assembly of claim 1, wherein an entrance pupil diameter of the photographing lens assembly is EPD, the axial distance between the object-side surface of the third lens element and the image-side surface of the fifth lens element is Dr5r10, and the following condition is satisfied:

$$2.0<EPD/Dr5r10<4.0.$$

12. The photographing lens assembly of claim 1, wherein a focal length of the photographing lens assembly is f, a curvature radius of the image-side surface of the sixth lens element is R12, the curvature radius of the image-side surface of the seventh lens element is R14, a curvature radius of the image-side surface of the eighth lens element is R16, and the following condition is satisfied:

$$3.0<f/R12+f/R14+f/R16<10.$$

13. The photographing lens assembly of claim 1, wherein an f-number of the photographing lens assembly is Fno, half of a maximum field of view of the photographing lens assembly is HFOV, and the following condition is satisfied:

$$Fno/\tan(HFOV)<2.20.$$

14. The photographing lens assembly of claim 1, wherein a sum of axial distances between each of all adjacent lens elements of the photographing lens assembly is ΣAT, an axial distance between the second lens element and the third lens element is T23, an axial distance between the fifth lens element and the sixth lens element is T56, an axial distance between the seventh lens element and the eighth lens element is T78, and the following condition is satisfied:

$$1.0<\Sigma T/(T23+T56+T78)<1.50.$$

15. The photographing lens assembly of claim 1, wherein a focal length of the photographing lens assembly is f, a composite focal length of the first lens element and the second lens element is f12, a composite focal length of the third lens element, the fourth lens element and the fifth lens element is f345, a composite focal length of the sixth lens element, the seventh lens element and the eighth lens element is f678, and the following conditions are satisfied:

$$0<f12/f345<1.50; \text{ and}$$

$$f/f678<-0.20.$$

16. An image capturing unit, comprising:
the photographing lens assembly of claim 1; and
an image sensor disposed on an image surface of the photographing lens assembly.

17. An electronic device, comprising:
the image capturing unit of claim 16.

18. A photographing lens assembly comprising eight lens elements, the eight lens elements being, in order from an object side to an image side, a first lens element, a second lens element, a third lens element, a fourth lens element, a fifth lens element, a sixth lens element, a seventh lens element and an eighth lens element;
wherein the first lens element with positive refractive power has an object-side surface being convex in a paraxial region thereof, the sixth lens element has an image-side surface being concave in a paraxial region thereof, the seventh lens element with positive refractive power has an object-side surface being convex in a paraxial region thereof and has an image-side surface being concave in a paraxial region thereof, the eighth lens element with negative refractive power has an object-side surface being concave in a paraxial region thereof and an image-side surface being concave in a paraxial region thereof, and the image-side surface of the eighth lens element has at least one critical point in an off-axis region thereof;
wherein a central thickness of the first lens element is CT1, a maximum value among central thicknesses of the second through eighth lens elements is MaxCT28, a curvature radius of the image-side surface of the seventh lens element is R14, a curvature radius of the object-side surface of the eighth lens element is R15, an axial distance between an object-side surface of the third lens element and an image-side surface of the fifth lens element is Dr5r10, an axial distance between an object-side surface of the sixth lens element and the image-side surface of the eighth lens element is Dr11r16, and the following conditions are satisfied:

$$1.0<CT1/\text{Max}CT28;$$

$$R14/R15<1.20; \text{ and}$$

$$Dr5r10/Dr11r16<1.0.$$

19. The photographing lens assembly of claim 18, wherein a focal length of the photographing lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the eighth lens element is f8, a focal length of the i-th lens element is fi, and at least one lens element of the photographing lens assembly satisfies the following condition:

$$|f/fi|<0.10, \text{ wherein } i=1, 2, 3, 4, 5, 6, 7 \text{ or } 8.$$

20. The photographing lens assembly of claim 18, wherein a focal length of the seventh lens element is f7, a focal length of the eighth lens element is f8, and the following condition is satisfied:

$$f7/f8<-0.50.$$

21. The photographing lens assembly of claim 18, wherein an entrance pupil diameter of the photographing lens assembly is EPD, the axial distance between the object-side surface of the third lens element and the image-side surface of the fifth lens element is Dr5r10, and the following condition is satisfied:

$$2.0<EPD/Dr5r10<4.0.$$

22. The photographing lens assembly of claim 18, wherein a sum of axial distances between each of all adjacent lens elements of the photographing lens assembly is ΣAT, an axial distance between the second lens element and the third lens element is T23, an axial distance between the fifth lens element and the sixth lens element is T56, an axial distance between the seventh lens element and the eighth lens element is T78, and the following condition is satisfied:

$$1.0<\Sigma AT/(T23+T56+T78)<1.50.$$

23. The photographing lens assembly of claim 18, wherein an f-number of the photographing lens assembly is Fno, half of a maximum field of view of the photographing lens assembly is HFOV, and the following condition is satisfied:

$Fno/\tan(HFOV) < 2.20$.

24. The photographing lens assembly of claim 18, wherein an axial distance between the seventh lens element and the eighth lens element is T78, a central thickness of the seventh lens element is CT7, a central thickness of the eighth lens element is CT8, and the following condition is satisfied:

$0.40 < T78/(CT7+CT8) < 1.5$.

25. The photographing lens assembly of claim 18, wherein a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the eighth lens element is f8, and the following conditions are satisfied:

$|f8/f1| < 1.0$;

$|f8/f2| < 1.0$;

$|f8/f3| < 1.0$;

$|f8/f4| < 1.0$;

$|f8/f5| < 1.0$;

$|f8/f6| < 1.0$; and $|f8/f7| < 1.0$.

26. The photographing lens assembly of claim 18, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the i-th lens element is Ni, and at least two lens elements of the photographing lens assembly satisfy the following condition:

$5.0 < Vi/Ni < 12.0$, wherein i=1, 2, 3, 4, 5, 6, 7 or 8.

27. The photographing lens assembly of claim 18, wherein an axial distance between the object-side surface of the first lens element and an image surface is TL, a maximum image height of the photographing lens assembly is ImgH, an axial distance between the image-side surface of the eighth lens element and the image surface is BL, and the following conditions are satisfied:

$TL/ImgH < 1.60$; and $5.0 < ImgH/BL$.

28. The photographing lens assembly of claim 18, wherein the curvature radius of the image-side surface of the seventh lens element is R14, the curvature radius of the object-side surface of the eighth lens element is R15, and the following condition is satisfied:

$-2.5 < R14/R15 < 0.50$.

29. The photographing lens assembly of claim 18, wherein at least one lens surface of the third through seventh lens element has at least one inflection point.

30. An image capturing unit, comprising:
   the photographing lens assembly of claim 18; and
   an image sensor disposed on an image surface of the photographing lens assembly.

31. An electronic device, comprising:
   the image capturing unit of claim 30.

* * * * *